(12) United States Patent (10) Patent No.: US 7,546,254 B2
Bednarek (45) Date of Patent: Jun. 9, 2009

(54) SYSTEM AND METHOD FOR PROMOTING COMMERCE, INCLUDING SALES AGENT ASSISTED COMMERCE, IN A NETWORKED ECONOMY

(76) Inventor: Michael D. Bednarek, 6311 Berkshire Dr., Bethesda, MD (US) 20814

( * ) Notice: Subject to any disclaimer, the term of this patent is extended or adjusted under 35 U.S.C. 154(b) by 564 days.

(21) Appl. No.: 11/139,559

(22) Filed: May 31, 2005

(65) Prior Publication Data

US 2005/0251440 A1 Nov. 10, 2005

Related U.S. Application Data

(60) Division of application No. 09/490,087, filed on Jan. 24, 2000, now Pat. No. 6,965,868, which is a continuation-in-part of application No. 09/365,748, filed on Aug. 3, 1999, now abandoned.

(51) Int. Cl.
*G06Q 30/00* (2006.01)
(52) U.S. Cl. ....................................................... 705/26
(58) Field of Classification Search .................... 705/10, 705/26
See application file for complete search history.

(56) References Cited

U.S. PATENT DOCUMENTS

| 6,381,603 | B1 * | 4/2002 | Chan et al. | 707/10 |
| 6,674,993 | B1 * | 1/2004 | Tarbouriech | 455/2.01 |
| 2001/0032165 | A1 * | 10/2001 | Friend et al. | 705/37 |
| 2002/0167442 | A1 * | 11/2002 | Taylor | 342/357.09 |

FOREIGN PATENT DOCUMENTS

DE 4339004 A1 * 12/1994

OTHER PUBLICATIONS

"GeePS Introduces Location-based Wireless Technologies on Advance Internet's New Jersey Online for Retailers and Consumers." Business Wire, 2454, Jun. 13, 2000.*

* cited by examiner

*Primary Examiner*—Susanna M Diaz

(57) ABSTRACT

A personal communication and electronic commerce system for use by participating users and participating merchants in connection with incentive programs in the Network Economy. The system includes a cellular communication network that includes geographically spaced base stations that are linked to a fixed communication network. Users may have personal communication devices that can be used to allow a digital message generated on the personal communication devices by placing a call through one of the base stations and memory for storing a digital value corresponding to a monetary value. The personal communication device may also be used as a cellular position locator to determine one's geographic location and, if desired, to access information from a merchant information database containing information pertaining to a plurality of participating merchants located within the geographic territory covered by the cellular communication network. The merchant information may be stored on a database that is accessible by merchants so those merchants can add, delete or alter information contained in their respective listings. An incentive system is also provided for creating incentives for participating users to encourage. This computer implemented incentive program for encouraging certain participant actions includes a first reward program under which participants may earn points for certain actions and a second reward program through which the redemption rate associated with a particular participant is adjusted in response to certain participant action. The incentive program has a wide range of applications, including transportation, financial services and computer gaming.

19 Claims, 39 Drawing Sheets

Participant Action = PA
Base Points Earned = BP
Redemption Rate = RR
Program Points = PP

System 1: Continuous Redemption

$PA_1 \Rightarrow BP_1 * RR_{@T1} = PP_1$
$PA_2 \Rightarrow BP_2 * RR_{@T2} = PP_2$
$PA_3 \Rightarrow BP_3 * RR_{@T3} = PP_3$ Total Program Points = $PP_1 + PP_2 + PP_3$

System 2: Periodic Redemption

Total Base Points $PA_1 \Rightarrow BP_1 \quad BP_1$
$PA_2 \Rightarrow BP_2 \quad BP_1 + BP_2$ End of Period 1 (P1)

$(BP_1 + BP_2) * RR_{@end\ of\ P1} = PP_{@end\ of\ P1}$ $PA_3 \Rightarrow BP_3 \quad BP_3$ End of Period 2 (P2)

$PP_{@end\ of\ P1} + [(BP3) * RR_{@end\ of\ P2}] = PP_{@end\ of\ P2}$

*FIG. 3A*

System 3: Redemption Only on Demand

| | Total Base Points |
|---|---|
| $PA_1 \Rightarrow BP_1$ | $BP_1$ |
| $PA_2 \Rightarrow BP_2$ | $BP_1 + BP_2$ |

End of Period 1

| | |
|---|---|
| $PA_3 \Rightarrow BP_3$ | $BP_1 + BP_2 + BP_3$ |

End of Period 2

$$BP_1 + BP_2 + BP_3$$

---

Redemption Request
Made at End of Period $2 + \Delta$

Program Points = $(BP_1 + BP_2 + BP_3) \times RR_{\text{at time of redemption}}$

*FIG. 3B*

MENU SUMMARY

Press Menu Followed by the Menu Number(s).

1 Messages
 11 Text Messages
 12 Voice Messages
 13 Welcome Note

2 Call Log
 21 Missed Calls
 22 Dialed Calls
 23 Received Calls
 24 Clear Call Lists
 25 Call Timers

3 Profiles
 31 Normal
 32 Silent
 33 Meeting
 34 Outdoor
 35 Pager
 36 Car (Once Phone is Connected to a Car Kit)
 37 Headset (Once Phone is Connected to a Headset)

4 Settings
 41 Call Settings
 42 Phone Settings
 43 Security Settings
 44 Network Services

5 System
 51 Automatic
 52 Manual
 53 New Search

6 Games

7 CPL Directory
 71 Where Am I?
 72 SOS Beacon
 73 Directory
  731 Gas/Service
  732 Grocery
  733 Hospital
  734 Hotel
   7341 Budget
   7342 Business
   7343 Luxury
  735 Restaurant
   7351 American
   7351 Chinese
   7352 Fast Food
   7353 French
   7354 Italian
   7355 Japanese
   7356 Thai
   7357 Other
  736 Retail
   7361 Bookstore
   7362 Electronics
   7363 Hardware
   7364 Shopping Mall
  737 Other

8 Calender

9 Calculator

$500 per Month

*Read the Details and Decide*

*You Agree to Spend at Least $500 per Month for Office Supplies from Office Superstore. In Return, Your Corporate Variable Redemption Rate will be Increased by 0.10 Each Month and Your Company will Receive a 10% Discount on All Purchases from Office Superstore. Should Your Company Fail to Satisfy the Commitment Your Corporate Variable Redemption Rate will be Reduced by One-Half (1/2) the Difference Between Your Current Rate and the Base Rate and the Discount will be Suspended for Two Months.*

*Do You Accept?*

*Yes! Sign Me Up*
*Not Yet - Show Me More*
*No*
*Exit*

FIG. 9H

Legend:
F = Favorable
U = Unfavorable
• = Neutral
Blank = No Interaction

| | SA1 | SA2 | SA3 | SA4 | SA5 | SA6 | SA7 | SA8 | SA9 | SA10 | SA11 | SA12 | SA13 | SA14 | SA15 | | AA1 | AA2 | AA3 | AA4 | AA5 |
|---|---|---|---|---|---|---|---|---|---|---|---|---|---|---|---|---|---|---|---|---|---|
| C1 | • | F | • | F | U | | • | • | • | U | | • | | U | | | • | | F | U | F |
| C2 | U | | • | F | | | • | • | U | | F | • | | F | | | • | | | | |
| C3 | U | | • | • | | | | • | U | | U | • | | • | | | • | | | | |
| C4 | • | | • | F | U | | | • | F | | | U | • | | | | | | F | | |
| C5 | | U | • | | | | U | U | | | F | • | | U | | | | U | | | U |
| C6 | | U | • | | | | | F | | • | | | | F | | | | • | | • | |
| C7 | F | F | F | • | U | | F | | F | | | • | | • | | | U | F | | | |
| C8 | • | | | • | | F | | | • | | F | | | | | | U | • | F | F | |
| C9 | F | | | F | | | | | | U | | U | | • | • | | | | | | |
| C10 | U | F | | • | | | | | U | | | F | | | | | | | | | • |
| C11 | F | F | F | • | U | | | • | F | | | F | • | F | | | U | | | | |
| C12 | | • | F | | | | | • | | | F | | • | U | | | | | | F | |
| C13 | • | | | U | | | | | | U | | | F | | | | | | | | |
| C14 | F | | | F | • | | | | | | | U | F | | • | | | U | | | |
| C15 | | | F | | | F | F | F | | | | U | | | | | | | | | |
| C16 | | | • | F | F | | • | • | | U | U | | | • | | | | U | | | |
| C17 | U | | | | F | | | | | | • | U | | | | | | | U | U | U |
| C18 | F | | | | • | | | | | | | | U | • | | | | | | | |
| C19 | • | • | | F | | | | | | U | | F | | | | | | | | F | F |
| C20 | | • | | • | | | | | | F | F | | F | | | | | U | | | |

FIG. 17

SYSTEM AND METHOD FOR PROMOTING COMMERCE, INCLUDING SALES AGENT ASSISTED COMMERCE, IN A NETWORKED ECONOMY

CLAIM TO THE BENEFIT OF CO-PENDING APPLICATIONS

This application is a divisional application of and claims the benefit of 35 U.S.C. §120 with respect to the applicant's application Ser. No. 09/490,087 filed Jan. 24, 2000, now U.S. Pat. No. 6,965,868 which application is a continuation-in-part of and claims the benefit of 35 U.S.C. §120 with respect to the applicant's application Ser. No. 09/365,748 filed Aug. 3, 1999 now abandoned for "System and Method for Supporting Participant Specific Incentives and Promotions."

FIELD OF INVENTION

The present invention relates to systems, tools and methods for promoting commerce in a networked economy, including, for example, conducting sales agent assisted commerce involving one or more distributed vendors over networked computers that provides both the advantages of customer/sales agent interaction and the convenience and efficiency of electronic commerce through the use of networked computers. The invention includes discrete components that have utility by themselves, but can be used in combination to provide even greater benefit as a comprehensive suite of solutions for promoting and improving electronic commerce of many forms, including retail and business to business commerce, casino gaming, utility aggregation and more. These components include an incentive program, a merchant finder and cellular position locator, a system and-method for conducting sales agent assisted commerce involving one or more distributed vendors over networked computers, smart cards that are enabled for wireless connectivity and more. The present invention also relates to incentive and promotional programs, including a personal communication and electronic commerce system and smart cards for use by participating users and participating merchants in connection with incentive and promotional programs in the Network Economy. More specifically, the present invention relates to an incentive system and process that can be used alone or in conjunction with other incentive systems to more specifically incentivize desired participant action. The process is preferably implemented through the use of one or more programmable computers and personal communication devices such as digital cellular phones and data communication devices in a cellular network. The present invention also relates to virtual retailing, i.e., recreating, or simulating the positive components of the retail experience in a virtual transaction setting.

BACKGROUND OF THE INVENTION

The emergence of a fully networked economy now seems inevitable because of three recent trends: 1) software power is increasing and becoming less expensive largely due to the use of object oriented programming; 2) hardware power is increasing and becoming less expensive; and 3) communication and network power is increasing and becoming less expensive as a result of the Internet and related technologies.

The emergence of the global computer network or Internet has dramatically altered commerce. Entirely new paradigms for commerce have evolved or emerged from traditional non-electronic commerce business models. Indeed, electronic commerce, in particular, commerce through the Internet, is widely credited with introducing tremendous efficiencies into commercial transactions. The Internet has also dramatically altered the vendor/customer relationship. Prior to the advent of the Internet, customers faced geographic and informational obstacles in extracting the best prices and service. Research was time-consuming, and everyone from producer to retailer closely guarded information. Now, customers are in charge. A wealth of information on just about any product or service is available and geography is no longer an obstacle.

In addition, new dynamic pricing methods, from auction to buyer cooperatives and even barter sites are gaining much wider usage in the physical world. The ever-increasing number of websites where auctions are conducted has bid down prices to the bare minimum. An example is the so-called reverse auction process that favors buyers. Priceline.com. Inc., for example, lets buyers trade away convenience—exact departure times for flights—in return for lower prices than airlines would offer at retail. Companies such Accompany, Inc. and Mercata, Inc. aggregate groups of buyers so that the more people that agree to buy a product, the lower the price goes.

Given the efficiencies of electronic commerce, some have suggested that the Internet would eliminate the need for middlemen. Others have argued that, given the vast size and scope of the Internet, buyers still need middlemen to sort through the vast new choices of suppliers. Moreover, it is increasingly apparent that vendors or suppliers need to be where masses of buyers gather, which usually isn't an individual company's sites. As a consequence, there has emerged a form of middlemen on the Internet referred to as infomediaries, vertical portals or e-markets that serve to connect buyers and sellers everywhere; Because there is none of the friction of phones, faxes or in-person meetings, these Internet middlemen can gather vast numbers of buyers and sellers.

Despite the proliferation of business models and infomediaries throughout the Internet, however, almost all business models focus on price and, to a lesser extent, convenience. The race to optimization in these areas will inevitably result in numerous sources for goods at the lowest possible price with maximum convenience. What is lacking, however, is in ability to demonstrate a competitive advantage among these low-price high-convenience providers.

Thus, there remains a need for providing additional consumer value that is not driven entirely by pricing convenience. Indeed, the next great challenge of the new economy is transforming the lessons learned in the old economy into solutions for the new economy to expedite full development of e-commerce. It is often said that the new economy changes all the old rules for doing business. Indeed much has changed and much will change in the future. In the midst of this change, however, we often overlook the one component that changes only incrementally, not radically, we overlook the end customer: human beings. Long after the novelty of the network economy wears off, humans will be essentially the same as they are today—moved and motivated by the same desires, but armed with greater information and more choices. In this setting, customer service and satisfaction will be the keys to attracting, maintaining and growing customer relationships. Geographic proximity becomes irrelevant and price differentials evaporate customer service and brand awareness and perception will be the principle determinants of business success.

Thus, there is a need for a system and method that provides customer service and satisfaction in a network economy.

In the absence of face-to-face contact, and geographic proximity, the classic approaches to customer service and satisfaction are not directly applicable. Yet the customer wants essentially the same things: advice, information and efficient service and perhaps, above all, a sense of belonging—identification of certain groups, which can include merchants.

It is widely believed that an advantage of electronic commerce is that it eliminates the middleman and allows customers to deal directly with merchants. Proponents of this view fail to recognize that only a limited segment of the population is currently engaged in electronic commerce. As the network economy expands to encompass a wider swath of the economy, the dynamic will change. Also, electronic commerce is not yet mature—the absence of so-called "middlemen" in an immature economic structure should not be surprising.

Contrary to popular belief, the present inventor believes that "middlemen" can provide a valuable service in the network economy, particularly as this economy expands to encompass consumers that are not technically savvy.

To understand the role that "middlemen" can play in the network economy, it is useful to consider the value created or delivered by middlemen in today's industrial economy. Broadly stated, these advantages do not relate to bricks and mortar, but rather to intellectual capital and people skills—intangible characteristics. This is what separates premier retailers from pedestrian retailers. It is precisely this value added that will survive the "frictionless economy."

Considering then the characteristics of a premier retailer (or wholesaler), one must begin with a commitment to customer service. Commitment to customer service can manifest itself in various ways and is often difficult to pinpoint yet, any person that has experienced both environments knows that shopping at Nordstrom's is different from shopping at K-Mart. Premier retailers also provide value through knowledge of products sold and fashion trends. Premier retailers also simplify the purchased transaction and maximize customer comfort and convenience. These values are quite distinct from the brick and mortar of the retail store. Indeed, the success of premier chain store retailers i.e., Nordstrom, demonstrates that the value created by commitment to customer service is largely independent of the physical facility. Instead, success depends on intangible characteristics.

Premier retailers also display the merchandise in interactive ways—products are "merchandised" and attractively displayed. This may be the most important differentiator among retailers, the virtual analog is providing the customer a very attractive, easy to use site.

If success depends on intangible characteristics, then those intangible characteristics should have some analog or replication in the virtual economy customer. An object of the present invention is to provide systems and methods that replicate the positive aspects of traditional retail and wholesale commerce in a virtual environment by providing a suite of tools that can be used alone or in combination to promote electronic commerce.

The solution is a custom when fully implemented, the virtual retail or Vetail system provides value for all classes of participants. Customers get personal service, i.e., become an intensive interaction and customized information through instant message technology. Customers also get once step shopping, a pleasant shopping experience when merchandise is displayed in an attractive way; ease of use, ability to make a single payment for an entire transaction; single payment for a basket of goods which may come from a variety of different merchants; a single transaction, a 24-hour, 7-day a week virtual retail experience in the possibility of participant in incentive programs that was made easier through the e-commerce aspect of the present invention.

In addition, in a fully networked economy there are opportunities for new incentive and promotional programs that take advantage of increased software, hardware and communication power of the Network Economy.

Customer award programs have been known for years. Early examples include programs such as the S&H Green Stamp programs and the like. Similarly, there are various known employee incentive programs for promoting the sales of products and services. Known incentive programs are often cumulative, that is awards are earned through the accumulation of "points" (which are referred to by different names such as credits, miles, dollars, stamps, coupons, etc.). Rules are established to determine how many points are awarded for each participant action and how many points participants must accumulate to be entitled to certain rewards. A sales incentive program, for example, might award a certain-number of points to participants for selling a designated dollar volume or quantity of products. When the participant accumulates a predetermined number of points during a certain time period, the participant is eligible for an award. The value of the award may also increase with increasing number of accumulated points. In known programs, the accumulated points may be used to purchase merchandise illustrated in a company catalogue, or to earn vacations. In some instances, the points are converted to a direct cash equivalent, which is distributed to the individual at predetermined time periods.

In the past 20 years, incentive programs have become more sophisticated and ubiquitous. Airline frequent flyer programs were among the first examples of computer-implemented customer incentives. Frequent flyer programs proved to be so successful building customer loyalty that it is practically impossible to operate an airline that does not have a frequent flyer program. With the aid of computers, incentive programs have been extended to credit card, debit card, smart card and point of sale incentive programs.

The increased availability of information technology, changes in regulations and recognition of opportunities available in incentive programs, have led many financial institutions to offer incentives to encourage participant activity that is deemed profitable by the financial institution, most commonly credit card use examples are known incentive programs include the American Airlines Co-Branded Visa Card and similar cards that are co-branded with an airline's logo. In such programs, the cardholder earns "frequent flyer points" through use of the card. In 1986, the Sears Financial Network introduced the Discover Card, which offered customers monetary rewards for using the credit card. Recently, similar incentive programs have been proposed for point of purchase transactions, debit card transactions and transactions over the Internet. Some known programs offer participants choices with regard to redemption of "points."

The American Express member reward program allows card users to accumulate points within a separate account. The points may be redeemed, for example, for a variety of awards and may be transferred into the frequent flyer programs of certain member airlines.

More recently card programs such as the GM card, the Ford card and the Driver's Edge card programs have been introduced. Under these programs, a co-branded card is imprinted with the sponsor's logo. The customer earns a rebate (e.g., 5%) for every qualified purchase of a wide variety of goods. Almost all goods are included, except for cash advances, transferred balances from other card accounts, credits, ATM withdrawals, fees, finance charges, and net purchases made after a maximum annual rebate has been earned. Promotional rebates, however, can be earned above and beyond the rebate cap. A customer may earn up to a predetermined amount, e.g., $1000 in rebates every year (every 12 consecutive months from the date the customer becomes a card member) and a maximum (e.g., $3,000 over a set period such as 3 consecutive years.) The customer can also earn an extra five percent promotional rebate when using the card at other sponsor companies (e.g., participating Hertz or Texaco locations, for example). Each rebate expires at the close of the calendar quarter 5 years after it is earned. The financial institution's system automatically keeps track of the rebates and a rebate summary appears on the customer's monthly billing statement. Customers may use rebates toward the purchase or lease of an eligible car.

Known cash rebate programs are different from pure "accumulation" programs. Sears issued the Discover card, co-branded with "Sears Financial Services" imprint on its face, in 1986. The card included an incentive program under which a user's account was credited with a 1% cash rebate on all purchases. If desired, the rebates were automatically credited to the card account. Other similar prior art incentive programs include the Execu-Charge Card, Citibank's CHOICE card and the J.C. Penny card and "Penny Points" program described in an American Banker article of Sep. 8, 1996. The Penny Points program involved the use of co-branded cards to earn "Penny Points," which could be redeemed for future discounts on J.C. Penny merchandise. For every five dollars in purchases spent using the card, the customer earned one Penny Point. When the customer accumulated 200 points, a 15% rebate certificate was issued and automatically included in the customer's statement. The certificate could be used for a 15% discount on merchandise at any J.C. Penny store. There are also a number of prior art patents directed to computer implemented incentive programs.

U.S. Pat. No. 5,025,372, for example, discloses a system and method for administration of an incentive award program through the use of credit cards. The specification describes an incentive program that would be used primarily in connection with typical trade incentive programs in which companies sought to stimulate sales or other business by means of incentive programs directed to employees or sellers of the company's products. Other portions of the specification suggest that the invention might be useful in other contexts that are now known, including an incentive award program for selling a certain quantity of a sponsor's product using computer processing, programming and printing for assignment and issuance of credit instruments to participants. In such programs, monetary amounts are awarded to participants for the purchase of a virtually unlimited variety of goods and services through the participants' credit instrument accounts depending on the participants achieving a certain level of performance.

The above-mentioned U.S. Pat. No. 5,025,372 focuses on the issuance of credit instruments to participants in the program. The incentive award program in uses computer processing, programming and printing for the assignment and issuance of such credit instruments including monetary amounts awarded to the participants for use in the participant's credit instrument account. Participants identifying information and credit instrument account numbers are stored in memory. The incentive program can then be divided into multiple time periods. The levels of performance are calculated and assigned for each participant for a monetary amount to be available for expenditure through the participant's credit instrument. The trade name or trademark of the company sponsoring the incentive program may also appear on the physical credit instrument and on statements provided to participants. Messages printed on the reports themselves or on other documents mailed to participants stimulate and encourage the participants to perform under the incentive program.

U.S. Pat. No. 4,750,119 describes a purchasing system with a rebate feature. The system is utilized by subscriber-purchasers, vendors providing goods and services, a future benefit guarantor such as an insurance company selling annuity contracts and in some cases an escrow agent. The purchasing system allows for the input of purchase orders from the subscriber-purchasers for selected goods and services and correlates the transfer of funds from those purchaser-subscribers to the various vendors selling the selected goods. In one instance, the transfer occurs between the subscriber-purchasers and the escrow agent. The future benefit guarantor supplies a rebate factor, which is input into the system. The system then computes and reports a rebate, which is due in the future to each subscriber-purchaser from the future benefit guarantor. The rebate is based upon cost of the individually selected goods and services and the rebate factor. The system provides instructions to pay the vendors for the selected goods and services and to pay the future rebate guarantor a premium representing the purchase price of the future guaranteed rebates. Preferably, the premium is paid on a daily basis to the guarantor and a group annuity contract is funded until the end of the fiscal year. At that time, the system further instructs the guarantor to issue individual future guaranteed rebate contracts to each purchaser-subscriber based upon the total rebates or total purchases over the accounting period.

U.S. Pat. No. 5,287,268 describes a centralized system of accumulating cash value for consumers based upon point-of-sale transactions with multiple merchants is disclosed wherein for each transaction, the consumer's account number (such as the Social Security number) which may be different from the consumer's credit card account number, for example, is transmitted to a central system along with data identifying the merchant and a credit value for the transaction. The credit value may be based upon predetermined incentives associated with the transaction such as coupons, rebates or discounts, and/or upon a credit rate determined by the merchant applied to the amount of the transaction. At the central location, a cash value for that consumer is incremented by the credit value and a bill value for that merchant is similarly incremented. Periodically, the merchants are billed for the accumulated bill value or credited for any third party incentive amounts confirmed at the central location. Also, at selected intervals, consumers are given access to their respective accumulated cash values by either a check in that amount or through a funds dispensing electronic terminal access or the like.

Under this program a consumer, upon making a purchase from a merchant will obtain a credit value equal to a portion of the amount of the purchase. The portion which is to be credited is determined at the time of sale based on a rate which may be selected by that merchant irrespective of the rate selected by other merchants and independent of a central authority. Alternatively, the rate may be based in whole or in part upon a pre-assigned rebate or coupon value such as from a third party, or a combination of pre-assigned and merchant selected factors. The credit value is then transmitted to a central system communicating with all the participating merchants, whereat the credit value is added to a cash value maintained for that consumer's account. At pre-selected intervals, such as on the occasion of the consumer's birth date, that consumer is given access to cash in an amount equal to the accumulated cash value. The credit value may also be added to a bill value maintained in an account for the involved merchant. The merchant may be periodically billed the accumulated bill value amount where consumer credit values are discounts or rebates from the merchant. The credit value is determined based either upon a coupon or rebate value amount input by the merchant at the time of sale and/or upon the amount-of the sale and the credit rate as input by the merchant. The determining credit value is then transmitted to the central system along with the consumer's account number and birth date whereat the credit value is added to the cash value maintained in the consumer account associated with the unique account number and the birth date. The consumer may then access the money through an electronic terminal for dispensing funds such as a bank terminal or the like which communicates with the central system to issue funds when the authorization is present. Alternatively, the central system may issue checks to the consumers.

U.S. Pat. No. 5,734,838 describes a database computer architecture for managing an incentive award program and checking float of funds at time of purchase and an advanced intelligent network based information distribution system including a central office switching system connected to communication lines including at least one service switching point for selectively providing switched communications between the communication lines, a network controller arranged for selectively providing control data to effect land line communications, and arranged separately from the central office switching system, an incentive award computer system provides an award to users participating in an incentive award program. The incentive award computer system includes a request transaction processing computer system receiving an electronic transaction by a user, determining whether the electronic transaction is a reward eligible transaction, and generating a transaction request when the electronic transaction is determined to be the reward eligible transaction. In addition, a points calculator processing computer system is provided that determines a reward responsive to the reward eligible transaction represented in the transaction request, assigns the reward to a user record responsive to reward criteria, and generates a reward record representing the reward. The incentive award computer system further includes a points assigning and reporting processing computer system that generates reports and provides access to the user record and the reward by the user responsive to predetermined criteria.

U.S. Pat. No. 5,689,100 describes a debit card system and method for implementing incentive award program for a customer having participants. A plurality of debit cards, each assigned to one participant and having a unique account number corresponding to an award account of the participant is part of the system. A bank filter processor accesses program data including data identifying the authorized unique account numbers of the participants, data identifying the authorized merchants and data indicating the balance in each participant's award account. The filter processor compares this program data to the following transaction data: the initiating account number of the card initiating the transaction, the merchant identification data of the initiating merchant, and the data regarding the amount of the initiated transaction. The filter processor generates validating data for the transaction when the evaluated transaction data indicates that the transaction has been initiated by an authorized merchant using the unique account number of one of the participants having a sufficient balance in the participant's corresponding award account to cover the transaction. Otherwise, invalidating data is generated.

Computer implemented incentive programs have also been used in casino gaming. For example, U.S. Pat. No. 5,795,225 describes a method and apparatus-for including a progressive jackpot component in a live casino table game. In addition to playing a live casino table game, each player makes an additional wager at the beginning of each hand that makes that player eligible to win all or part of a jackpot. If during the play of the hand a player is dealt a predetermined arrangement of cards, the player wins a preselected percentage of the jackpot amount. The jackpot is progressive in that un-won amounts of the jackpot carry over to the next hand. Apparatus is provided to receive each gaming token wagered for the jackpot component, to increment the jackpot meter which displays the jackpot amount, to decrement the jackpot meter whenever a winning hand is paid and to reset the apparatus for the next hand.

U.S. Pat. No. 5,915,244 describes a computerized incentive program having plateau pricing and a personalized bank-account system, and permitting remote award redemption is disclosed. In one embodiment of the invention, a computerized incentive-program system includes a pricing component, which converts a price of each of a plurality of awards into award levels such that each price within a particular price range is converted to a single award level. The system also includes a bank account component, which tracks an award balance for each of a plurality of participants and permits each participant to redeem at least a portion of the award balance for an award. Finally, the system includes a certificate component, which permits a program participant to remotely redeem a certificate having a value at least a portion of the award balance by identifying a serial number unique to the certificate, upon conclusion of the incentive program.

The present invention also relates to online incentive programs. Recently Web loyalty programs have been introduced in recognition of the facts that a) online consumers want to be rewarded for their loyalty, and b) profit can be derived from loyal web site users through advertising and joint marketing promotion. One such program, known as ClickRewards, rewards consumers with frequent flyer miles on all of the major U.S. airlines. Participants earn ClickMiles for completing activities on sponsor's web sites such as making a purchase to registering software. Participant's can then exchange their ClickMiles for frequent flyer miles on their favorite airlines, as well as other valuable rewards. In addition, Click-Miles can be combined with offline frequent flyer miles, making them even more valuable.

The underlying system is described in U.S. Pat. No. 5,774, 870. This patent describes a fully integrated on-line frequency award program. A user may access the program on-line and may browse a product catalog for shopping. The user may electronically place an order, upon which the program automatically checks the user's credit and electronically issues a purchase order to the supplying company. The program also calculates award points, updates the award account of enrolled users, and communicates that number of awarded points to the user. Enrolled users may browse through an award catalog and electronically redeem an amount of awarded points towards an award. The program then electronically places an award redeeming order with the fulfillment house and updates the user's award account.

Other programs are described in industry publications, including, for example

Moore, "Technology Explosion Shapes Marketing's Future", Bank Marketing, v24n5 pp:24-27, May 1992, Dialog file 15, Acc. No. 00615749.

Arndorfer, "More groups enhance credit cards to get up to speed in a tight race (credit unions offer promotions), American Banker, v160, n174, p. 22(1), Sep. 11, 1995, Dialog file 148, Acc. No. 08123473.

"Supermarket Update: Bank One Ready to Unite Electronic Payments with Vision value Shopper Cards", POS News, Sep. 1, 1993, Dialog file 16, Acc. No. 04590660.

"A little Battle Royal in the UK", Credit Card Management, Nov. 1994, p. 90, Dialog file 16, Acc. No. 05388649.

"Frequent-Shopper Plans Get a Chipper Look", POS News, Jan. 3, 1995, Dialog file 636, Acc. No. 02630357.

Fickenscher, "Star bank in Cincinnati offering air miles perk . . . ", American Banker, v159, n176, p. 23(1), Dialog file 148, Acc. No. 07816374.

Kleege, Stephen discloses an article entitled "In star Bank's flexible flier program, any airline will do", American Banker, v159, n1, p.12(1), Jan. 3, 1994. Dialog file 148, Acc. No. 07161362.

"Bank of Hawaii offers travel bonus", Honolulu Adviser (Honolulu, Hi., US) p. C1, Mar. 14, 1996. Dialog file 635, Acc. No. 0690801.

"Business Travel: Airline perks in peril . . . ", Financial Times (London) Jul. 11, 1994, p. 14, Dialog file 16, Acc. No. 05160615.

"Another chance for Chip cards", Smart cards may be ready to make headway in card-based payment systems, Credit Card Management, September, 1993, p. 30, Dialog file 16, Acc. No. 04679883.

"Point Blank Video Library: Uses 'Video Incentive Program' to boost video rentals", Video Store, Mar. 20, 1992, p. 46, Dialog file 16, Acc. No. 03701747.

"Debit Card News Debit Issuer Flies Right with Reward Plan", Bank Network News, Jan. 27, 1995, Faulkner & Gray, Inc., Dialog file 636, Acc. No. 02657159.

Notwithstanding the many existing programs that are currently known, there are problems with existing incentive programs. Known systems do not take full advantage of the personal communication and electronic commerce systems available for use by participating users and participating merchants in the Network Economy and are not capable of incentivizing individual participants in a precise way. Moreover, cumulative awards do not sharply discriminate between true brand loyalty and high demand. Instead, a group or herd approach is taken and incentives are equal for a large class of participants. Thus, a high volume user can benefit from participating in a number of competitive programs (e.g., programs offered by different airlines) without showing loyalty to any one sponsor. It is this type of high volume user that program sponsors find most desirable, however. The present invention provides a competitive advantage by allowing targeted incentives that can be used, for example, to capture the full loyalty of high profit customers.

Another challenge in the environment of electronic commerce is delivery of goods directly to a customer's home. On a national scale, delivery is typically accomplished through the United States Postal Service, or through one of the private couriers that operate out of certain hubs—FedEx, for example, ships all packages through a hub in Memphis, Tenn. However, such delivery modes are not practical for local delivery of certain goods, such as groceries, prescription drugs or meals from restaurants. Thus, there remains a need for a practical, efficient means of local delivery.

SUMMARY OF INVENTION

The present invention includes several discrete components that have utility by themselves, but can be used in combination to provide even greater benefit as a comprehensive suite of solutions for promoting and improving electronic commerce of many forms, including retail and business to business commerce, casino gaming, utility aggregation and more. As described herein, these components include an incentive program, a merchant finder and cellular position locator, a system and method for conducting sales agent assisted commerce involving one or more distributed vendors over networked computers, smart cards that are enabled for wireless connectivity and more.

The present invention provides virtual retailing system and method, i.e., a system and method for recreating, or simulating the positive components of the retail experience in a virtual transaction setting. The virtual retailing system of the present invention is based on the recognition that consumer purchasing decisions are not based entirely on price and convenience. For example, customer service can be a significant determining factor in customer purchasing decisions. The success of service oriented retailers in the non-Internet economy strongly suggests that consumers will pay premium for a more pleasant shopping experience. Naturally, the specific details of the shopping experience desired by any particular consumer can vary greatly. However, there are unquestionably lessons that can be learned from the non-Internet economy. To begin with, it is clear that there are certain sectors of customers that will not tolerate long waits or slow service. Moreover, there are other segments of consumers of the public that require a high degree of interaction to understand fashion trends and details concerning specific products. Even more significant, however, is the value customers place on information, i.e., help in identifying and filling their particular needs. Thus, conventional sales persons whether selling commodity products or haute couture fashion apparel provide a service—matching customers needs to products—that customer value. It is precisely the failure to recognize these idiosyncratic and diverse market segments that has resulted in the inability for e-commerce merchants to penetrate certain markets. To meet this unfilled need, the present invention provides a system and method for simulating the best aspects of the high service retail or other customer experience in an Internet or networked computer environment.

More specifically, the present invention provides a "virtual retail" or "vetail" experience through the use of networked computers, instant messaging technology, wireless connectivity and a distributed sales agent model. The present invention relates to a transactional system that includes four distinct classes of participants. The first class of participant is consumers that use the Internet or networked computers for shopping. The second class of participant is a set of distributed sales agents, which may be geographically distributed and have a wide range of areas of expertise. The third class of participant is the system operator or vetailer, which operates the Internet website. The fourth class of participant is the vendor or merchant that sells goods or services using the website.

In the preferred embodiment, the system operator operates a website or "virtual retail store," i.e., vetail store. The store may comprise, for example, a website which has a plurality of departments relating to different types of goods. Within each class of goods, the vetailer selects one or more merchants whose products will be displayed on the website. The vendors preferably have agreed to pay some form of commission to the vetailer for sales through the site.

For each of the various classes of goods or services offered on the site, there is preferably one or more certified sales agents. The sales agents are certified as having a prescribed level of expertise concerning the specific product for which they are certified. Eventually, any one particular sales agent may have expertise with regard to a variety of types of products. The certification of expertise may be made by the vendor or by the system operator, but in any case, the system maintains an association of the identity of the sales agent along with the areas of expertise for that particular sales agent. Once certified, the sales agent is provided access to additional information concerning the products, which may be shared with consumers in the manner described hereinafter. This additional information is preferably in the form of video, graphic or other sensory images of the products or information about the products.

In accordance with the preferred embodiment of the present invention, the virtual equivalent of the retail store is one or more displays that include a "display case" display portion for displaying the aforementioned detailed images or sensory images, sounds and other sensory information concerning the products available. The sensory images can be "pushed" by the sales agent to the customer using push technology. The display could, in accordance with another aspect of the present invention, allow virtual modeling of fashion items.

In addition, the display preferably includes some portion for displaying the dialogue between the sales agent and the customer. Naturally, the dialogue could occur purely through voice communication, but preferably some form of video, either text based or video conferencing, is provided. In addition, the website preferably includes a display of directory-type information that allows the customer to easily navigate to desired areas.

Finally, in connection with each department or class of goods, the system displays the sales agents that are currently available. This is done using the same technology as currently used in connection with "buddy list" or other related technology for determining the presence of a particular person or agent on the Internet.

In the context of clothing, or fashion accessories, the system preferably includes software, such as that used in Broderbund's Cosmopolitan Fashion Makeover Deluxe, that allows customers to enter their measurements, hairstyle and skin color on a virtual model to see how clothes might look on their body. This type of software could be used in many contexts to give customers an enhanced sensory experience.

One such system is described in U.S. Pat. No. 5,930,769 to Andrea Rose. This patent describes a computerized system that optimizes apparel fitting across manufacturers by allowing customers to select appropriate clothing for their body type by allowing them to "try on" apparel via virtual modeling.

Using this system and method of the present invention, a customer can enter the vetail website and select either a category product or a particular sales agent to deal with. If the customer selects a particular category of goods, they must select either their sales agent or the first available sales agent. A customer and sales agent then engage in real time dialogue either through video conferencing, instant messaging or voice over the Internet. Through this dialogue, the sales agent, which is a certified expert in connection with the particular goods, can provide high level information concerning the details of the specific products being considered by the customer. For example, the sales agent may know that PRADA shoes "tend to run a little large" or that ARMANI suits "tend to run a little small." The sales agent may also be an expert on current fashion trends, which can be of some value to the customer. The dialogue is enhanced by the ability of the sales agent to instantly display pictures of items being discussed on the customer's display. In other words, the system provides the ability for the sales agent to click on an individual product within their "display case" and have a full size image of that product appear in the "display case" portion of the customer's display. According to the preferred embodiment of the present invention, if the sales agent is certified for a certain class of goods, they are then given access to icons that generate the sensory images of the products available in a particular category of goods or services.

Through the system and method of the present invention, the customer receives an enhanced retail experience in several respects. First, the sales agent, as a certified expert, can provide useful information concerning the product. Second, customer has quick and easy access to detailed sensory images of products being suggested or discussed. In addition, the customer has a choice of sales agents so that if a customer develops a rapport with a particular sales agent they can request that sales agent.

In accordance with another important aspect of the present invention, it is also contemplated that the vetailer would carry the products of a range of vendors yet allow the customer to purchase a range of products through a single financial transaction. In this way, the vetailer provides one-stop shopping and added convenience for the customer. The service level can be even further improved if the customer can pay from an existing account balance or credit line so that the customer need not enter purchase information (such as account numbers every time they make a purchase).

The system also provides the electronic equivalent of a "customer service" department in that customers provide feedback concerning quality of their vetail experience either concerning a particular sales agent or other aspects of the site. This feedback could be used in several ways. First, feedback could be used in connection with an incentive system according to the present invention to motivate and reward sales agents. In addition, feedback could be made available to other customers to further enhance the information available to the customers and create an improved shopping environment.

One of the particularly important aspects of the present invention is that the sales agents need not be employed by or even closely affiliated with the vetailer. Instead, the sales agents can be highly distributed agents that, while certified, are only loosely affiliated with the vetailer. Thus, the role of the sales agent can be filled by a much broader range of persons since there is no need to require physical presence at certain times. Indeed, there is not even a need for regular or specific time availability. The sales agents could work, i.e., come on-line, whenever and wherever they wanted provided there was a sufficient number of agents to ensure coverage. Thus, it is contemplated that the sales agent function could be performed by a wide range of highly distributed agents including part-time persons that would never ordinarily consider entering the retail field, but as a consequence of the simplicity and lack of constraints on the present invention can share their expertise when and where it chooses to do so. It should be recognized, however, that too many agents on-line at any one time could be as problematic as failing to have a critical mass of sales agents. In particular, too many agents on-line could create customer confusion. The system preferably includes one of a variety of ways to alleviate such confusion. In one embodiment, the system blocks sales agents from entering the site once a predetermined maximum number of sales agents is on-line. In another variant, the system puts excess agents on hold and allows them on-line as openings appear. In another variant, the system randomly assigns agents to customers unless the customer requests a specific sales agent.

In accordance with a preferred embodiment, however the system assigns one or more rankings to the agents and assigns the sales agents to the customers based on these rankings. The rankings could be based on customer satisfaction, sales agent frequency of appearance and loyalty to the retailer or any other objective factor. In this regard, a variable redemption rate incentive program according to the present invention could be used to allow agents to accumulate points that would give them preferences in entering the site. An incentive program could be used to encourage customers to provide feedback used to rank sales agents.

The variable redemption rate incentive system could also be used to determine the commission rate or value of commissions earned by the sales agents. In one embodiment, the sales agents earn "points" as commissions and the cash redemption value of those points at any given time is determined by the sales agent's redemption rate. The redemption rate could be affected by objective criteria such as frequency of or consistency of showing up for "work" or subjective criteria such as customer reviews.

To make it possible to use highly distributed unaffiliated sales agents, it is necessary that the vetailer be responsible for maintaining the integrity of the financial transaction. This requires a separate channel through which financial transactions are conducted so that the sales agent (responsible for the financial transactions) is taking all the above the present invention comprises a system and method that includes a plurality of consumers, a plurality of sales agents, a plurality of vendors and at least one system operator. The customers, sales agents, vendors, system operator are all connected to a network of interconnected computers. The system further includes means for generating a customer display and a sales agent display. The system further includes one or more databases for storing information such as the identity of sales agents and the areas of expertise for each sales agent. Identity of customers and the form of payment customers will make is also stored.

The system and method for conducting sales agent assisted commerce involving one or more distributed vendors over networked computers has various features. To begin with, customers can pay for all merchandise in one transaction (even if goods come from various merchants and or even different web sites. Orders from different merchants are coordinated to improve the efficiency and cost effectiveness of shipping. The personal shopping agent has access to a customer database that contains all personalized data, such as, preferences of the customer, relevant holidays for the shopper, birthdays of family members. The personal shopping agent or retail assistant corresponds through a global network (e.g., the Internet) using voice, video, instant messaging or some combination and possibly including other sensory information to replicate the positive aspects of a non-virtual purchasing experience. The virtual retail store displays a "Buddy list" of the sales agents available. The sales agents can work anywhere in the world and can work whenever they want 24/7 and are paid on commission. In one form, anyone can be a virtual sales rep provided they bring sales to the "virtual store"—the virtual store is a "middle man" but it can compete by obtaining discounts from vendors. The critical aspect of this invention is allowing customers to feel a sense of personal service in a normally impersonal medium.

In accordance with the present invention, the virtual retailer (Vetailer) gets a discount from the web merchants and is able to provide the customer with goods at a competitive price. Also, the Vetailer or system operator can make arrangements with hub and spoke type courier services to optimize assembly and delivery of orders to customers. An important aspect of the present invention, is finding independent contractors to act as sales agents or personal shoppers and to structure an arrangement whereby the system operator (Vetail store) is a source through which transactions pass and the Vetailer obtains its revenue by taking commissions as transactions that pass through the system administrated by these system operator (Vetailer). Thus, in accordance with the present invention, participating merchants agree to provide a discount or commission for sales by the Vetailer. Secondly, the sales agents/personal shoppers are independent contractors that are familiar with the goods and can answer customer questions via instant messaging, for example. The sales agents/personal shoppers obtain a commission and can work whenever they want from where ever they want. Thirdly, the customers that find this system most attractive would be those customers that want personal advice from knowledgeable people. Of course the potential customer base varies depending on the types of goods involved. In the case of commodities, there is only a small portion of the purchasing population that requires personal service. In case of high fashion goods, on the other hand, there is a great demand for personal advice from knowledgeable people.

The systems also provides a way for customers to pay for all goods in a single secure transaction—most preferably by maintaining an account with the Vetailer that may be debited immediately upon the purchase.

The system operator maintains a web site offering selected goods from other merchants and selects and coordinates the use of sales persons/personal shoppers and coordinates commission structures so that everyone is satisfied. Naturally, the incentive program of the present invention could be used to motivate and ensure appropriate behavior by each of the participants.

The virtual retail or Vetail system of the present invention provides a value for all classes of participants. Customers get personal service, i.e., intensive interaction and customized information through instant message technology. Customers also get one stop shopping, a pleasant shopping experience where merchandise is displayed in an attractive way with sensory information provided to the greatest extent possible; ease of use, ability to make a single payment for an entire transaction; single payment for a basket of goods which may come from a variety of different merchants; a single transaction, a 24-hour, 7-day a week virtual retail experience and the possibility of participant in incentive programs that was made easier through the e-commerce aspect of the present invention.

The merchant gets distribution, sales volume and outsourcing of costly activities such as payment collection etc. The virtual retailer gets a discount from merchants or perhaps at wholesale price and can make money through a retail markup on the goods.

The personal shoppers or sales agents get commissions on sales they generate and the freedom to work when and where they want.

The system could, especially when not fully implemented, also require certain sacrifices. For example, the customer might sacrifice lowest possible price. Likewise, the merchant has to make some sacrifice in terms of price in order to achieve the outsourcing benefits provided by the system.

The virtual retailer (Vetailer) provides a buying function that is an analog to the buying function of a conventional retailer. In other words, the Vetailer selects merchandise as goods to be sold ideally, this is not just a hodge-podge of merchants that have agreed to pay the required commissions, rather a well thought out strategic presentation of merchandise that provides great customer value.

A critical aspect of the virtual retail system in the present invention is transport (through Java Script or HTML, for example) of selected web pages/product descriptions of others within a window (frame) at the same time a real-time dialog is occurring. From the customer's vantage point, this could be viewed as display of goods in a virtual display case as dialog occurs. The salesperson might say, for example, "let me show you what we have" and instantly product descriptions appear including full motion animation and many other sensory output that is made possible through the technology of the sales agent and customer. It is important that the system operator (Vetailer) controls who is an authorized sales agent. The system allows different levels of access over a public network system including sales agent; customer; vendor (can alter their product line); buyers select merchandise to be displayed.

Thus, the system the present invention provides a system and method for matching knowledgeable shoppers with shoppers that need or value the assistance of an experienced shopper. The experienced shopper can be a representative of a particular vendor or vendors, a retail or Vetail sales person or an independent contractor.

The personal shopper is familiar with the specific products and trends and therefore has information of value. In essence, the system relates to the sale of information that the present invention relates to a way of tapping into a vast store of information that has largely unused today, i.e., the accumulated knowledge of independent shoppers and delivery of that information to persons that are willing to pay for the information.

In accordance with another aspect of the present invention, the system operator allows users to poll other users and/or personal shoppers. This is different from polls posted by the system operator. In particular, the user can post a query (either on a "bulletin board" or by sending messages to the desired participants. To assist the system operator in identifying appropriate poll recipients, the system operator can create and post predetermine recipient group that have some common interest, talent or affinity.

The personal shopper is familiar with the specific products styles and trends and therefore has information of value. In essence, the system relates to the sale of information in that the present invention provides a way of tapping into a vast store of information that has largely unused today, i.e., the accumulated knowledge of independent shoppers and delivery of that information to persons that are willing to pay for the information.

In the system, personal shopping agents are certified in access to "virtual display case"—the ability to display product descriptions or photos on demand in a portion of the display dedicated to displaying goods. Also, personal shoppers can represent certain product lines.

Fashion is driven by the collective desires of the consumers. There are certain persons and things that influence trends, but trends can not be dictated they result from the input of many players in the market. The present invention makes it possible to tap into the collective wisdom of these trendsetters.

The system is widely applicable because many customer decisions are based on "fashion." In particular, in making purchasing decisions consumers often look to. In the online environment there are only limited examples of ways providing this advice. There is, however, a tremendous amount of untapped potential.

To begin with, much of the accumulated "know how" that accounts for fashion trends is distributed among a large number of individuals that are not employed in the fashion industry—namely savvy, devoted recreational shoppers. These individuals enjoy shopping, but do so only to satisfy their personal needs. Shopping as a hobby. Through the pursuit of hobby shopping and review of fashion related literature as well as day to day interaction these people have developed a keen sense of fashion trends and a high level of knowledge concerning certain products—For example,—Polo shirts "run a little small" or PRADA shoes are built large.

There has, heretofore, been no systematic way to tap this knowledge base. Moreover, while individuals are often more than willing to share this knowledge—they are often reluctant to enter the conventional work world because of other commitments.

The system of the present invention makes it possible to tap this knowledge base by creating an incentive for individuals to share their knowledge to the greatest extent possible. The distributed sales agents are a vast source of knowledge largely untapped knowledge. Using this knowledge, the sales agents can act as personal shoppers to provide product specific knowledge, such as nuances or characteristics of products. The sales agents also provide knowledge of treads, either generally or in market segments (geographic, demographic or product segments). The sales agents are also trend setters, have knowledge of particular customers.

This type of sales agent is likely to appeal to various customers including customers interested in leading edge advice, customers that want a personal touch or maximum convenience and do not want to spend a lot of time searching for a gift, customers that want specific impartial advice concerning certain products. The system is applicable to a wide range of commerce, but offers particular advantages for high end vendors that sell products that "go" with other company products." Often such vendors find it is not practical to operate at a one stop shop independently yet customers desire for one stop shopping could lead customers away from individual.

One problem with the credit card incentives is that savvy users can take advantage of the system by making charges to earn rewards and then consistently paying off their balance in full so that the financial institution does not make any money. In such instances, the customer and merchant both benefit, but the financial institution does not have an incentive for maintaining the program. One solution is to require a merchant to fund the rebate entirely, if this happens, then the merchant might implement a program that makes awards regardless of the form of payment and the financial institution loses a valuable tool for increasing its credit card base. A more elegant solution, according to the present invention, is to implement an incentive program that allows for the discrimination between profitable customers and non-profitable customers that allows the financial institution to reward (and thus retain) profitable customers, while minimizing the reward to less profitable customers.

A multi-tier variable redemption rate program according to the present invention allows a financial institution to provide an added incentive (in the form of a higher redemption rate) to customers that are profitable (e.g., those customers that maintain a revolving balance in their account) while at the same time minimizing the reward to non-profitable customers like for example, reducing their redemption rate. In one embodiment, a customer's redemption rate is incremented every month that the customer maintains a balance on their charge card account. When a customer pays off their entire balance, on the other hand, the redemption rate is either decremented (decreased by a pre-determined amount), decreased by a percentage of the difference between the current rate and the base rate or automatically reduced to the base rate or some other rate that could, in accordance with another aspect of the present invention even be less than the base rate. In this way, it is possible to use the incentive targeted for desirable customers with greater precision than the conventional systems.

It should also be apparent that the system could be used to provide a redemption rate based on the size of a user's revolving balance. This would prevent a situation where a user maintains a minimum revolving balance to increase the redemption rate.

The present invention provides a system and method that can be used both to enhance existing award programs and to support development of entirely new incentive programs. The system and method is preferably implemented by one or more computers programmed to perform processes according to he present invention.

An important aspect of the present invention is the use of an individual participant redemption rate that is separately calculated for each participant in the incentive program.

For clarity of description, the two-component incentive program of the present invention may be considered as consisting of two distinct incentive programs operating in parallel. The first is a "Base Program," which can be modeled based on any known "points" type incentive program. The second of the two programs is a "Variable Redemption Rate Program" under which the value of points accumulated under the first program (Base Program) can vary according to a distinct set of rules. Though these programs can be considered as distinct from one another, it is possible to structure the program so that the distinction is not evident to the participants.

Under the base program, each participant within the system has an identity, and an ability to participate in the Base Program (or existing award programs) so as to earn "points," which can be referred to under other names, including miles, dollars, credits, etc. Points are awarded based upon rules that are widely applied across a wide class of participants. Thus for example, everyone flying the airline shuttle between Washington, D.C. and New York earns 1,000 miles for the flight regardless of whether the participant is a one-time user that had no choice but to take the flight or a weekly flyer whose continued patronage would be very valuable.

Most "frequent flyer" programs by their very nature reward frequent customers. In particular, the programs are cumulative so that awards accumulate over time. In some programs there are bonuses for passengers that travel a certain number of segments within a prescribed period. Conversely, many programs "expire" points after a certain period of time, without regard to the loyalty of the customer. All of these programs are ham handed ways of attempting to incentivize participant action with greater precision and create more intense participant loyalty.

In contrast, the addition of a variable redemption rate program component according to the present invention provides an incentive system and process that allows precise encouragement of specific participant action and makes it possible to create more intense participant loyalty. In an incentive system and process according to the present invention, participant earnings, whether miles, cash or points, are treated as base points (BP) that are multiplied by a customer specific redemption rate (R) to convert the base points into participant rewards.

The two component incentive program is multi-dimensional in several respects. First, the two completely distinct reward programs' components—the Base Program for earning points and the Variable Redemption Rate program for adjusting each participants individual redemption rate—are fundamentally distinct since the base awards program is cumulative whereas as the redemption rate program is transitory in that the redemption rate can be adjusted up or down very quickly (or slowly) depending on participant action or inaction. This introduces an opportunity to incentivize the timing of participant actions that is well beyond anything that can be done with conventional incentive programs. Though the reward program components are distinct from one another, both components can apply to the same participant action so as to enhance or dampen the incentives in a single program. Since each program component can affect the value of rewards offered by the other program component, there is an opportunity to achieve tremendous synergism by optimizing participant action.

As an example, consider that a loyal customer in a conventional program is likely to have accumulated many "points" in that program. Now consider the incentive that would be created by the possibility of increasing the redemption value of all of these accumulated points by 50% or even 100%. The combined results of the two programs thus offer the ability to provide the greatest incentive to the most important (profitable) participants.

The ease of quickly reducing a participant's redemption rate can be used to reward participant actions such as brand loyalty, profitability, consistency and frequency of use, that are desirable from a sponsor's vantage point. The variable redemption rate can also be used for special promotions or to compensate participants for poor performance by the sponsor. As one example, the variable redemption rate can be used to gain and maintain participant loyalty by rewarding consistency with incremental increases and discouraging lapses in loyalty through punitive decreases in redemption rate. Moreover, when used in conjunction with technology, such as a smart card that allows the program administrator to monitor the participants actions more closely, it is possible to structure a program that creates a disincentive (such as a reduction in redemption rate) for shopping at a competitor's store or buying a competitor's product. Other applications, some of which are described below, will be apparent to those skilled in the art.

The present invention is applicable to existing reward programs such as airline reward programs, credit card reward programs, point of purchase reward, internet loyalty reward programs and like. Base points (BP) can be any form of accumulated reward, including for example airline miles, cash awards, ClickRewards, points, accumulated winnings, accumulated losses, etc.

As noted above, base points earned are converted to reward points based upon a customer specific redemption rate according to the following formula:

$$BP*RR=RP$$

The Redemption Rate (RR) is transitory in that the redemption rate (RR) can be adjusted up or down very quickly (or slowly) depending on participant action or inaction. The customer specific redemption rate (RR) has a base value (BRR) such as 1:1 for a new purchase, but RR can be incremented or decremented to reward certain desirable participant action and penalize or create a disincentive for certain undesirable activity.

In accordance with another aspect of the present invention, the starting redemption rate or base redemption rate (BRR) may be the same for all participants or may be different for different participants. This offers the possibility of rewarding participants in yet another way by awarding customers with a permanent or temporary base redemption rate that is greater than 1:1. This additional feature is made possible by the fact that a base redemption rate is associated with each participant to allow calculations based on the base redemption rate.

The system architecture supporting the system can vary widely from a centralized system, a system that runs in parallel to an existing reward program, a completely integrated reward system, a distributed network system employing personal chip technology and an object oriented system.

The individual participant redemption rate can be stored on a participants personal chip (in a smart card, mag card, Java ring or the like) or maintained by the program's sponsor or can be maintained separately by an organization that provides individual participant redemption rates for a wide class of participants in various programs sponsored by organizations that are willing to accept enhanced customer redemption rate. In addition, the personal chip functionality can be combined with a personal digital communication device according to the present invention to provide added functionality.

Consistent with the present invention, an organization (e.g., incentive company or system operator) that is independent from traditional reward program's sponsors (e.g., airline or bank) can maintain a database or databases that contains the identity of customers and a redemption rate associated with each participant. The incentive company operates a computer-implemented system, according to the present invention, that allows the customers to build up their redemption rates through certain participant action (or inaction). For example, participant actions resulting in the awards may be performed online or reported over the Global Information Network or Internet. The entity (e.g., incentive company) that maintains the participant redemption rates, also has a communication link with the reward program sponsors so that a participants redemption rate can be reported upon request. In this way, a wide range of program sponsors can quickly query a single source to obtain a participant's specific redemption rate as needed Alternatively, participant redemption rates may be calculated and maintained individually by reward program sponsors. The use of individual participant redemption greatly enhances the ability to target specific action by making possible to incentivize in dimensions that it not previously been available.

In a network economy, the information is available to know what your customer wants and get this information to the factory floor. One example of this is the Dell Computer system for building computers on demand so that there is no need to guess as to customer preferences. This process, referred to as mass customization, depends on modularity—the ability to satisfy many distinct needs with a certain defined kit of components or services. By allowing customers to select among a defined kit of components or services, it is possible to get precise information as to what customers want (because they tell you). Moreover, that customer's selection represents an investment in time spent customizing the product to their needs that increases the likelihood of retaining the customer as well as providing valuable information for the merchant that receives the information.

In accordance with the present invention, an incentive program (such as variable redemption rate program) or other program can be designed to allow the participant to select a level of commitment to the sponsor in both the mass market and business to business context. The higher the level of commitment, the better the rewards, the greater the penalty for violating the commitment. For example, a gas station might offer a five percent rebate to customers that agree to buy all gas needs from them, but reduce the rate sharply if the customer fails to live up to the commitment. To prevent discouragement, the customer could be a small number of "mulligan's" or chances to try again. In accordance with another example, a bank might allow customers to obtain selectively higher rebates on credit card purchasers as they open different types of accounts (strengthen their relationship) with the bank. In one simple example, a customer might be given a 1% rebate just for having the card. If the customer opens a checking and savings account, the customer would be given a 2% rebate. If the customer opens a retirement account the rebate rate would be increased to 3%. Other programs could be designed to allow customers to tailor a variable redemption rate program to their desired level of commitment. Likewise, in the business to business context, businesses can use customized incentive programs to gather valuable information, namely find what their customer's really want and the level of commitment the customer's are prepared to make, and also attract and retain customers. The significant point is that the customer is allowed to build their own incentive program by picking and choosing among a suite of available incentive program features.

Thus, the present invention offers mass customization of E-commerce incentive programs. In effect, merchants are able to say to customers if you are willing to commit to this, we will do this. Users are allowed to build their own incentive program by selecting from various options or, in accordance with yet another aspect of the present invention, submitting a bid to the sponsor. Thus, a user might be able to propose incentives to various merchants, i.e., "if you increase my redemption rate to X, do the following—." The sponsor can then accept, reject or counter-offer the proposed incentive program.

The present invention also provides an incentive that can be used in conjunction with electronic commerce through instant messaging to improve the customer experience through improved customer service and satisfaction. This is achieved by creating incentives for sales agents and rewarding consumers when the merchant fails to deliver the expected level of service and satisfaction.

The system of the present invention also provides for "Instant" Redemption of rewards to improve the perceived value of the incentive program.

The program of the present invention can be applied to a wide variety of economic activity, but is particularly useful in the context of activity involving electronic transactions. Thus, for example, the present invention is applicable to airline frequent flyer programs, mass transit loyalty programs that use electronic payment, credit card/debit card reward and rebate incentive programs, point of purchase system, retail loyalty programs, Internet site/portal loyalty programs, programs for improving the utilization of assets ranging from utilities to electronic payment (commerce) to casino gaming.

The incentive system may also be used in the context of business to business commerce. Participants in this context are businesses that buy from the sponsor. Loyalty and consistency programs are especially useful. A variable redemption rate system can be used to reduce cost to the participant by rebate or discount. In particular, it is known to provide discounts according to volume of past purchasing history. With the present invention, however, it is possible to automatically provide discounts for other desirable actions such as loyalty and consistency of purchase according to a set of objective rules that are monitored and enforced automatically.

In the case of discount, the amount of discount is inversely proportional to redemption rate (unless redemption rate is negatively incremented (decremented) for actions that are encouraged). To simplify matters, each customer could be assigned a discount rate that varies incrementally according to the objective rules of the particular program.

In the business-to-business context, it is easier to track participant's actions with current technology. Examples of actions that could, in accordance with various aspects of the present invention, be incentivized, include consistency of purchases and loyalty. Consistency of purchases could be rewarded (through increases in a customer's discount or redemption rate), every consecutive week in which an order is placed. Loyalty could be rewarded by increasing the participant's redemption (or discount) rate for not purchasing from competitors or from purchasing in response to special motions. Here, the redemption rate could, in accordance with another aspect of the present invention, be tried directly to a discount. Thus, if a participant has a redemption rate of seven, they will be allowed to buy goods or services in 93 percent of the normal cost (100%–7% discount). Alternatively, the redemption rate could, in accordance with another aspect of the present invention, be used in combination with rebate program in which participants earn rebates from sponsors and the value of those rebates could depend on redemption rate as described previously.

The present invention is particularly well suited for use in conjunction with smart cards, digital cellular phones, personal digital assistants and other emerging infotech hardware.

In addition, the present invention provides a cellular position locator that can be used in conjunction with personal digital communication devices, including existing digital cellular handsets or personal digital assistants with digital communication capabilities, and takes advantage of data available from existing cellular network infrastructure. The cellular position locator can be used to promote selected merchants (which should be understood as encompassing merchants, vendors and service providers) through an electronic directory. The electronic directory is preferably accessible through the Internet so that merchants can upload information as desired and multiple phone networks (including fixed networks, if desired) can access the same databases.

Personal digital communication devices according to the present invention may be co-branded and provided with hardware and software features to promote the sponsor's business. The cellular position locator can be used for other purposes as well and can be used in conjunction with the points-based incentive programs of the present invention.

As noted above, the present invention makes it possible to create incentives for efficient use of equipment that is in great demand by rewarding frequent use of the equipment. This is particularly useful in the context of casino gaming machines in which equipment may be occupied by a player (in the sense some one is sitting in front of a machine (or table) and preventing use by another customer), but not used (in that the game is not actually in process—a bet is not being made). At peak times, there is often be a shortage of machines such that delay in use of the machines will result in loss of revenue to the casino. Thus, in accordance with another aspect of the present invention, an individual participant redemption rate can be used to reward customers that use equipment efficiently. In the case of a slot machine, for example, a customer can be rewarded for playing the machine within a predetermined time period from the last game or penalized for taking too long to play or quit. Similarly, the system and method can be used to create additional incentives to motivate certain participant action.

The use of wireless connectivity according to the Bluetooth protocol detailed below (or a similar protocol) is also useful in the context of casino gaming. To begin with, wireless connectivity enabled smart cards of the type described herein could allow casino patrons to wager without using cash or credit, but instead by simply using a debit card. A more sophisticated application could include "smart playing chips" used with a "smart table." The smart playing chips of the present invention are, in reality, wireless computers that contain an electronic monetary value or communicate with a nearby computer containing a monetary value. The smart playing chips also communicate with the gaming table on which they are used so that the table can read the location of the chip on the table and the monetary value of the chip. The chip could contain a plurality of monetary values reflecting a player's "BALANCE AMOUNT" and "BET AMOUNT," for example. The chip could also display one or more of the monetary values stored thereon. Finally, the chip could include a user interface that would allow the user to alter, for example the "BET AMOUNT." In use, a player with a wireless communication enabled smart chip can set the chip to a certain bet value (which must be less than or equal to the monetary value available to that chip's owner) and place the bet by locating the smart chip on a location within the gaming table (which could correspond to a specific bet on a crap's table, a roulette table or a blackjack game). The gaming table is also wireless communication enabled and designed so that the table can recognize both the location of the chips (and hence the nature of the bet) and the amount of the wager. When the outcome of game is determined, the system credits are debits the smart chips in play according to the results of the bet. With the use of smart chips as described above, a casino can greatly increase the frequency of plays and hence the utilization of equipment. Moreover, the use of smart chips and electronically stored monetary values makes it easier to use the incentive program of the present invention in connection with a wide variety of casino games.

Similarly, the system may be used to promote efficient use of utilities and allow formation of purchasing collectives.

The present invention provides a personal communication and electronic commerce system for use by participating users and participating merchants. The system includes a cellular communication network that includes geographically spaced base stations that communicate with, i.e., are linked to a fixed communication network. Users may have personal communication devices that can be used to allow transmission of a digital message generated on the personal communication devices by placing a call through one of the base stations and memory for storing a digital value corresponding to a monetary value. The personal communication device may also be used as a cellular position locator to determine one's geographic location and, if desired, to access information from a merchant information database containing information pertaining to a plurality of participating merchants located within the geographic territory covered by the cellular communication network. The merchant information may be stored on a database that is accessible by merchants so those merchants can add, delete or alter information contained in their respective listings. An incentive system is also provided for creating incentives for participating users to encourage desired participant actions. The incentive system comprises a computer implemented incentive program for encouraging certain participant actions. The incentive program includes a first reward program component under which participants may earn points for certain actions and a second reward program component through which the redemption rate associated with a particular participant is adjusted in response to certain participant action. The incentive program has a wide range of applications, including transportation, financial services and computer gaming.

More specifically, the present invention provides a personal communication and electronic commerce system for use by participating users and participating merchants. The system preferably includes: means for storing a participant ID for each of the participating users and a merchant ID for each of the participating merchants; a cellular communication network that includes a plurality of geographically spaced base stations that each have a base station identity and are each capable of communication with a mobile exchange that is in communication with a fixed communication network; a plurality of personal communication devices, each of the personal communication devices comprising: a unique digital code stored in memory that identifies the device; a display; a user interface for allowing an user to generate digital messages; a transmitter and receiver for wireless communication with the cellular communication network so as to allow a digital message generated on the personal communication devices to be transmitted by placing a call through one of the base stations and memory for storing a digital value corresponding to a monetary value; means for correlating the unique digital code stored in memory of each personal communication devices to a participant ID; means for transmitting a digital value corresponding to a monetary value to the memory of the personal communication devices; and means for creating incentives for participating users to encourage desired participant actions.

In accordance with another aspect of the present invention, the personal communication devices of the present invention are preferably equipped for wireless connectivity in accordance with the Bluetooth standard—a wireless "cable" chipset for connecting mobile communications products, portable computers and computer peripherals that is likely to be critical in the development of a wireless data marketplace.

Likewise the smart card of the present invention is also preferable equipped with a wireless connectivity chipset, such as one built to the Bluetooth standard.

Bluetooth can be used to connect diverse portable computing devices to establish ad hoc LANs and connecting portable computers to peripherals such as printers and fax machines, but its use in building a wireless data market is most significant in the context of the present invention.

Bluetooth technology creates ad hoc wireless networks among a range of devices, including smart phones, portable and desktop PCs, PDAs, printers, and just about anything else with the necessary logic. The interface itself is a short range, frequency hopping radio link, built into a small (9×9 mm) microchip, an antennae, and software. The Bluetooth signal operates in the unlicensed ISM band at 2.4 GHz; a frequency hop transceiver is used to counter interference and fading. Maximum throughput is 1 Mbit/sec. Time-division duplexing is used for full-duplex transmission, and data is encrypted and sent between devices with a streaming cipher. Bluetooth can support an asynchronous data channel, up to three simultaneous synchronous voice channels, or a channel which simultaneously supports asynchronous data and synchronous voice. While Bluetooth provides this new interface for a similarly new breed of smart portable devices, it also uses IEEE 802.11 for wireless LAN connectivity, allowing a compliant Bluetooth device to tetherlessly connect to existing LANs, also at 1 Mbit/sec. Hence, when integrated, Bluetooth might be used in place of an add-on wireless 10BaseT PC Card for a portable PC.

Devices that communicate in a Bluetooth ad hoc network form what is known as a "piconet". A piconet starts with at least two connected devices (such as a portable PC and a mobile phone) and can grow to as many as eight connected devices. All Bluetooth devices are peer units and have identical implementations. However, when a piconet is established, one unit will act as a master and the other(s) as slave(s) for the duration of the piconet connection. Further, multiple, connected piconets can be created, with each piconet identified by a different frequency hopping sequence. (All users participating on the same piconet are synchronized to this hopping sequence.) Within the piconet, there is a "sniff and hold mode" which allows synchronized devices to enter power-saving modes when there is reduced activity.

The Bluetooth approved service discovery architecture for version 1.0 of the specification supports a device proximity of about 5 meters (15 feet), which means that separate piconets can operate using the same frequency without interference, as long as the ad hoc networks are physically separate from one another. The architecture for version 1.0 provides device discovery, service discovery, service organization, and asynchronous notification-for an application looking for a device with a specific set of attributes.

Under the architecture for version 1.0, a Bluetooth enabled device can detect and communicate with all other version 1.0-enabled devices, without a central controller or arbiter. Devices can begin communicating without device-specific communication or human interaction. No previous knowledge about a device is needed to enable devices to discover the presence and attributes of nearby devices.

For service discovery, a device supplies two types of information: computer-meaningful attributes and human-meaningful attributes. Computer-meaningful attributes provide for automatic, hidden inter-device collaboration. Two devices that have been configured for automatic joint operation use computer-meaningful attributes to recognize each other and to perform their pre-programmed collaboration. For example, when a version 1.0-enabled camera and a version 1.0-enabled printer are brought into proximity, the camera can open a connection to the printer to image transfer and printing. Human-meaningful attributes are provided for use on PCs and PDAs. These describe device capabilities in the form of an icon, a device name, a device description, and perhaps a user guide.

Bluetooth enables users to connect a wide range of computing and telecommunications devices easily and simply, without the need to buy, carry, or connect cables. It delivers opportunities for rapid ad hoc connections, and the possibility of automatic, unconscious, connections between devices. It will virtually eliminate the need to purchase additional or proprietary cabling to connect individual devices. Because Bluetooth can be used for a variety of purposes, it will also potentially replace multiple cable connections via a single radio link.

Bluetooth transactions are secure, because Bluetooth has built in sufficient encryption and authentication and is thus very secure in any environment. In addition a frequency-hopping scheme with 1600 hops/sec is employed. All of this together with an automatic output power adaptation to reduce the range exactly to requirement makes the system extremely difficult to eavesdrop. Bluetooth technology will work globally. It works in the globally available spectrum.

The smart cards are also preferably equipped for biometric identification and authorization as explained herein.

The present invention also provides a position locator for determining the geographic location of any of the personal communication devices based upon the identity of the base station to which a digital geographic location query message is transmitted and displaying information concerning the geographic location of the personal communication device that transmitted the digital geographic location query message on the display of the personal communication device that transmitted the digital geographic location query message in response to the query transmitted from the personal communication device.

A correlation of base station to geographical location could, in accordance with another aspect of the present invention, be used to provide information to others (authorities or persons receiving calls) as to the caller's location. This could be an enhancement to called ID service if permitted.

The present invention further provides a merchant information database containing information pertaining to a plurality of participating merchants located within the geographic territory covered by the cellular communication network, each of the merchants having a merchant ID; and means for determining the merchant ID of all participating merchants located within a predetermined geographic proximity of each of the base stations and wherein the system can retrieve information pertaining to specific participating merchants from the merchant information database and transmit this information to participating users; and wherein merchant information is stored on a database that is accessible by merchants so that merchants can add, delete or alter information contained in their respective listings.

According to another aspect of the Merchant Finder System of the present invention, the query sent by the Merchant Finder could be treated as a request or solicitation for bids from merchants within the proximity of the user. Thus, in response to the query, the system finds the best value or values for the goods or services the user is interested in through a form of reverse auction. To some extent, the nature of the service will depend on the granularity of specific query available to the user, i.e., to what detail can the user specify a specific query. In some of the aforementioned examples, the user's queries are generic such as the nearest Thai restaurant in the area. However, if the user's personal communication device has sufficient storage and interface capabilities (or wireless connectivity with devices having this capability) so that detailed queries such as "red peppers" or "Miller beer" could be transmitted as the query, along with an indication of the base station from which the query originated, then the query could be applied against a database-containing price information for certain goods and the location of the stores. The system could thus provide the user with an indication of the best values within the specified range or ranges.

In the context of restaurants, the system could group various restaurants according to categories based upon some objective or subjective indication such as user's comments, published reviews and the like. Thus, in one example, the system keeps track of two-star Thai restaurants separately from four-star Thai restaurants. Then, when the user queries the system for the nearest Thai restaurants within the range, the system could notify these restaurants and allow them to offer a special value to attract the user. Again, the query initiates a form of reverse auction-type bidding for the user's business. The submission of queries for bid can allow both better utilization of the restaurant's facilities and maximum value for the user. Thus, the merchant locator could be used to allow customers to solicit bids from nearby vendors—so instead of offering a daily special, the merchant could offer on-the-spot special to individuals that call or match another vendor's specials based on the user's query.

The merchant directory could, in accordance with another aspect of the present invention, also be accessible using some other indication of geographical location such as zip code, address or any other code identifying the specific geographical location. For example, the user could, in accordance with this aspect of the present venture, access the database from a computer or home phone or from a portable personal communication device and manually enter a postal code, (or other geographic indicator) so that the system could by-pass the cellular phone locator function or the user could, in accordance with another aspect of the present invention, choose an alternative mode of identifying location. Alternatively, the cellular locator feature of the phone can be used to provide position information to another device that communicates with the personal communication device through wireless connectivity (e.g., the Bluetooth standard) so that other databases may be accessed, for example.

Likewise, the system of the present invention can be adapted to work with other databases based on other geographic indicators such as postal codes or the like by including a database that correlates base station locations to other indicators of geographic position, such as postal codes. In such an embodiment, each base station has a geographic locator code associated therewith, preferably in a database. The geographic locator code may be a zip code or any other code that specifies a particular geographic location. Queries are then tagged with the base station ID, which is converted or correlated to the geographic locator code. The geographic locator code is then used to access the database and retrieve results that are returned to the user.

The system could, in accordance with another aspect of the present invention, be operated as an automatic voice response system in two ways: menu-driven and entirely voice recognition driven. In the menu-driven version, the user would operate the system by verbally saying prescribed words. For example, the system would prompt the user "for restaurants press or say 'one,' for gas stations, press or say 'two,' etc. The user could also be prompted to press or say their zip code (terminal location) or the base station ID could be used to determine location. The advantage of a menu/voice prompted system according to this version, is that the voice recognition capability of the system need not be as great since the inputs are constrained by the menu prompts. With a menu-driven system, the prompts could be stored on the user's personal communication device and the responses could be digitally recorded for transmission to a base station when the query is sufficiently refined. In the currently preferred embodiment, however, the query would be entirely performed through the communication channel to maintain simplicity of the user's personal communication device or handset.

As an alternative, the system could, in accordance with another aspect of the present invention, be entirely voice recognition-driven. The system could, for example, respond to natural speech such as "where is the nearest Thai restaurant" or "tell me what are today's specials at Geppetto's." If the request is not fully understood or there is uncertainty, the system could, in accordance with another aspect of the present invention, prompt the user for clarification. "If you are looking for the nearest Italian restaurant, press or say 1, if not, press or say 2." The voice recognition system could also recognize spoken zip codes or other location codes including street names that assist the system in pinpointing the user's location. The voice recognition could also recognize certain basic queries such as, "where am I?" or "I need help" or "help me find something" as prompts to start basic functions as described before.

The present invention provides several significant advantages over known merchant directories. In this regard, it is notes that the Internet portal Yahoo has a "yellow pages" directory that allows users to locate merchants near them. The Yahoo directory is similar to the known GPS directory, except that location is manually input, i.e., a user enters a zip code or other geographic position indicator. The present invention, on the other hand, provides an automatic position locator function, so the user need not enter a name or address. While GPS directories provide position location, the merchant databases is maintained with the user and is limited in terms of capacity and frequency of updates. Indeed, the merchant database of both known GPS and Yahoo systems are static, or at least centrally maintained. The present invention, on the other hand, provides a database that is at least partially, decentralized. In the database of the present invention, the merchants maintain or update their own entries. This is not to suggest that there is not some central structure or organization in force so as to insure that the merchant entries are useful, but there is great value in having merchants police their own entries. Having merchants maintain their own entries insures that entries can be current to minimize the demands on the system operator that might otherwise limit the scope or substance of the merchant database.

Also, because the system of the present invention is linked to the global information network (GIN) or Internet, the system can "shop around" a user's query to various participating merchants so that merchants would have a chance to offer a special value or incentive to the user for choosing the merchant's services. In other words, the user's query could be treated as a request for bids from merchants that meet the criteria specified by the user, i.e., the user's query is subjected to a reverse auction on the fly.

The use of a dynamic merchant database, i.e., a merchant database containing entries that merchants can verify, update, or modify or even actively respond to user queries, will yield a database that is organic. Also, the user's hardware requirements are minimized since much of the complexity of such a system is separate from the user's personal communication device. In this aspect of the present invention, the user's personal communication device is functioning as the terminal to an Internet-based smart network. The system works with a handset that can be as simple as a conventional digital phone and has increased portability.

An essential aspect of present invention is the provision of a post and retrieve advertising system. The system includes a central database (basket) that either contains information or links to information (i.e., web pages). The contents of any particular merchant's "basket" or web page can be modified by the respective merchants so that each merchant can modify its own information but can't modify information of others. Moreover, there is standard information stored about each merchant that posts to the database that allows the system to retrieve information responsive to users' requests. This information about the merchant may be geographical location and type of product, it could also be caliber of service based upon prior user's recommendations, professional critics or other subjective rankings.

The system could store and retrieve information repetitive user information without direct or dynamic user input. Information that might be stored includes, the type of product the user is interested in (as determined by user inpu), most frequent user location or other input. This information would be valuable for marketing, if such use is acceptable to users. Moreover, since the information is stored users don't have to input information each time). The system also preferably includes means for tracking referrals to see if the user follows up on the referral. It should also be apparent that the system of the present invention can be used in conjunction with other systems. Thus, for example, a user query could be received, tagged with a base station location that identifies the geographic position of the user and then formatted into a query against an existing merchant database such as the Yahoo database. There are, however, simplicity advantages to linking the customer and the merchant by a single geographic indicator—base station location,—which is "close enough" but not so close that the range has to be expanded to make it useful. Thus, it should be appreciated that the system of the present invention offers several significant advantages. First, the merchant can update their own entry. Secondly, the base station location is "close enough" but to be helpful, but not too complicated. Moreover, the granularity of base station locations, i.e., the relative spacing of the base station locations, is likely to correspond to the density of development in any particular area. Thus, in accordance with important aspect of the present invention, using cellular base station locations as the geographic indication provides anor it's an automatic range adjustment. In more densely populated areas, the system will tend to find merchants that are located closer to the user since there are likely to be more such merchants. In areas where merchants are likely to be spread apart by greater distances, the base stations are also likely to be spaced further from one another.

It should be recognized that the merchant database or data need not be accessed through the global information network (GIN, Internet or web). As an alternative, the merchant database data can, in accordance with another aspect of the present invention, be downloaded to a smart card in an airport or hotel or some other remote location. Alternatively, a mag card can be provided to passengers as they leave an airplane. The mag card provided to the passengers might, for example, include free cellular airtime, at the same time, download information concerning participating merchants to the handset. The handset can, in accordance with the present invention, be designed to receive data (through infra red or wire transmission, e.g., Bluetooth protocol or by reading a mag card or other electronic storage device). The user can, in accordance with another aspect of the present invention, acquire comprehensive merchant listings for particular cities as either promotional item or a purchased item. The key is that the phone or personal communication device provides the required information as to the user's location so that the user need not provide this information. Again, the database under the present invention identifies merchants by their proximity to cellular base stations or other known cellular locations.

Moreover, the architecture of the merchant finder of the present invention is especially well designed for use outside of a user's home territory. Since position location is automatic, the merchant finder of the present invention is especially useful just when such assistance is most often required—in a location other than home where a user may not know his or her address or location and be familiar with local streets in the new city.

It should be appreciated that the voice queries could also be subjected to a reverse auction process. For example, the user might say "What are the best Italian restaurants in this area." Whereupon, the system will determine the user's location and search for vendors within the area. The query could be applied against a database-containing price and/or quality information for certain goods and services and the location of the merchants. If desired, vendors could be notified of the query and allowed to make offers. The vendors can be ranked based upon price, customer satisfaction or some other criteria. The system could thus provide the user with an indication of the best quality or values within the specified range or ranges.

In the context of restaurants, the system could again group various restaurants according to categories based upon some objective or subjective indication such as user's comments, published reviews and the like. Thus, in one example, the system keeps track of two-star Italian restaurants separately from four-star Italian restaurants. Then, when the user queries the system for the best Italian restaurants within the range, the system could notify the restaurants in the highest category and allow them to offer a special value to attract the user. Again, the query initiates a form of reverse auction-type bidding for the user's business. The submission of queries for bid can allow both better utilization of the restaurant's facilities and maximum value for the user. Thus, the merchant locator could be used to allow customers to solicit bids from nearby vendors—so instead of offering a daily special, the merchant could offer on-the-spot special to individuals that call or match another vendor's specials based on the user's query.

Other user interface options include use of a roller ball built into the personal communication device or a video phone interface. Use of a video phone interface would allow the personal communication device to be used in connection with the virtual retailing aspect of the present invention.

The database could, in accordance with another aspect of the present invention also include merchant rankings based on various types of feedback including user responses, professional critiques, etc. In accordance with another aspect of the present invention, however, the personal communication devices could be used to solicit and gather feedback. With this feature, for example, the system queries the user a pre-set time after a user has made a request using the system: "Did you visit the merchant?" Yes/no. This query is exemplary since the question might not be necessary, if the user's personal communication device includes a personal chip (smart card) that records where the user shopped (if yes). Further queries could include: How would you rate the experience? (1) outstanding; (2) good; (3) fair; (4) poor. Alternatively, the evaluation could be as simple as "favorable," "unfavorable" or "neutral." The user could, in accordance with another aspect of the present invention be rewarded for responding to this "survey" through points for an adjustment in the respective redemption rate or through free communication time. The merchants could, according to the present invention, be rated based upon these responses and could, in accordance with another aspect of the present invention, be rewarded using the reward system of the present invention for consistently good service.

Consumer or professional rankings gathered and associated with merchant rankings as described above, could be used to categorize merchants so as to allow the system to separate merchants fitting the same general description even further. Thus, the system could maintain separate records of Italian restaurants that are rated outstanding versus Italian restaurants that are rated fair. This would be particularly helpful when conducting a reverse auction in response to user query. Thus, for example, when a user requests the location of the nearest Italian restaurant, the system can provide useful information concerning the quality of service to be expected. Likewise, since the system can take a user's query and use the query as a request for input and bids or proposals or special offers it is helpful to compare quality or level of service as one factor and making a final determination.

Because the system has the capability of obtaining customer impressions of the service or goods offered by a wide variety of merchants (through instant polls and incentives) it is also possible to store this information in a database (such as an SQL database, for example) and then identify customers with common responses to the vendors. The present invention also provides an intelligent recommendation system based on impressions of "similar" customers.

One of the principal advantages of using cellular phones as personal communication device is that the hardware is already in place. This gives the system a chance to become embedded in user's lifestyle so that as hardware improves, users can be transitioned to systems they know. Use of an incentive or loyalty program will strengthen this bond.

One of the principal obstacles faced through the use of conventional cell phones, is the speed of data transmission or the cellular network. There are, however, efforts on the way to improve this transmission speed. The amount of data transmitted is preferably selected based upon the capabilities of the participant (user) hardware. As mentioned before, one advantage of the system of the present invention is that demands on the user's handset or personal communication device are minimized. Most processing is done at a remote location in response to simple commands so that the speed of data transmission is not a significant limitation on the ability to query the system. Data transmissions can, however, limit the nature of data down-loaded to the personal communication device through response to a query. Naturally, the system of the present invention will be even more advantageous as the speed (rate) data transmission over the cellular network increases.

The present invention also provides a system and method for creating incentives for participating users to encourage desired participant actions preferably includes a computer implemented incentive program for encouraging certain participant actions, the program comprising: a plurality of participants; a participant ID associated with each participant; a redemption rate associated with each participant ID; a first reward program under which participants may earn points for certain actions; a second reward program through which the redemption rate associated with a particular participant is adjusted in response to certain participant action.

The position locator of the present invention preferably comprises a cellular position locator system for use in connection with a cellular communication network that includes a plurality of geographically spaced base stations that each have a base station identity and are each capable of communication with a mobile exchange that is in communication with a fixed communication network. The cellular position location system comprises a plurality of personal communication devices. The personal communication devices each include: a unique digital code stored in memory that identifies the device; a display; a user interface for allowing an user to generate a digital geographic location query message; a transmitter and receiver for wireless communication with the cellular communication network so as to allow a digital geographic location query message generated on the personal communication devices to be transmitted by placing a call through one of the base stations. The system further includes means for determining the geographic location of any of the personal communication devices based upon the identity of the base station to which a digital geographic location query message is transmitted and displaying information concerning the geographic location of the personal communication device that transmitted the digital geographic location query message on the display of the personal communication device that transmitted the digital geographic location query message in response to the query transmitted from the personal communication device.

The user interface of the personal communication devices preferably provides the user with a sequence of generic menu choices that become progressively more specific so as to narrow the user's particular query and wherein the menu selections generate a digital geographic location query message that is stored in memory before transmission to a base station.

The personal communication devices may include a range selector through which the user can adjust the geographic range to be queried. The devices preferably include an easily understood model (representation) of the range covered by queries to assist the reader in understanding and selecting an appropriate range.

The digital geographic location query message transmitted from the personal communication device contains the following components: a bit string identifying the personal communication device transmitting the message; a bit string identifying the message as a digital geographic location query message and a bit string indicating the specific nature of the request; and wherein the digital geographic location query message transmitted from the personal communication is received by a base station and passed along to a mobile exchange along with a further bit string that identifies the base station.

The cellular position location system further comprises a merchant information database containing information pertaining to a plurality of participating merchants located within the geographic territory covered by the cellular communication network, each of the merchants having a merchant ID; and means for determining the merchant ID of all participating merchants located within a predetermined geographic proximity of each of the base stations and wherein the system can retrieve information pertaining to specific participating merchants from the merchant information database and transmit this information to participating users. Each base station preferably has a base station ID; and the participating merchants are classified into a plurality of classes and the system can search for merchants by class wherein a base station receiving a digital geographic location query message, passes the digital geographic location query message along with the base station ID to a computer that identifies merchants, if any, that satisfy the query and are located near personal communication device that transmitted the digital geographic location query message and a computer for retrieving information from the merchant information database and transmitting information retrieved from the merchant database to the personal communication device that transmitted the personal communication device for display on the display of the personal communication device that transmitted the personal communication device.

In accordance with the present invention, merchant information is preferably stored on a database that is accessible by merchants (through the internet, for example) so that merchants can add, delete or alter information contained in their respective listings.

The personal digital communication devices may be a digital phone of the type that includes the following features: a scroll button to allow the user to scroll through menus and sub-menus; a button that dials a number displayed on the display; a power key to turn the device on or off; a plurality of softkeys whose current function is displayed on the display proximate the key; an end button, which is pushed to end a communication session; a 12 key array of alphanumeric keys ranging from 1-0 and including * and #. In addition, the personal digital communication devices may be co-branded and/or have a sponsor merchant associated therewith. The device could also include a button for transmitting a predetermined digital geographic location query message concerning sponsor merchant locations. The digital communication device could also include a smart card with a personal chip. The smart card is preferably detachable from the remainder of the device so that can be used separately from the remainder of the device and so that a single device may be used with multiple smart cards and vice versa.

In connection with the co-branded personal communication device concept of the present invention, the cost of services (i.e., the cost of phone service and/or using the merchant directory could, in accordance with another aspect of the present invention, depend on the loyalty to the sponsor. Thus, if a purchaser remains loyal (for example, doesn't shop at a merchant's competitors and/or visits the sponsor once a week), the cost of the service is free, but if the person doesn't call within the specified period a charge is imposed. The rate charged for calls could, in accordance with another aspect of the present invention, be inversely proportional to the participant's redemption rate. This range will provide an entirely new set of opportunities for incentive programs linking loyalty for frequency of visits to the cost of telecom/network access. This incentive program could be operated entirely separate from a points-based program or as an adjunct to a points-based program. In this instance, the reward is use of the personal communication device on a network, which can be free or discounted depending on the participant's performance within the incentive program. In this way, the system provides complete convergence of Internet and telecom—free phone and directory use as long as you are loyal to participating merchants.

The present invention also provides various unique applications of an incentive program for encouraging certain participant actions. The program comprises a plurality of participants; a participant ID associated with each participant; a redemption rate associated with each participant ID (at least some of the participant redemption rates are non-whole number values); a first reward program under which participants may earn points for certain actions and a second reward program through which the redemption rate associated with a particular participant is adjusted in response to certain participant action. The program may be implemented with a system that includes: a participant action reporting unit, a participant ID Input unit; a data storage and memory unit; a redemption unit; an incentive adjustment unit and a computation unit. A base redemption rate is preferably associated with each participant and the base redemption rate is not the same for all participants and at least some of the base redemption rates are non-whole number values.

The incentive program may be applied to a casino game such that the plurality of participants are the players; the players' participant ID is determined by the location of the machine or associated with each participant; the casino game is a first reward program under which participants may earn points that may be redeemed for cash or prizes and the second reward program is a variable redemption rate program through which points may be redeemed for currency based upon the redemption rate in effect at the time of redemption and wherein the redemption rate associated with a particular participant is adjusted in response to certain participant action. To encourage the players to play frequently and improve utilization of the underlying casino game, the system includes a timer that determines whether a predetermined time period has elapsed between consecutive plays of the casino game and wherein: if the player has a positive credit winnings balance, the exchange rate is increased by predetermined amount every time the player plays within the predetermined time period; if the player has a negative credit winnings balance then the exchange rate is decreased by predetermined amount every time the player plays within the predetermined time period; if the player has a positive credit winnings balance, the exchange rate is decreased by predetermined amount whenever the predetermined time period interval has passed without the player playing; and if the player has a negative credit winnings balance then the exchange rate is increased by predetermined amount whenever the predetermined time period interval has passed without the player playing.

In addition, the variable redemption rate is used to provide an auxiliary game pursuant to which a player that has a net positive balance can place an auxiliary bet that, if won, results in increasing the redemption value of the positive balance at the risk of dramatically reducing the value of the positive balance; and pursuant to which a player that has a negative balance can place an auxiliary bet that if won reduces the redemption value of the negative balance would be reduced at the risk of increasing the redemption value of the negative balance.

The system may further include a display screen for displaying information concerning the amount of dollars on deposit, the net results, the current redemption rate, the dollar value of the net results determined by applying the current exchange rate and the current balance and a visual display to graphically illustrate the time remaining.

To improve efficiency of delivery to local homes and businesses from a central hub in a metropolitan area, the present invention provides a multiple loop courier system. Briefly, the multiple loop courier system includes one or more first-tier couriers that transport goods from a central hub to a plurality of geographically spaced first tier drop points. The system further includes one or more second-tier couriers associated with each of the plurality of drop points for carrying the goods from the first-tier drip points to a plurality of second-tier drop points that are geographically spaced from the first-tier drop points. In addition, the system includes delivery couriers that deliver goods from first- and/or second-tier drop points to customers.

The system further includes the computer and communication system for determining optimum delivery courier instructions (preferably based on real time traffic data and delivery demand) and conveying these instructions to each of the delivery couriers.

The multi-loop delivery system of the present invention achieves efficiencies by coordinating deliveries during predetermined delivery cycles and directing the "loop couriers" to follow a simple set of rules during each cycle that can be individually optimized. For example, the second-tier couriers are instructed to be at their designated first-tier drop-off point at a predetermined time during each cycle, e.g., "every hour on the hour." The system is arranged so that the second-tier courier can be assured that if goods are to be dropped off at their designated first-tier drop-off point for any particular delivery cycle, they will arrive by a certain time, e.g., by 5 minutes after the hour. Thus, if goods are not delivered by the predetermined time, the courier then proceeds to the default instruction, which may include returning to the central hub to pick up a delivery for delivery within the vicinity of the central hub or to provide the next delivery to the first-tier hubs. The default instruction may simply be to return to the hub for further instructions.

The multi-loop delivery system is also used in connection with the delivery couriers but, the system further provides specific instructions at each designated drop-off time for the delivery couriers to ensure maximum efficiency. To facilitate these instructions, the system includes a computer and communication system for receiving information concerning deliveries to be mad and real time traffic conditions and determining optimum delivery courier instructions based on real time traffic data and delivery demand and conveying these instructions to each of the delivery couriers.

Thus, the delivery system of the present invention comprises a central hub for assembling packages of goods to be delivered; a first tier courier; a plurality of second tier couriers; a plurality of third tier couriers; and a computer and communication system. The first-tier courier picks up packages at the central hub and delivering packages to a plurality of first-tier drop-off points. The second-tier couriers are each associated with a particular one of the first-tier drop-off points and follow rules of delivery during a delivery cycle that is repeated in predetermined time cycles. The rules of delivery to be followed depend on whether or not goods have been delivered to the designated first-tier drop-off point by a predetermined time. The delivery couriers retrieve goods from first- and second-tier drop-off points and deliver goods directly to customers according to instructions received from the computer and communication system based on real time traffic and delivery demand information. The couriers within the system may be subject to incentive system according to the present invention to encourage improved performance.

The present invention will be described in greater detail in connection with the attached drawings in which

BRIEF DESCRIPTION OF DRAWINGS

FIGS. 3A-B illustrate three distinct systems for converting base points into program (reward) points according to the present invention.

FIG. 7A shows a menu summary for a personal digital phone according to the present invention.

FIG. 9H shows a further step in the custom incentive method of FIG. 9G.

FIG. 17 illustrates a simplified form of matrix for storing and comparing customer responses to various sales agents and automated agents in a virtual retail (vetail) setting according to the present invention.

DETAILED DESCRIPTION

Figure 1:
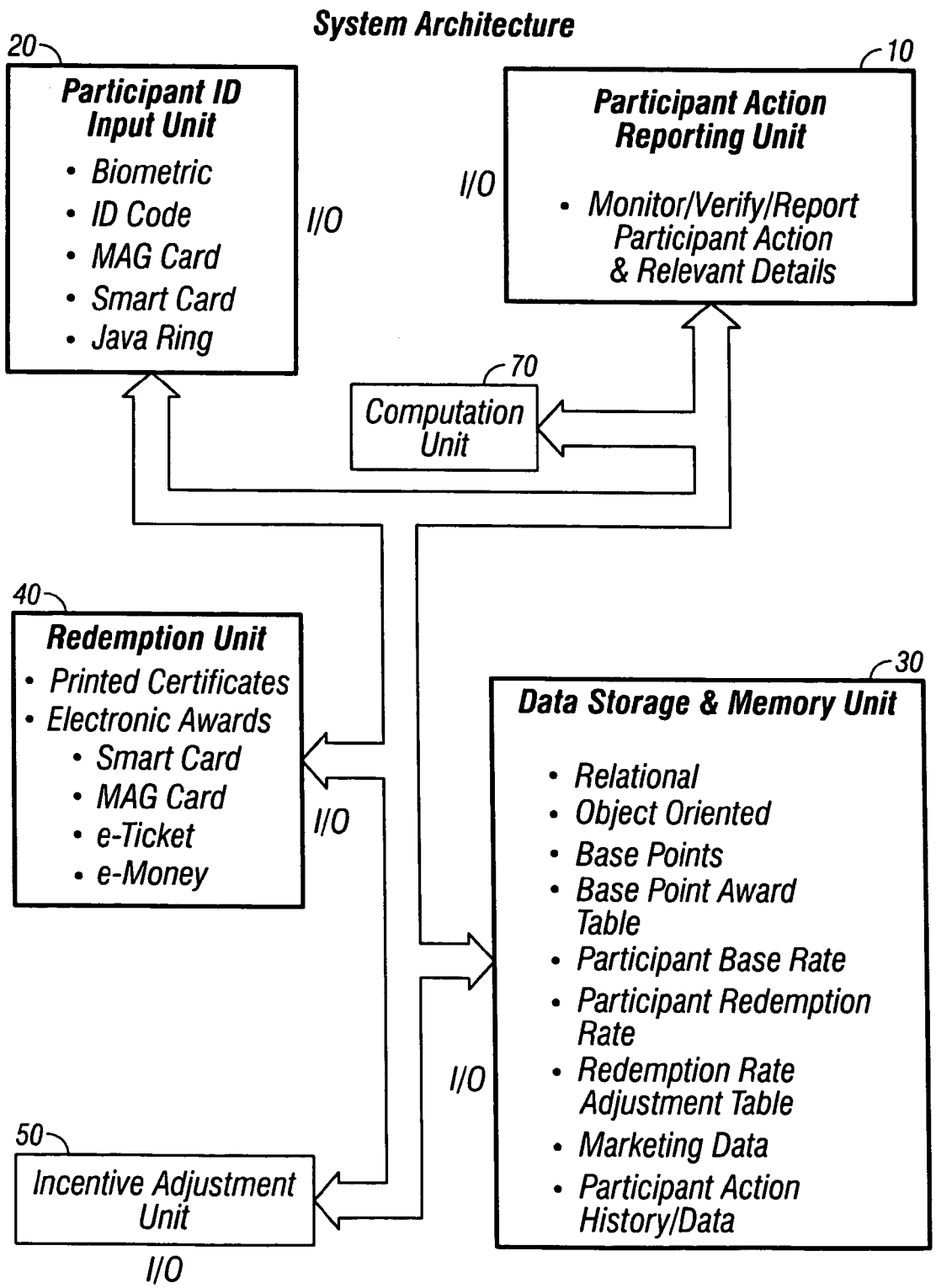
FIG. 1 is a high level view of the system architecture from the two component variable redemption rate incentive system of the present invention.

The present invention relates to systems and methods for promoting commerce in a networked economy, including, for example, conducting sales agent assisted commerce involving one or more distributed vendors over networked computers that provides both the advantages of customer/sales agent interaction and the convenience and efficiency of electronic commerce through the use of networked computers. The invention includes discrete components that have utility by themselves, but can be used in combination to provide even greater benefit as a comprehensive suite of solutions for promoting and improving electronic commerce of many forms, including retail and business to business commerce, casino gaming, utility aggregation and more. As described in detail below, these components include an incentive program, a merchant finder and cellular position locator, a system and method for conducting sales agent assisted commerce involving one or more distributed vendors over networked computers, smart cards that are enabled for wireless connectivity and more.

The present invention also relates to incentive and promotional programs, including a personal communication and electronic commerce system for use by participating users and participating merchants in connection with incentive and promotional programs in the Network Economy. More specifically, the present invention relates to an incentive system and process that can be used in conjunction with other incentive systems to more specifically incentivize desired participant action. The process is preferably implemented through the use of one or more programmable computers and personal communication devices such as digital cellular phones and data communication devices in a cellular network. With this in mind, the components will now be described in detail along with examples of the best ways currently contemplated for combining these components into a comprehensive solution for promoting electronic commerce. It should be understood, however, that the components described herein have separate utility and can be combined in others ways to meet specific needs.

While the incentive system of the present invention will, in some instances, be described in the context of a single system for storing participant information, it should be understood that systems are now moving toward decentralization at a rapid pace. Thus, it is not intended that the present invention should be limited to a central system for carrying out features described as part of a system. Instead, terms such as "system" and "unit" as described herein can be a series of linked physical components residing in widely spaced physical locations. Also, the terms "vendor," "merchant" and "service providers" are used both collectively and interchangeably. Unless specified to the contrary, these terms are intended to be interchangeable.

In addition, it should be noted that the system in which individual participant redemption rates are calculated and associated with specific customers could be internal to an existing reward program or could be maintained by a separate organization (system operator) that is in communication with various sponsoring companies and participants. Indeed, the system could be embedded into a conventional reward program to give the appearance of a single reward that varies by participant and varies over time.

FIG. 1 shows the overall system architecture of the two-component variable rate incentive system of the present invention. As shown in FIG. 1, the system includes various functional units in communication with one another. Again, the individual functional units need not reside in a single physical location and the different functional units need not be physically distinct from one another. Moreover, the communication within and between respective units can be a dedicated communication line or a data bus or could be a public or private network.

In FIG. 1, the system includes a participant action reporting unit that functions to monitor, verify and report participant action and relevant details. Thus, for example, in the context of an airline frequent flyer program, the participant action unit determines that a particular participant has taken a flight and reports that time and date of that flight. In the context of a credit card reward rebate program, on the other hand, the participant action reporting unit reports that a transaction has occurred and provides details concerning the merchant and the amount of the transaction. Naturally, other details could be provided concerning the specific time of the transaction, the brand of goods or services purchased and the merchant location.

The system further includes a participant ID input unit, which functions to identify a particular participant. In its simple form, the participant ID input unit could be a keyboard or other mechanism for inputting a participant ID code, frequent flyer number or account number. To avoid manual entry of the participant ID, a bar code ID code, a mag-card, a smart card or a Java ring encoded with a participant's ID information could be used and the participant input unit 20 would include an appropriate card or chip reader. Alternatively, a biometric identification unit, such as a thumb scan or iris scan could be used to provide participant identification.

The system further includes a data storage and memory unit 30. The memory unit is likely to reside in various locations, but could, in some instances, be provided on a single chip. The memory unit stores data structures in a way that allows access to other components of the system. The data may be stored in any known type of data structure, including files, tables or objects. The system further includes a database management system that manages the creation, storage, access, updating, deletion and use of data stored in the memory. The database management system preferably resides in the computation unit 70. The data storage and memory unit 30 preferably uses either a relational database model or an object-oriented database model, but could employ other models or combinations thereof.

The data storage and memory unit 30 keeps track of information for each of the program participants. This information preferably includes information pertaining to base points, a participant base rate, a participant redemption rate, participant marketing data and participant action history/data. In addition, the data storage and memory unit 30 includes a base point award table and a redemption rate adjustment table that provide information as to the awards corresponding to certain participant actions.

The system further includes a redemption unit that has the ability to generate rewards by, for example, printing certificates or generating electronic awards, such as credits to a smart card, a mag-card or generating an e-ticket or e-money credit.

The system further includes an incentive adjustment unit 50 that allows an incentive company or program sponsor to adjust information stored on the base point award table or redemption rate adjustment table or otherwise create incentives corresponding to desired or undesirable participant actions.

Finally, the system includes a computation unit 70, which is preferably in the form of a variety of distributed computers that provide computer processing capacity where needed.

Figure 1A:
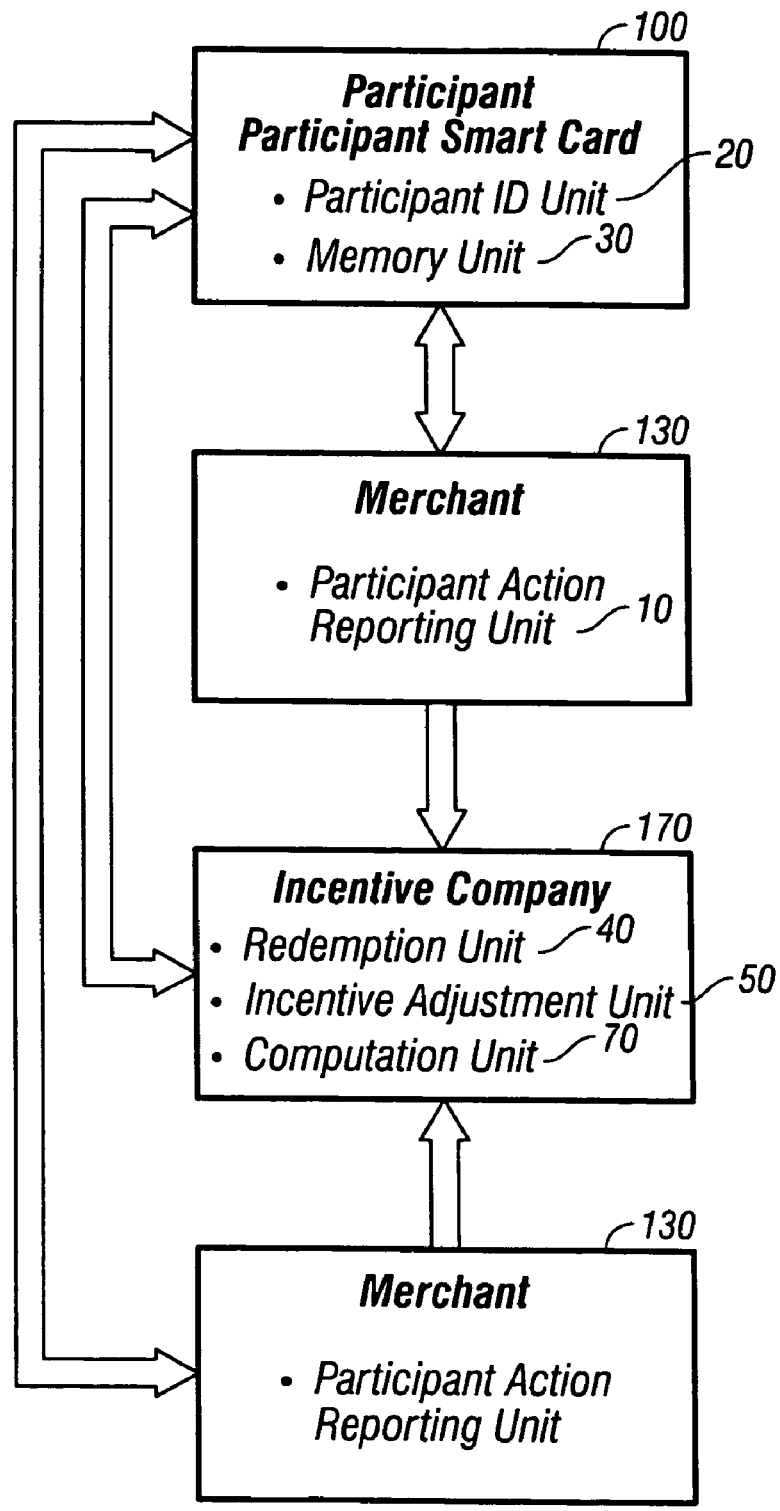
FIG. 1A is a high level view of the architecture of a highly distributed system according to the present invention.

Within the high-level system architecture illustrated in FIG. 1, there are numerous possible specific system architectures. The possible systems range from highly distributed systems to highly centralized systems. To illustrate the range of systems that are possible, two examples will now be described. In particular, FIG. 1A shows a highly distributed system architecture in which merchants 130 have relatively simple participant action reporting units 10 and an incentive company 170 provides the redemption unit 40, incentive adjustment unit 50 and computation unit 70. In this example, the participant's smart card provides the functions of the participant ID unit and also provides the functions of the memory unit 30. As noted previously, the term "smart card" refers to any form of personal chip that can contain a participant's information.

In the highly distributed system such as that shown in FIG. 1A, the participants carry a personal chip, which may be embedded in a smart card, that contains not only their identification information, but also a variety of other information, including, for example, a participant's accumulated base points, the participant's individual base redemption rate (BRR), the participant's individual variable redemption (VRR), the participant's accumulated reward points, and a wide variety of marketing data and participant action history data. The personal chip carried by the participant could also contain a base point award table and a participant redemption rate adjustment table, but this is not preferred, as it complicates making adjustments to these tables. Again, the personal chip could b embedded in a Java ring (a piece of jewelry worn by the user) or integrated into a personal communication device.

An advantage of the highly distributed system of the type shown in FIG. 1A is that it alleviates the need for the merchants 130 to invest in expensive hardware. In particular, the merchant would only be able to record participant actions and any relevant details thereof and report the same either to an incentive company or electronically record information on the participant's smart card for later reporting.

The system shown in FIG. 1A includes an incentive company 170 (system operator), an additional entity that handles some of the infrastructure burden to run the program, including providing a redemption unit 40, the incentive adjustment unit 50 and the computation units 70. With this architecture, the merchants 130 are able to outsource these activities to a common incentive company 170. Of course, it is not necessary that the incentive company 170 be distinct from the individual merchants and the merchants could handle the functions of the incentive company 170 internally, if desired.

Figure 1B:
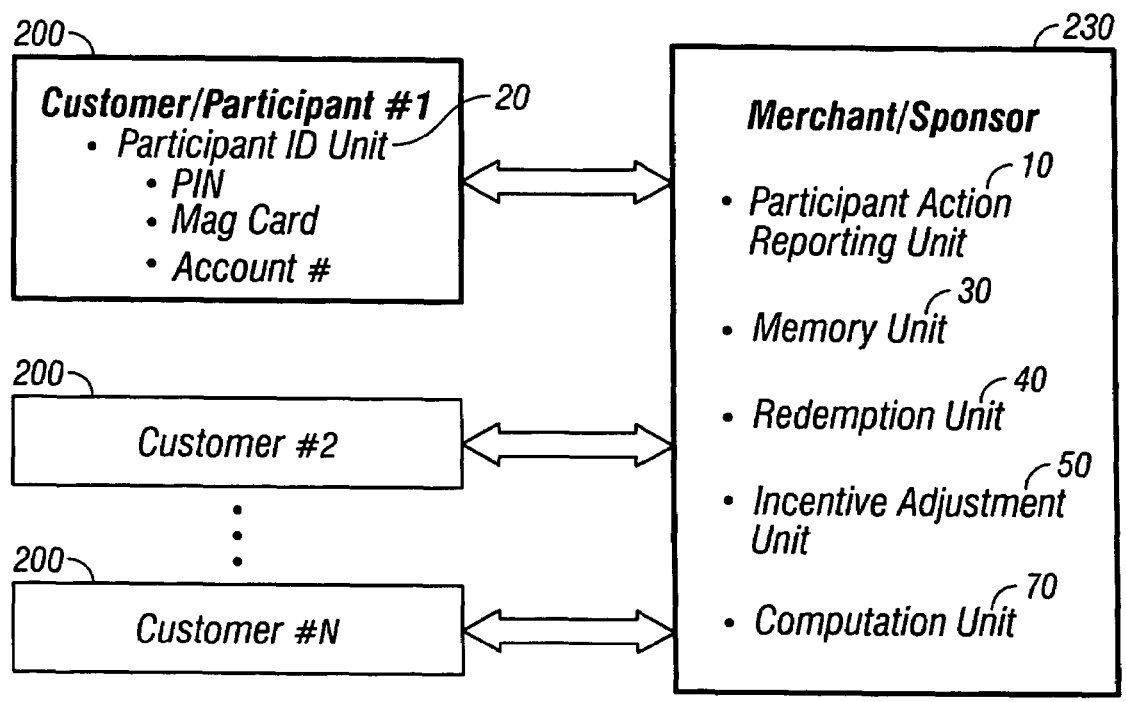
FIG. 1B is a high level view of the architecture of a centralized system according to the present invention.

FIG. 1B illustrates the architecture of a more centralized system in which in the centralized system customers or participants 200 need only be able to identify themselves at the time of taking an action. Again, the participant ID could be a simple account number, personal identification number (PIN), mag-card identification number stored on a mag-card or biometric verification or the like. The merchant or sponsor 230, either by itself or in conjunction with a outsourcer incentive company provides the participation action reporting unit 10, the memory unit 30, the redemption unit 40, incentive adjustment unit 50 and the computation unit 70. A significant aspect of this architecture is that information concerning accumulated base points, accumulated reward points, participant's base redemption rates, participant's current redemption rates and participant marketing data is kept on a central database rather than on a personal chip.

It will be appreciated by those skilled in the art that a wide variety of system architectures are available to meet the functional needs of the system of the present invention.

Figure 2:
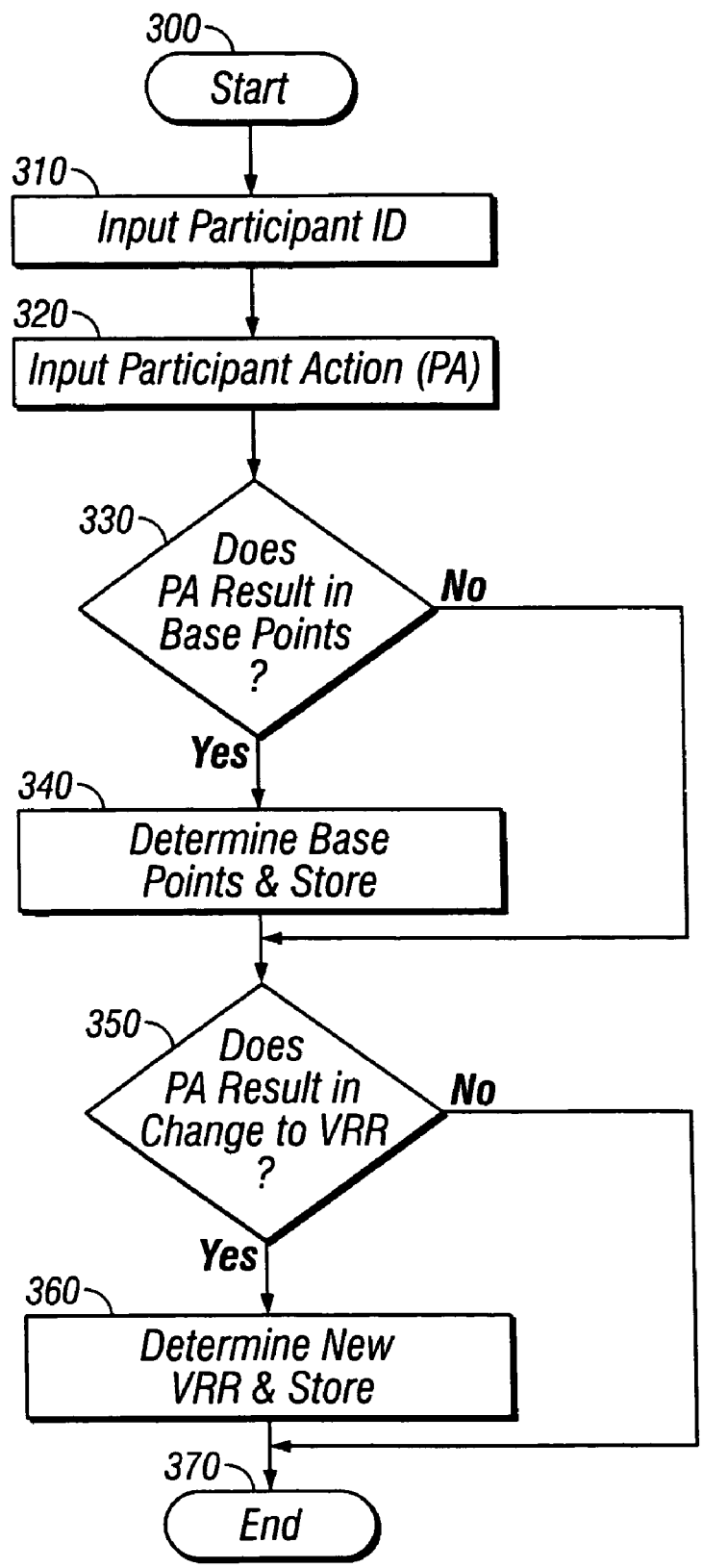
FIG. 2 is a flow diagram for a two-component incentive system.

FIG. 2 shows a high-level flow diagram for a two-component incentive system according to the present invention.

As shown, after the system begins at step 300, the initial step is inputting a participant identification in step 310. A participant action is then inputted at step 320. At step 330, a determination is made as to whether the participant action results in base points. Typically, this would be done through reference to a base point award table in the data storage and memory unit. If NO, then the system proceeds to step 350. If the participant action does result in base points, a determination is made as to the amount of base points earned at step 340 and the amount is stored. Depending on the arithmetic sequence of redemption, base points earned may be stored alone or added to the accumulated base points.

At step 350, the system determines whether the participant action results in a change to the participant's individual variable redemption rate. If NO, then the system proceeds to 370 and ends. If, on the other and, the participant action does result in a change to the participant's variable redemption rate (VRR), the system proceeds to step 360 where a determination is made at the new variable redemption rate and the new variable redemption rate is stored. This step is preferably performed with reference to a variable redemption rate adjustment table and, if necessary, reference to a participant's base redemption rate and current redemption, which are stored in memory.

Further details and specific examples of the system according to the present will now be described in the context of the system's use in connection with various point-based award programs.

Conversion of Base Points to Reward Points

An important characteristic of the variable redemption rate incentive program is that the arithmetic sequence in which reward points are calculated can also impact the conversion base points into program (reward) points. This is because, among other things, the redemption rate can vary over time. Thus, more specifically, a different result can be obtained when base points are converted into program points (through use of the redemption rate) as soon as the participant action is reported as opposed to a situation in which base points are converted into program points periodically as opposed a situation in which base points are converted to reward points only upon request of the participant. FIGS. 3A and 3B demonstrate this point by providing examples of each redemption scheme.

In the examples shown in FIGS. 3A and 3B, the following notation is used:
PARTICIPANT ACTION=PA
BASE POINTS EARNED=BP
REDEMPTION RATE=RR
PROGRAM POINTS=PP The first example shown is referred to as System 1, a continuous redemption system. In this system, base points are converted to program points as they are earned by reference to the redemption rate in effect at that time. Thus, for example, the conversion of three participant actions would proceed as follows:

$PA_1 \Rightarrow BP_1 * RR_{@T1} = PP_1$
$PA_2 \Rightarrow BP_2 * RR_{@T2} = PP_2$
$PA_3 \Rightarrow BP_3 * RR_{@T3} = PP_3$ Resulting in TOTAL PROGRAM POINTS=$PP_1+PP_2+PP_3$ The second example is referred to as System 2, a periodic redemption system. Base points are converted to program points at the end of a predetermined period, e.g., monthly, by reference to the variable redemption rate in effect at the end of the period. Thus, for example, the conversion of three participant actions would proceed as follows:

| | | Total Base Points |
|---|---|---|
| $PA_1 \Rightarrow$ | $BP_1$ | $BP_1$ |
| $PA_2 \Rightarrow$ | $BP_2$ | $BP_1 + BP_2$ |
| | End of Period 1 (P1) | |
| | | $(BP_1 + BP_2) * RR_{@\,end\,of\,P1} = PP_{@\,end\,of\,P1}$ |
| $PA_3 \Rightarrow$ | $BP_3$ | $BP_3$ |
| | End of Period 2 (P2) | |
| Resulting in $PP_{@\,end\,of\,P1} + [(BP3) * RR_{@\,end\,of\,P2}] = PP_{@end\,of\,P2}$ | | |

The third example, referred to as System 3, redemption only on demand system. In this system, base points are converted to program points only upon the participant's demand/request by reference the variable redemption rate in effect at the time of demand. Thus, the conversion would proceed as follows:

| | | Total Base Points |
|---|---|---|
| $PA_1 \Rightarrow$ | $BP_1$ | $BP_1$ |
| $PA_2 \Rightarrow$ | $BP_2$ | $BP_1 + BP_2$ |
| | End of Period 1 | |
| $PA_3 \Rightarrow$ | $BP_3$ | $BP_1 + BP_2 + BP_3$ |

| Total Base Points |
|---|
| End of Period 2 |
| $BP_1 + BP_2 + BP_3$ |
| Redemption Request |
| made at end of Period 2 + Δ |
| PROGRAM POINTS = $(BP_1 + BP_2 + BP_3) \times RR_{at\,time\,of\,redemption}$ |

From the foregoing, it can be readily appreciated that selection among these or other sequences of conversion can materially influence the resulting program points and thus offers another opportunity to create incentives.

One of the significant advantages of using individually calculated redemption rates is ability to taken into account timing of actions by individual program participants, whereas existing programs can, at most, accommodate differences for timing among certain classes of participants.

Instant Messaging/Electronic Transactions

There are various synergies available when the system and method of the present invention are used in connection with instant messaging technology. As used herein, instant messaging technology refers to the range of technologies, including ICQ, that allow one to determine if and when someone else is online and send a message directly to that other user. Typically, the instant message bypasses normal Internet protocols so that messages are received much more quickly than e-mail, for example. Instant messaging is currently available from AOL, MSN, Yahoo and Prodigy. These systems also provide notification of when selected others are online. AOL refers to the notification feature as a "Buddy List."

As detailed below in connection with the discussion of "vetailing," that instant messaging may be adapted for online commerce by, for example, enabling conversations between online customers and sales people. For example, in an online or virtual retail experience, a customer/participant can "enter" a store by visiting a merchant's web site. Information pertaining to the merchant's goods and/or services can be browsed at the customer's leisure. However, with the introduction of instant messaging, it will be possible to contact a salesperson by, for example, clicking on a "Request Assistance" button displayed on the website. The website could also display a list of experts available for discussion. ICQ or other techniques are used for this purpose so that sales agents may participate using any Internet connection. Thus, there might be sales agents with expertise in current fashion, the sizing of certain vendors (e.g., "ARMANI tends to run a little small), or the suitability of products for customers with special needs.

Using "Buddy List" technology, customers could be advised as to the availability of sales agents with specific expertise. For example, upon clicking "Request Assistance," the customer/participant could be shown a list of sales agents available and contact them by selecting one of the available choices.

The sales agents could be identified by name or pseudonym to at least create a perception of personal service and build loyalty. Alternatively, to improve efficiency, the sales agents could be identified by expertise only, which is not unlike most customers' normal retail experience.

With investment in online retailing, it will become increasingly important to ensure prompt and courteous customer service. As these virtual interactions become more real (in terms of time and perception), customer service will become a differentiating characteristic for online merchants. The system and method of the present invention could be used to implement both customer incentive/reward programs and salesperson incentive programs that would lead to greater customer satisfaction and loyalty.

One example of a range of incentive programs that take advantage of the synergies between the present invention and instant messaging are time-based customer and sales person incentives. With instant messaging it is possible for an online merchant to be notified as soon as a customer "enters" the vendor's virtual store, i.e., the vendor receives an instant message from the customer. With this information it is possible to guarantee that a customer will be greeted (i.e., receive a responsive message from a sales agent) within a set period of time. The sales agent could be human or an intelligent computer agent that is capable of interacting with the customer in a satisfactory way. Incentives could be used to back up the guarantee by rewarding/compensating the customer if the guarantee is not met. Likewise, sales agent compliance could be encouraged through an incentive program that encourages the sales agents to respond to customers promptly.

In one example, using a variable redemption rate (VRR) incentive program according to the present invention, participants could be rewarded by base points, an increase in redemption rate and/or direct reward (program) points if the vendor fails to provide the guaranteed level of customer service. If the vendor promised that a sales agent would reply to any inquiry within 30 seconds, for example, the customer participant could be awarded a point (or an incremental redemption rate increase) for every second beyond 30 before the sales agent responds. The system starts a timer, which is preferably displayed along with a welcome message immediately upon receiving the incoming inquiry message. If more than 30 seconds elapse, i.e., the timer reaches 0:00:00, the system displays a point or redemption rate counter that displays the accumulation of points that the customer will receive in compensation for the inordinate delay. Should the customer/participant log off the site, however, the accumulated points will not be credited.

In a system such as that just described, the vendor or merchant sponsoring the program will have a great incentive to respond to inquiries quickly. To transfer this incentive to sales agents, however, some form of incentive program might be required. For example, sales agents could be awarded points for responding to incoming customers within a predetermined time period after disengaging from that sales agent's last customer interaction. An incoming message routing system can be used to send the "oldest" incoming message to the first available sales agent. Preferably the initial routing can be done within a few seconds after receiving the incoming message, but the urgency of the sales agent responding to the incoming message will obviously depend on the time remaining in the guaranteed response time period, when the message is received by the sales agent. Thus, if the guaranteed response time is 30 seconds and the message is forwarded to a sales agent in 5 seconds, the sales agent has a comfortable period of 25 seconds to transmit a responsive message. In contrast, if system traffic or some other delay causes the routing system to take 25 seconds to forward the incoming message to the sales agent, a responsive message must be transmitted in a mere 5 seconds. Thus, there is a need to provide the sales agent an extra incentive for responding quickly to the latter incoming message. Moreover, the delay in forwarding the latter message likely reflects increased demands on the system and thus an even greater need for sales agent efficiency to alleviate the demands.

A points-based incentive program can be used to create appropriate sales agent incentives. For example, incoming messages could be given a point value based on the urgency of response required. Thus, a sales agent responding to a message within 5 seconds would earn more points if the message responded to was urgent, as in the latter example. If, as in the foregoing example, the guaranteed response time is 30 seconds, the point value of responding to the incoming message could be inversely proportional to the time remaining when the message is forwarded to the sales agent.

Alternatively, each response could be given a set point value, e.g., 30 points, which point value would decrease in increments as the time available for response expired. Thus, at the time a message is sent to a sales agent it is worth 30 points, but the point value is reduced in proportion to the time remaining until the point value reaches some low (or even zero) value when time has expired. Thus, if a message is forwarded with only 5 seconds remaining, its 30 point value for immediate response will be reduced by 6 points each second if the base value is selected as 0 points or by 5 points each second if the base value is selected as 5 points. On the other hand, if a message is forwarded with 25 seconds remaining, the 30 point value of immediate response will be reduced by 1.2 points each second if the base point value is selected as zero or 1 point each second if the base value is selected as 5 points.

The just described arrangement provides the desired effect of conveying a sense of urgency to messages with little time remaining for response and also produces highly desirable network effects in a system with a plurality of sales agents. In particular, to the extent that delays in forwarding messages to sales agents are caused by demands on the system, such delays can be reduced through the collective effort of all the sales agents handling incoming messages more efficiently. This network effect will become evident to the sales agents as they begin to receive incoming messages with more time available for response, which is desirable from a sales agent's perspective.

To ensure that sales agents are courteous as well as efficient, the award of points earned could be conditioned on a customer's indication that they were satisfied with the message exchange. Furthermore, and consistent with the variable redemption rate of the present invention, the rate at which time-based points are converted to reward points could depend on the customer's evaluation of the sales agent as follows:

| Quality of Service | Redemption Rate |
| --- | --- |
| Excellent | 2:1 |
| Good | 1:1 |
| Fair | 0.5:1 |
| Poor | 0 points |

This system would also provide valuable feedback for evaluating sales agents and making intelligent recommendations as described herein.

Customers could be encouraged to respond to the customer service inquiry through an offer of base points, increases in redemption rate and/or reward points.

From the foregoing, it should be evident that ability to track, monitor, time and measure customer/sales agent interaction that is inherent in electronic/online transactions can be used to optimize efficiency and customer service. The present invention is similarly applicable to any environment where it is possible to track and reward (or penalize) participant action in a way that will influence participant action.

One of the principle aspects of the present invention is that the awards are constantly in flux and not cumulative as most existing reward programs are. This introduces a sense of urgency and involves incentives based on the timing dimension. For this reason, the system works ideally when matched with an existing cumulative reward program so that the benefits of both incentives are achieved.

The present invention is widely applicable to any incentive program in which a participant earns "points" or some form of award that, such as cash rebate that can be modeled as "points." The critical aspect of the present invention is the recognition that, regardless of what the "points" represent, points are merely a model of something of value and have no inherent value of their own. As such, the true "value" to the participant occurs when the intangible "points" are converted into some tangible reward, which may be a ticket for a free flight or a cash reward. The present invention takes advantage of this insight by allowing an additional incentive creation that occurs right at the point where value to the participant is created, namely redemption.

In addition, to its applicability to known incentive programs, the present invention can be used to create incentives that have not previously been possible.

Instant Redemption

In accordance with another important aspect of the present invention, it is possible to offer participants instant point redemption for goods and services from participating vendors and service providers. In other words, accumulated reward (program) points could be redeemed at the point of sale. This feature flows naturally from the fact that the architecture of the system of the present invention presupposes a high level of interconnection and communication between the vendors and service providers and the databases on which the participant specific information is stored. At minimum, it is necessary for vendors to be able to report participant actions in association with a participant ID. It is preferable that the time and specific nature of the participant action be reported as well.

In a highly distributed architecture, much of this communication occurs between a participant's smart card, a vendor or service provider's system, or alternatively, between an incentive company's database and a vendor's system.

The vendors or service providers would be able to query the participant database, to ascertain a participant-specific redemption rate and/or number of points, either base points or already-converted reward points associated with that particular participant ID. With this or a similar architecture, it would be possible to quickly ascertain the points available to a participant at the point of sale and thus enable instant redemption.

Alternatively, participants could redeem points at smart card terminals located at a vendor location, a sponsor location, a remote location (such as an automated teller machine) or even at the participant's home. The smart card terminal would preferably be able to verify a participant's ID (through biometric identification or the use of a personal identification code). The smart card terminal should include some means, such as a touch screen for allowing the participant to select an award. The smart card terminal also can retrieve the participant's available base points, redemption rate and/or reward points and retrieve or determine the amount of reward points required for the desired award. If the participant has enough reward points available, the smart card terminal can issue the requested reward. The reward could be issued in paper form by printing a coupon or ticket. However, the reward is preferably issued in electronic form. Thus, if that award is an airplane ticket, the ticket could be stored on the participant's smart card as an electronic ticket that would be accepted by the airline. If the award is a cash rebate, the cash value could be downloaded onto the participant's smart card. Other awards could, for example, be stored as electronic certificates that vendor's or merchants would honor without having to have the infrastructure of a smart card terminal.

As will be understood from the following examples, it is possible to create powerful incentives through the use of the system and method of the present invention.

Airline Frequent Flyer Reward Program

Considering first, a simple airline frequent flyer award program in which participants can earn "miles" for flying on the airline, one of its partner airlines or patronizing another partner company, which might be a hotel or a rental car company, phone service or the like.

With the present invention, the points that are earned in a conventional fashion are treated as base points (BP) and converted into award points by multiplying the base points by the variable redemption rate (RR). Again, the frequency of converting base points into award points can be varied to alter such as is explained in connection with FIGS. 3A and 3B.

In addition, through the use of the system and method of the present invention, it is possible to incentivize certain types of participant action. For example, an airline could choose to increase the redemption rate for a customer that flies on that airline at least once every week. In contrast, the airline might choose to reduce the redemption rate for customers that are only occasional travelers. With the system of the present invention, it is possible to make such adjustments with great precision. Thus for example, it is possible to slightly increment a participant's redemption rate each consecutive week that they fly the airline. In contrast, if even a single week is missed, it is possible to dramatically reduce the redemption rate or even bring the redemption rate back to the base rate. In this way, very powerful incentive is created to maintain loyalty and the incentive, namely a greater redemption rate, is only applied to the most loyal customers. The effect of such a program is demonstrated by the following example (the effects demonstrated by this example are obviously not limited to frequent flyer programs):

Sample 1: Frequent Flyer Promotion

Program: Increment RR (0.05) for each consecutive week flown, but reset RR halfway to base if participants misses one week and to zero if participant misses two consecutive weeks

| | Customer 1: Flies Weekly Customers 2 & 3: Miss some weeks | | | | | |
|---|---|---|---|---|---|---|
| | Customer 1: RR | | Customer 2: RR | | Customer 3: RR | |
| Week | # flights | rate | # flights | rate | # flights | rate |
| 1 | 1 | 1.05 | 2 | 1.05 | 0 | 1.00 |
| 2 | 1 | 1.10 | 3 | 1.10 | 0 | 1.00 |
| 3 | 1 | 1.15 | 0 | 1.05 | 4 | 1.05 |
| 4 | 1 | 1.20 | 2 | 1.10 | 0 | 1.025 |
| 5 | 1 | 1.25 | 2 | 1.15 | 0 | 1.0 |
| 6 | 1 | 1.30 | 0 | 1.75 | 0 | 1.0 |
| 7 | 1 | 1.35 | 0 | 0 | 0 | 1.0 |
| 8 | 1 | 1.40 | 3 | 1.05 | 4 | 1.05 |
| 9 | 1 | 1.45 | 3 | 1.10 | 4 | 1.10 |
| 10 | 1 | 1.50 | 2 | 1.15 | 4 | 1.15 |
| 11 | 1 | 1.55 | 0 | 1.075 | 4 | 1.20 |
| 12 | 1 | 1.60 | 3 | 1.125 | 0 | 1.10 |
| 13 | 1 | 1.65 | 0 | 1.0625 | 0 | 1.00 |
| 14 | 1 | 1.70 | 3 | 1.1125 | 2 | 1.05 |
| 15 | 1 | 1.75 | 2 | 1.1625 | 0 | 1.00 |

-continued

Customer 1: Flies Weekly
Customers 2 & 3: Miss some weeks

| | Customer 1: RR | | Customer 2: RR | | Customer 3: RR | |
|---|---|---|---|---|---|---|
| Week | # flights | rate | # flights | rate | # flights | rate |
| 16 | 1 | 1.80 | 2 | 1.2125 | 0 | 1.00 |
| 17 | 1 | 1.85 | 0 | 1.10625 | 0 | 1.00 |
| 18 | 1 | 1.90 | 2 | 1.15625 | 2 | 1.05 |
| 19 | 1 | 1.95 | 2 | 1.20625 | 0 | 1.025 |
| 20 | 1 | 2.0 | 2 | 1.25625 | 0 | 1.00 |

Although the foregoing example is provided in the context of a frequent flyer program, the same results can be obtained in any points-based program.

Of course, the system allows for adjustment of the incentive so as to accommodate a particular need. The system could also be used to reward, through increased redemption rates, participants that use electronic ticketing.

The points-based system of the present invention could also be used to compensate participants, through an increase in redemption rate, for inadequate service; delays or cancellation of flights. Similarly, increases in redemption rate could be used to reward participants that agree to relinquish their seat on an overbooked flight.

Subway Frequent Traveler/Customer Loyalty

Recently, mass transit systems have adopted smart cards, debit cards and other forms of electronic payment. The use of electronic payment makes it possible to create unique incentives for participants. For example, it is widely recognized that encouraging consistent use of mass transit can help alleviate traffic congestion.

With the system of the present invention, it is possible to reward a participant that consistently uses mass transit through rewards, rebates, or even reduced rates for transportation. In the preferred embodiment, participants are given smart cards that can, among other things, store information concerning the date of the participant's last use of the transit system and a participant-specific redemption rate. The redemption rate could be applied to reward (program) points or could be used to determine the rate at which the participant's money account is debited for use of the transit system. In other words, loyal customers could be given favorable rates, which could be quickly reduced if the participant did not maintain loyalty—such as by not using the system on a weekday.

The effect of this loyalty incentive would be similar to that demonstrated by the previous frequent flyer example.

Credit Card/Debit Card Incentive Program

There are numerous known credit card incentive programs, but most fall into one of two categories, both of which are "point based." The first type of incentive program awards program points based on the amount of qualifying purchases. These points can then be used to buy merchandise or receive a discount on merchandise. The Diners Club program is an example of such an incentive program. The second type of incentive program is exemplified by the Discover Card. In this type of inventive program, there is a direct cash rebate based on the amount of qualifying purchases. Again, however, the amount of rebates earned can be treated as base points within the context of the present invention. As debit cards become ubiquitous, it is likely that similar programs will be introduced for debit cards In the context of the credit (or debit) card reward program, the conventionally earned awards are treated as base points and then converted into award points by multiplying the number of base points times the redemption rate in effect at the time the conversion is made. Again, frequency of conversion can be altered to achieve different results and create varied incentives as explained in connection with FIGS. 3A and 3B.

Point of Purchase Systems

Recently, incentive programs have been expanded to encompass all forms of purchase including debit cards, smart cards or even cash payments. With such programs, participants are typically rewarded based on the amount of purchase and perhaps the type of product purchased. There are known systems for reporting such purchases to a program administrator that keeps track of the total purchases and award levels achieved through such purchases. The present invention can work as an overlay to existing credit card and point-of-purchase incentive programs in which the awards earned are treated as base points that are multiplied by the customer's redemption rate to obtain a reward playing level.

If a credit card or point-of-purchase reward program ordinarily allowed all participants to obtain 1% cash rebate of all purchases through participating merchants, the present invention could be used to enhance systems so as to allow individually calculated redemption rates greater than or less than 1:1 to provide the option of further incentives. For example, to drive customer loyalty, so long as the participant visits a store within a certain period (e.g., once every seven days), the participant's redemption rate could be increased incrementally. There would presumably be some maximum redemption rate. Likewise, if the participant fails to visit the store within the specified period, the participant's redemption rate would be reduced. The reduction could be an incremental reduction, but to enhance the loyalty incentive, the redemption rate is preferably reduced by some percentage (e.g., 50%) of the difference between the participant's current redemption rate. A second consecutive failure to visit the store results in a return to the participant's base redemption rate. Again, participants could have different base redemption rates or all participants could have the same redemption rate. The effect of such a program is similar to that previously demonstrated in connection with frequent flyer promotions.

The system includes computer memory means for storing a participant identifier (such as a social security number or biometric data), a participant redemption rate, means for monitoring participant actions including the time, date and amount of such transactions, means for adjusting individual redemption rates based upon actions monitored and means for transmitting the redemption rate to a program administrator.

Internet Site/Portal Loyalty

The present invention is also applicable to reward loyalty to a particular Internet site or portal. In particular, it is now accepted that attracting participants to one's Internet site can be used to generate revenues. Recognizing this, there have been some proposals for rewarding participants that visit certain Internet sites or review ads placed by site sponsors. The system of the present invention can be used to enhance such rewards and or provide entirely separate incentives. By applying the system and method of the present invention to an incentive program, it is possible to reward a participant for visiting an Internet site at least once in every three-day period, for example. The reward would be a specified increment in that participant's redemption rate. In contrast, if the participant failed to visit the internet site within a three-day period the participant's redemption rate could be adjusted downward incrementally, or to some base level or by some percentage of the accumulated increases in redemption rates (i.e., a percentage of the difference [Δ] between the base redemption rate [BRR] and the variable redemption rate [VRR]) as follows:

$$VRR_{NEW}=BRR+(VRR_{OLD}-BRR)X$$

Where X is between 1.0 and 0.

If desired, this aspect of the invention could take advantage of instant messaging and ICQ technology to ascertain when participants are online. In this way, the system could receive a message whenever a participant goes online. The system could then be designed to penalize the participant only if they have been online and failed to come to the designated web site. Thus, a participant that was out of contact with the Internet for an extended period of time would not be penalized. Upon notification that a participant is online, the system could send a reminder message such as "Don't forget to visit (sponsor) site" and include a hypertext link to the site.

Utilization of Assets

Because of the ability to the present invention to affect timing of participant action (by rewarding or penalizing participants), the system and method of the present invention are particularly useful for increasing the percentage of utilization of assets. Consider, for example, the operation of an airplane. Every seat in an airplane that is not sold represents lost revenue to the airline. The same applies to any common carrier and in many other capital-intensive fields. Through adjustment of the rewards through variable redemption rates, it is possible to provide powerful incentives to individual participants to take advantage of an under utilized asset. Thus, for example with an airplane, a participant's redemption rate could be adjusted not only depending on loyalty with regard to frequency of usage of the airline, but also rewarding passengers whose use of the assets is predictable so that the airline can optimize equipment utilization.

One of the foremost examples of an industry that has a need to optimize utilization of assets is the utility industry. The system and method of the present invention can be used to incentivize customers to maintain consistent utility usage throughout the day to allow utilities or utility purchasing cooperatives to manage loads.

In the case of an electrical power company, for example, the need to construct enormously expensive power plants is determined, to a large extent, by peak demand. Although load sharing among utilities can help alleviate spikes in demand, there is still a need for incentives to encourage customers to reduce usage at times of peak demand.

In accordance with yet another aspect of the system and method of the present invention, utility customers could participate in a variable redemption rate award program to encourage favorable usage patterns. The participants could belong to a points-based award or rebate program of the types mentioned above and agree to subject their variable redemption rate to adjustment based on utility usage. Alternatively, the rate at which a utility customer pays for the utility (e.g., electricity) could be continuously adjustable depending on usage patterns. In this example, the customer gets a slightly better rate every day that its usage stays below a certain peak. But if the customer exceeds the prescribed peak on any day, its redemption rate will be sharply reduced and/or its rate paid for the utility will be increased.

In accordance with a further embodiment of the present invention, the "participants" in such a program need not be individual customers, but could be "neighborhood" utility purchasing collectives or aggregates that could collectively agree to maintain usage below a certain level. The ability to offset occasional spikes in one customers usage with reduction in a neighbor's usage would allow the collective to guarantee a lower peak usage than the sum of individual usages. The aforementioned incentive program could then be used within the utility collective or between utility suppliers and utility collectives to create incentives to maintain guarantees of maximum peak usage. The combined use of purchasing collectives and incentives will allow utilities to predict demand. This aspect of the present invention is particularly useful in a deregulated utility purchasing environment where a utility purchasing collective could produce its own electricity to handle peak demand if the incentive to limit its demand from the public utility was great enough.

Figure 4:
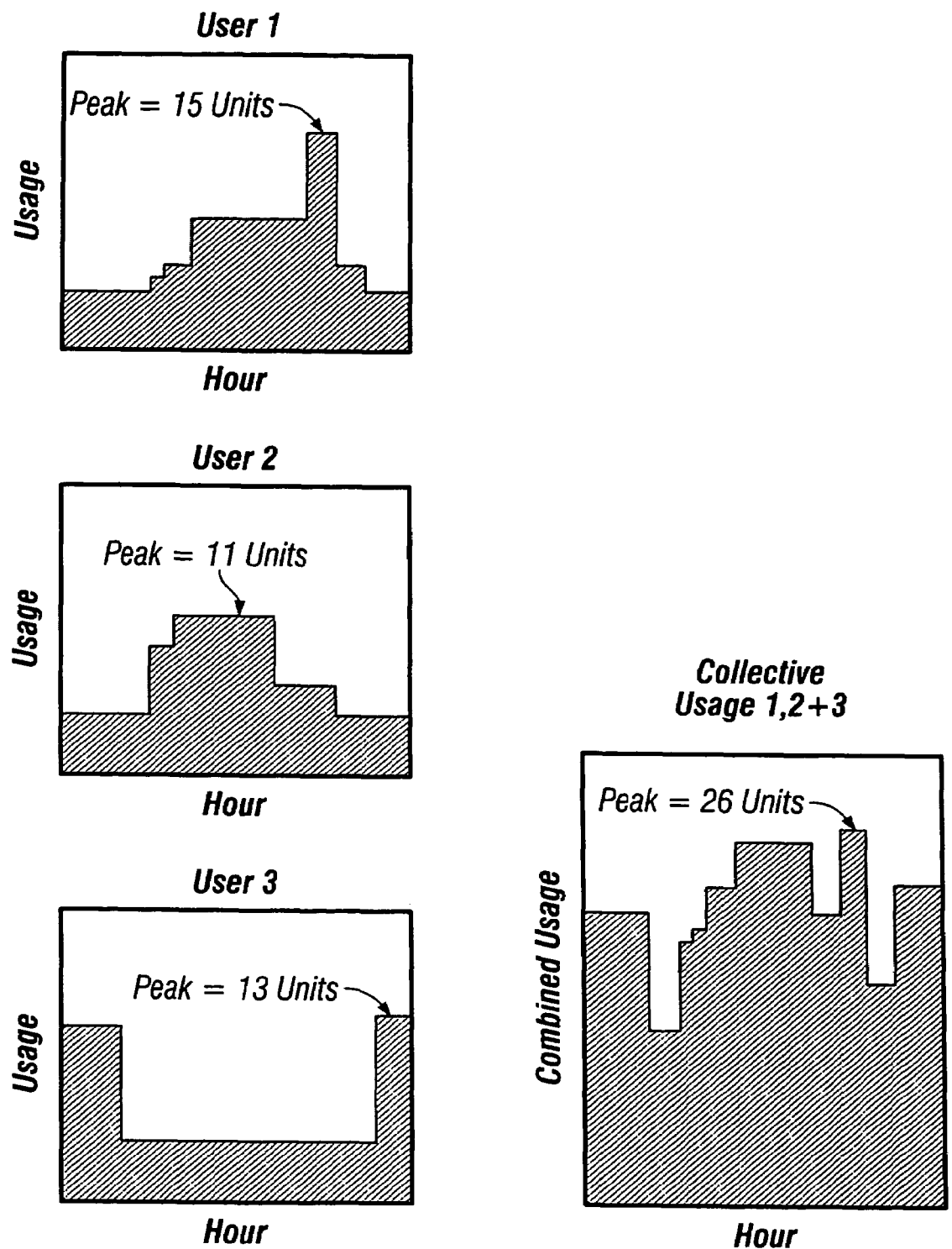
FIG. 4 shows charts illustrating the benefits of a utility purchasing collective according to the present invention in which consistent usage may be encouraged using the incentive system of the present invention.

By way of a very simple example, FIG. 4 illustrates the advantages that can be obtained by forming a utility purchasing collective among three users with different usage patterns. In particular, FIG. 4 graphically illustrates the utility usage pattern of three users that have different usage profiles, i.e., User 1, User 2 and User 3. In each instance, the graph shows the peak number of units of utility used during each hour for a 24-hour period. The graph could be a snapshot of a single day or a profile determined by monitoring the usage over an extended period or each of the user's over an extended period of time.

The usage patterns shown are dramatically different. The usage pattern of User 1, for example, reflects moderate use during the evening hours (the beginning and end of the chart), but relatively high usage throughout the day, with peak usage occurring in the early evening. The usage pattern for User 2, on the other hand, reflects moderate use during the evening hours and peak usage during the middle of the day, followed by reduced usage in the early evening hours. The usage chart for User 3, on the other hand, reflects very high usage in the evening hours and consistently moderate use throughout the day. Variation in usage pattern of this type can be found with users having different work schedules, differences in the number of people at home during the day, and the like.

In accordance with the present invention, it is possible to provide a system for determining usage patterns for a plurality of users, such as that shown, and then matching users with dramatically different profiles, as shown in FIG. 4, to form a collective that has a lower combined peak usage.

The savings effect that can be achieved through the use of a utility purchasing collective is dramatically illustrated by the final chart in FIG. 4, showing the combined usage of Users 1, 2 and 3. As shown therein, the combined usage of the three users peaks at 26 units or an average per user of 8.67 units. In contrast, User 1's peak usage is 15 units, User 2's peak usage is 11 units and User 3's peak usage is 13 units, such that the combined peak usage of the three users taken separately is 39 units or 50% greater than the peak usage when the usage is combined.

Recognizing that peak usage is the critical determining factor in whether a utility must invest in building new capital-intensive plants, it will be understood that there are tremendous opportunities for savings for utilities if they can group users into collectives to reduce peak usage. There are two significant challenges to achieving these efficiencies, however.

First, it is necessary to form collectives using user profiles that are quite different. This can be done using a system that generates user profiles and then randomly combines various combinations of user profiles to determine which combinations result in the lowest peak values. It should be appreciated, however, that it is likely that greater efficiencies are achieved using collectives of more than three users, as shown in FIG. 4, but that, at some point, adding additional users results in less total efficiency. Thus, the optimization program must take into account not only efficiency of any collective, but the ability to form other collectives throughout the user base.

It is also critically important to maintain consistent user patterns. Of course, there will be unexpected events, but through the use of the incentive system of the present invention, it is possible to dampen the effect of unexpected changes in usage. Also, collectives with enough users could arrange the construction of small-scale power generating facilities or purchasing through other utilities to satisfy peak usage demands.

Thus, it can be seen that the incentive system of the present invention is also useful for maintaining consistency of user usage, which is a particularly applicable field, such as the utility field, where peak usage is of paramount concern.

Use of Electronic Payment

The present invention can also be used to increase the variable redemption rate (VRR) for customers that consistently use electronic payment so the manual processing is not required. As forms of electronic payment become ubiquitous, it is becoming increasingly expensive (in a relative sense) for banks and merchants to handle physical currency (coins, paper money and checks). The present invention could be used to encourage participants to use electronic payment and automated (non-teller) banking systems. For example, a participant's redemption rate could be increased incrementally for every consecutive period of time (e.g., day, week and month) that they did not use a bank teller or use cash or a check to pay for a transaction. In addition, a dedicated co-sponsored personal communication device could be used to direct participants to merchant locations.

In connection with the co-branded personal communication device concept of the present invention, the cost of services (i.e., the cost of phone service and/or using the merchant directory could, in accordance with another aspect of the present invention, depend on the loyalty to the sponsor. Thus, if a purchaser remains loyal (for example, doesn't shop at a merchant's competitors and/or visits the sponsor once a week), the cost of the service is free, but if the person doesn't call by then a charge is imposed. The rate charged for calls could, in accordance with another aspect of the present invention, be inversely proportional to the participant's redemption rate.

Casino Gaming

A particularly useful application of the system and method of the present invention to increase the utilization occurs in the casino gaming field. In many casinos, it is the case that certain assets such as slot machines or gaming tables are used to near capacity at certain times of day. Consider, for example, slot machines. A casino having 1000 slot machines in operation may have a person occupying each of the 1000 slot machines. However, the users are not necessarily using the machines to their maximum capacity. There may be significant delays between each time the user plays a particular machine. The delays during the time in which the consumer is not using the machine represents lack of utilization of the machine. The present invention can be used to create incentives for the user to use the machine in a way that maximizes profits for that casino.

In a simple example, a user redemption rate for credits earned on the machine can be incremented when the customer/participant plays within a set period of time from the last game, e.g., 30 seconds, but decreased or even reduced back to a base rate or some percentage thereof if the user fails to play within the specified time.

A more sophisticated version takes advantage of the possibility of introducing an element of chance whereby, an entirely new auxiliary game can be introduced based upon variations in their redemption rate so that the user that has a net positive balance can be given the opportunity to place an auxiliary bet that would result in substantially increasing the redemption value of the positive balance at the risk of dramatically reducing the value of the positive balance. Conversely, if a user has a negative balance, the user could be given a chance to play an auxiliary game in which the redemption value of the negative balance would be reduced at the risk of increasing the redemption value of the negative balance.

The present invention thus provides to a multi-dimensional gaming system that allows participants winnings to vary in up to three dimensions: time; quickness of play and skill. The system is adaptable to any gaming system involving bets or player winnings. In particular, the base game is played for tokens that represent a monetary amount. In accordance with the present invention, however, the exchange rate of the tokens or credits, i.e., points, can be varied in a number of ways.

The exchange rate could, for example, be varied as a function of the frequency of play. For example, the exchange rate may be constantly randomly varied, the exchange rate may be progressively increased.

At the same time, the exchange rate could be varied as a function of the frequency of play. For example, the exchange rate could be decreased or increased (to penalize the player) by a predetermined amount or percentage if a player waits more than a predetermined amount of time between plays or the exchange rate may be progressively changed during periods of inactivity. To encourage frequent play, the time-based change would ordinarily be made in a way to penalize the player for inactivity.

The variation of the exchange rate could also function as an auxiliary game. Thus, for example, a player with small winnings or a large loss of credits could, by placing an additional bet, take a chance on maximizing the monetary value of the winnings or minimizing the monetary value of loss by changing the exchange rate.

Credits

The underlying game may be any game played for credits, tokens chips etc.

There is an initial exchange rate, e.g., $1=1 credit. The player establishes an account in a certain amount of credits, e.g., the player pays $1000 to establish an account value of $1000 (which initially is equal to 1000 credits, but the value in credits will vary as the game is played). At all times, the system maintains two balances 1) the player's account value which serves as collateral to ensure that the player can cover any losses and may only be changed by depositing additional money or getting additional credit through the house and 2) the credits won/lost balance. The modified exchange rate will only be applied to the credit won/lost balance but the system will never allow the player to make a bet that would result in a negative account balance. The range of possible exchange rates may be altered to allow a player to continue playing when the value of the players current losings approaches the account value.

Frequency of Play

If the player is ahead (has a positive credit winnings balance), then the exchange rate is preferably increased by predetermined amount (either a fixed amount or fixed percentage) every time the player plays (such a by placing a bet). This encourages the player to play frequently and improves utilization of the underlying gaming system.

If the player is behind (has a negative credit winnings balance), then the exchange rate is preferably decreased by predetermined amount (either a fixed amount or fixed percentage) every time the player plays (such a by placing a bet).

This encourages the player to play frequently and improves utilization of the underlying gaming system.

Time

If the player is ahead (has a positive credit winnings balance), then the exchange rate is preferably decreased by predetermined amount (either a fixed amount or fixed percentage) whenever a predetermined time interval has passed without the player playing. This encourages the player to play frequently and improves utilization of the underlying gaming system.

If the player is behind (has a negative credit winnings balance), then the exchange rate is preferably increased by predetermined amount (either a fixed amount or fixed percentage) whenever a predetermined time interval has passed without the player playing. This encourages the player to play frequently and improves utilization of the underlying gaming system.

Auxiliary Game

Regardless of whether the player is ahead (has a positive credit winnings balance) or the player is behind (has a negative credit winnings balance), then the exchange rate is may gamble but system makes sure he can cover loss.

Rate could vary constantly (RANDOMLY) during game as well.

Cashing Out

The player may cash out at any time, but must start over.

Casino Gaming

Example 1

Player Always Plays within Specified Period

Initial Condition: Deposit $1000, RR = 1.0 Points = 1000

| Results | Dollar Value | RR | $ Value of Net | Net Results (in Points) |
|---|---|---|---|---|
| Result 1: Win 10 | 1010.50 | 1.0 | 10.50 | +10 |
| Result 2: Win 10 | 1022.00 | 1.10 | +22.00 | +20 |
| Result 3: Lose 10 | 1011.50 | 1.15 | +11.50 | +10 |
| Result 4: Lose 20 | +989.00 | 1.10 | −11.00 | −10 |
| Result 5: Lose 40 | −947.50 | 1.05 | −52.50 | −50 |
| Result 6: Win 80 | 1033.00 | 1.10 | +33.00 | +30 |
| Result 7: Lose 10 | | 1.15 | +23.00 | +20 |

STOP
Play Double or Nothing? Redemption Rate will be either 1.0 or 1.3, giving the participant a 50/50 chance of winning 20 or 26 instead of 23.

Casino Gaming

Example 2

Player Never Plays within Specified Period

Initial Condition: Deposit $1000, RR = 1:0 Points = 1000

| Results | Dollar Value | RR | $ Value of Net | Net Results (in Points) |
|---|---|---|---|---|
| Result 1: Win 10 | 1009.50 | .95 | 9.50 | +10 |
| Result 2: Win 10 | 1018.00 | .90 | 18.00 | +20 |
| Result 3: Lose 10 | 1008.50 | .85 | 8.50 | +10 |
| Result 4: Lose 20 | 991.00 | .90 | −9.00 | −10 |

-continued

Initial Condition: Deposit $1000, RR = 1:0 Points = 1000

| Results | Dollar Value | RR | $ Value of Net | Net Results (in Points) |
|---|---|---|---|---|
| Result 5: Lose 40 | 952.50 | .95 | −97.50 | −50 |
| Result 6: Win 80 | 1027 | .90 | +27 | +30 |
| Result 7: Lose 10 | 1017 | .85 | +17 | +20 |

STOP
Play Double or Nothing $14 Or 20 50/50 chance

Casino Gaming

Example 3

Player Playing the Same Bet ($100) and Always Playing within Specified Time Limit Initial Condition: Deposit $1000, RR = 1:0 Points = 1000

| Results | Dollar Value | RR | $ Value of Net | Net Results (in Points) |
|---|---|---|---|---|
| Result 1: Win 100 | 1105 | 1.05 | +105 | +100 |
| Result 2: Win 100 | 1220 | 1.10 | +220 | +200 |
| Result 3: Lose 100 | 1115 | 1.15 | +115 | +100 |
| Result 4: Lose 100 | 1000 | 1.15 | 0 | 0 |
| Result 5: Lose 100 | 890 | 1.10 | −110 | −100 |
| Result 6: Win 100 | 1000 | 1.10 | 0 | 0 |
| Result 7: Lose 100 | 895 | 1.05 | −105 | −100 |

Casino Gaming

Example 4

Player Playing the Same Bet ($100) and Never Playing within Specified Time Limit Initial Condition: Deposit $1000, RR = 1:0 Points = 1000

| Results | Dollar Value | RR | $ Value of Net | Net Results (in Points) |
|---|---|---|---|---|
| Result 1: Win 100 | 1095 | 0.95 | +95 | +100 |
| Result 2: Win 100 | 1180 | 0.90 | +180 | +200 |
| Result 3: Lose 100 | 1085 | 0.85 | +85 | +100 |
| Result 4: Lose 100 | 1000 | 0.85 | 0 | 0 |
| Result 5: Lose 100 | 910 | 0.90 | −90 | −100 |
| Result 6: Win 100 | 1000 | 0.90 | 0 | 0 |
| Result 7: Lose 100 | 905 | 0.95 | −95 | −100 |

Figure 5:
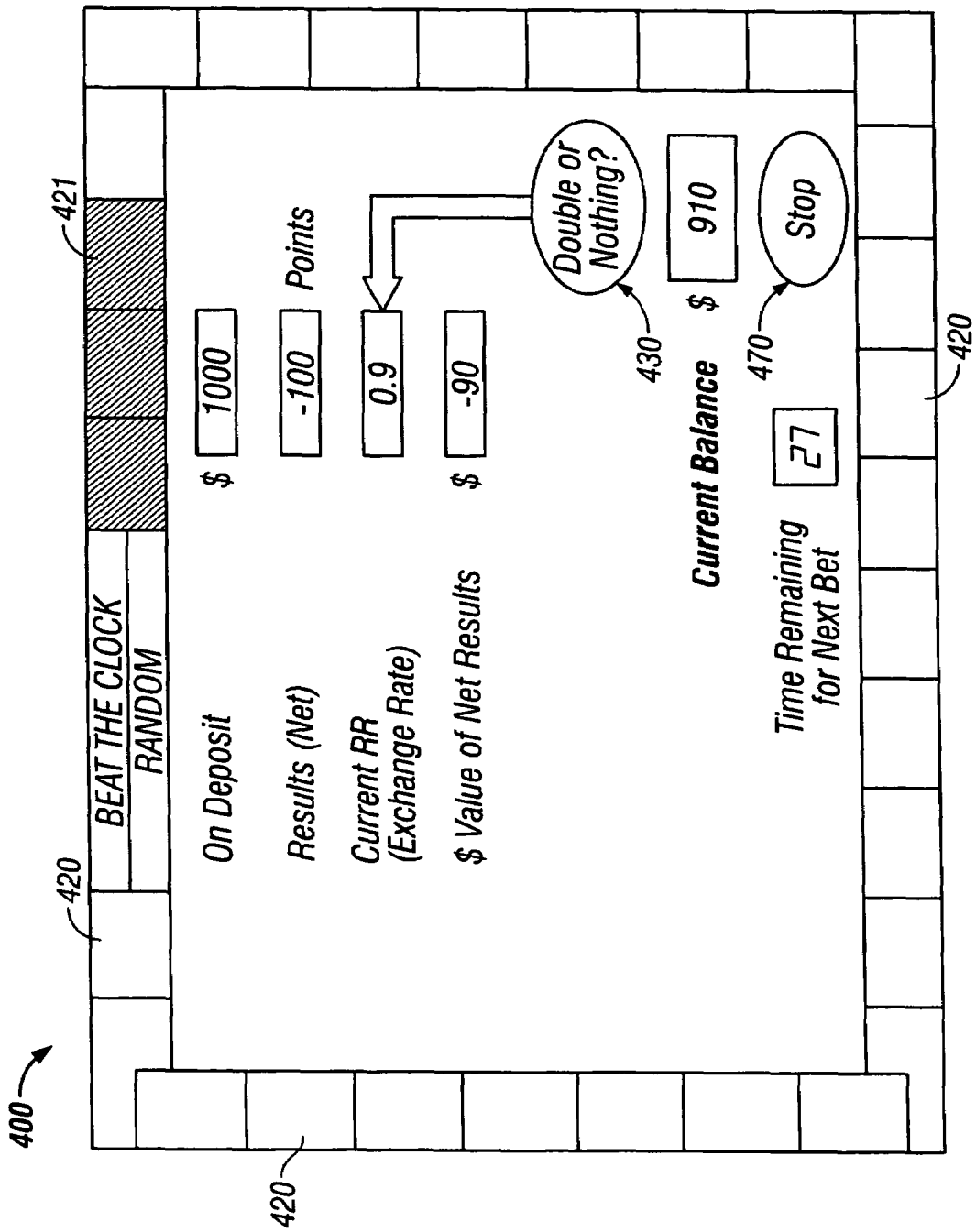
FIG. 5 shows a display for use in a casino gaming device according to the present invention.

FIG. 5 shows an example of the screen display that could be used in connection with the casino gaming system of the present invention. The display 400 is designed to be used in conjunction with the display for the underlying game. The preferably includes information concerning the amount of dollars on deposit, the results (and points), the current redemption rate (exchange rate), the dollar value of the net results determined by applying the current exchange rate and the current balance, which is the sum of the amount on deposit and the dollar value of net results.

The display shown in FIG. 5 also designed to allow participants to engage in various auxiliary games. The underlying game in this example is referred to as "beat the clock" and is based on a time-based incentive, whereby the user's redemption rate is adjusted in a favorable direction if the user plays the game within 30 seconds from the end of the previous game.

The display shown in FIG. 5 displays the time remaining for the next bet in a digital display. In addition, a display includes a visual display to graphically illustrate the time remaining. In particular, the border of the display includes 30 blocks 420 that can be selectively illuminated or turned off. When the clock is reset to 30 seconds (at the conclusion of the previous game), all 30 blocks 420 are lit. However, as the clock counts down, one block is turned off each second so that, in the example shown with 27 seconds remaining, there are 27 illuminated blocks and 3 unilluminated blocks. Naturally, other forms of graphical visual display could be used. These graphical visual displays provide both information and excitement for the user. The particular display shown in FIG. 5 also includes a stop button 470 by which the user can stop using the machine, but cash out of the machine. The display also includes a button 430, which allows the user to select a double or nothing option after hitting the stop button.

Finally, the display shown in FIG. 5 includes a random redemption rate option that, in the example shown is not selected, but could be selected by a user to add an element of change to the redemption rate, if desired.

In accordance with another aspect of the present invention, the use of wireless connectivity according to the Bluetooth protocol or a similar protocol is also useful in the context of casino gaming. To begin with, wireless connectivity enabled smart cards of the type described herein could allow casino patrons to wager without using cash or credit, but instead by simply using a debit card. A more sophisticated application could include "smart playing chips." The smart playing chips of the present invention are, in reality, wireless computers that contain an electronic monetary value or communicate with a nearby computer containing a monetary value. The smart playing chips also communicate with the gaming table on which they are used so that the table can read the location of the chip on the table and the monetary value of the chip. The chip could contain a plurality of monetary values reflecting a player's "BALANCE AMOUNT" and "BET AMOUNT," for example. The chip could also display one or more of the monetary values stored thereon. Finally, the chip could include a user interface that would allow the user to alter, for example the "BET AMOUNT." In use, a player with a wireless communication enabled smart chip can set the chip to a certain bet value (which must be less than or equal to the monetary value available to that chip's owner) and place the bet by locating the smart chip on a location within the gaming table (which could correspond to a specific bet on a crap's table, a roulette table or a blackjack game). The gaming table is also wireless communication enabled and designed so that the table can recognize both the location of the chips (and hence the nature of the bet) and the amount of the wager. When the outcome of game is determined, the system credits are debits the smart chips in play according to the results of the bet. With the use of smart chips as described above, a casino can greatly increase the frequency of plays and hence the utilization of equipment. Moreover, the use of smart chips and electronically stored monetary values makes it easier to use the incentive program of the present invention in connection with a wide variety of casino games.

Figure 5A:
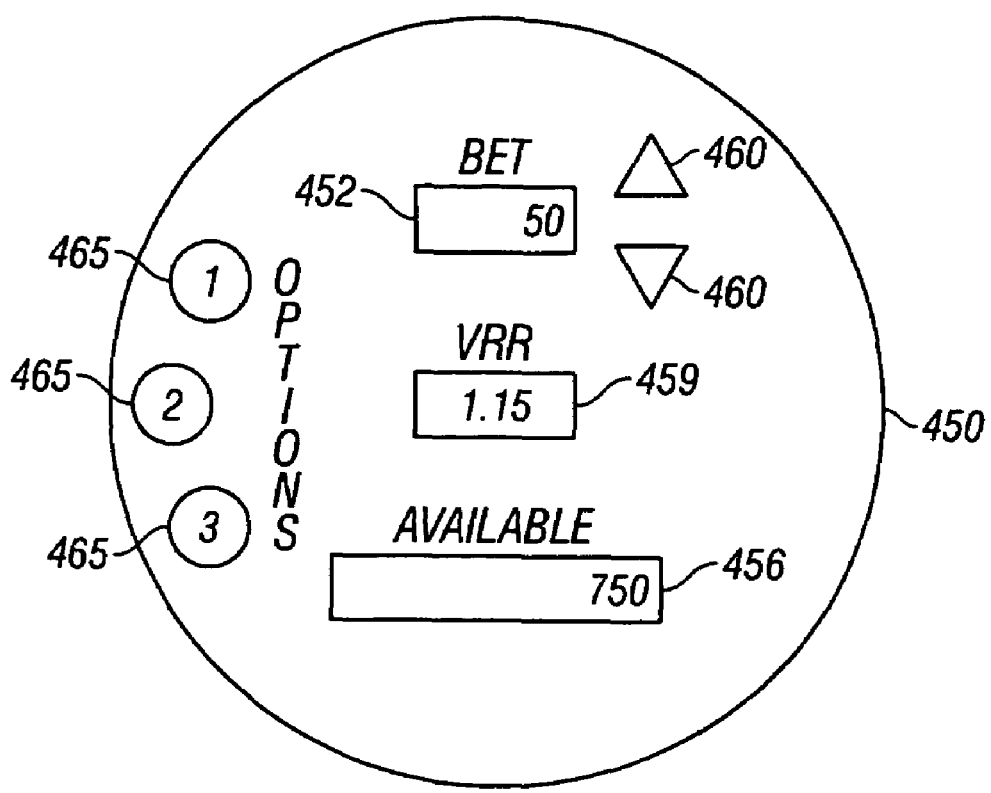
FIG. 5A shows a wireless connectivity enabled smart chip for use in casino gaming.

In the example shown in FIG. 5A, the wireless connectivity enabled smart chip 450 for use in casino gaming includes a BET display 452, a VRR (the chip holder's individual variable redemption rate) display 454 and an available amount display 456. Preferably the chip holder cannot directly alter the available amount. Instead, the available amount can only be altered by a wireless connectivity enabled smart table (as a result of a wager) or a cashier agent (which may be human or automated). The chip includes an interface in the form of up and down arrows 460 to allow the chip holder to set a bet amount. The chip further includes a set of option buttons 465 for selecting or setting options associated with the particular game in which the chip is being used.

Figure 5B:
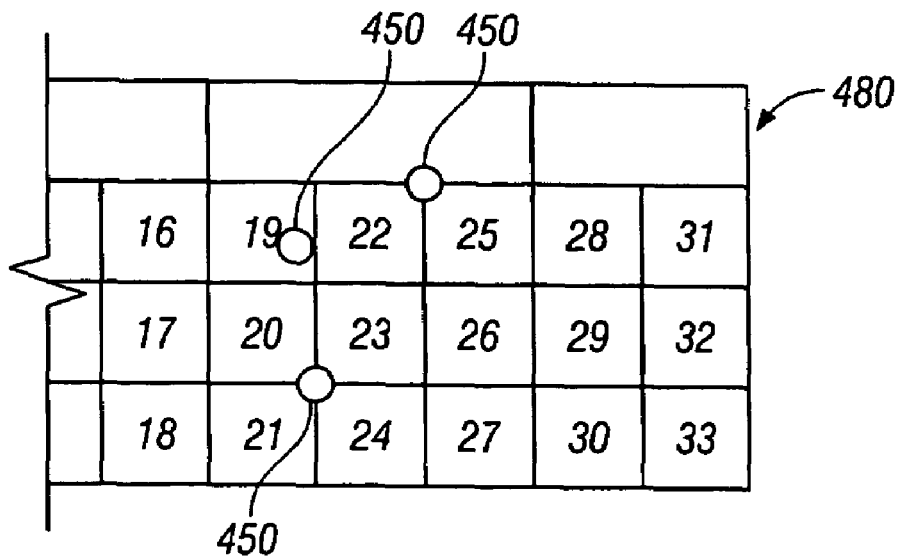
FIG. 5B shows a wireless connectivity enabled smart table for use with smart chips in casino gaming.

FIG. 5B shows a wireless connectivity enabled smart table 480 for use with smart chips in casino gaming. In the example shown, the table is a roulette type table where the table can detect the location of chips 450 on the table (by sensors and/or radio signals) and the amount of bet on each chip. Since the location of the chips on the table determine the nature of the bet, the table can read the bets on table. If there is any ambiguity (such as a chip located between two betting positions), the system alerts the table operator and the conflict is resolved before the game is played. In the example shown, the table might find an ambiguity in the position of the chip near the "19" spot. The other bets would, however, be easily determined by the table. When the outcome of bets is determined, the table processes the results and resets the chip values according to the results of the game.

Other Applications

As mentioned before, the system and method of the present invention are applicable to incentive programs that use "points" as a basis for rewards. Such point-based programs are becoming increasingly prevalent and this trend should continue. Thus, it is expected that other applications for the present invention will continue to emerge.

For example, fitness clubs have recently begun to use point-based systems for recognizing/rewarding club members (participants) who reach certain milestones in accumulated points. In the FITLINXX™ program, for example, points are earned for certain participant actions. It is recognized, however, that frequency of exercise is critical. Using the system of the present invention, the club could reward participants for frequency and consistency of working out. Conversely, participants could be penalized for skipping a workout for waiting too long between workouts.

The present invention could also apply to diet programs, educational programs and athletic training programs provided there is some way for participants to earn points. Simply put, if there is a way for participants to earn points, applying a variable redemption rate for converting points to rewards offers the possibility of structuring enhanced incentives and increasing participant loyalty.

Customized Incentive Programs

Figures 1, 9:
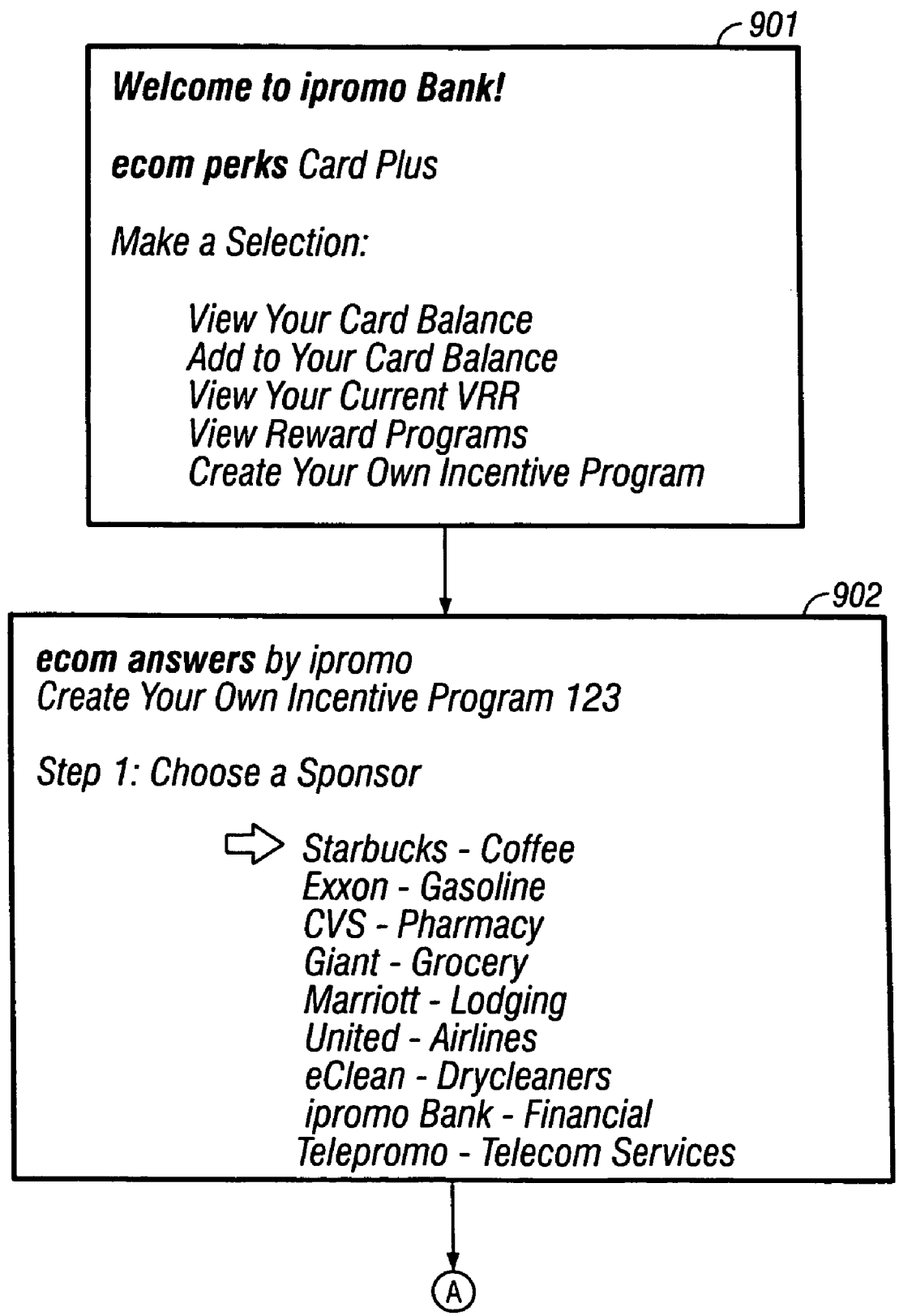
FIG. 9 illustrates the screen sequence and flow in connection with an embodiment of the customized incentive program feature of the present invention using a web site.
Figures 2, 9:
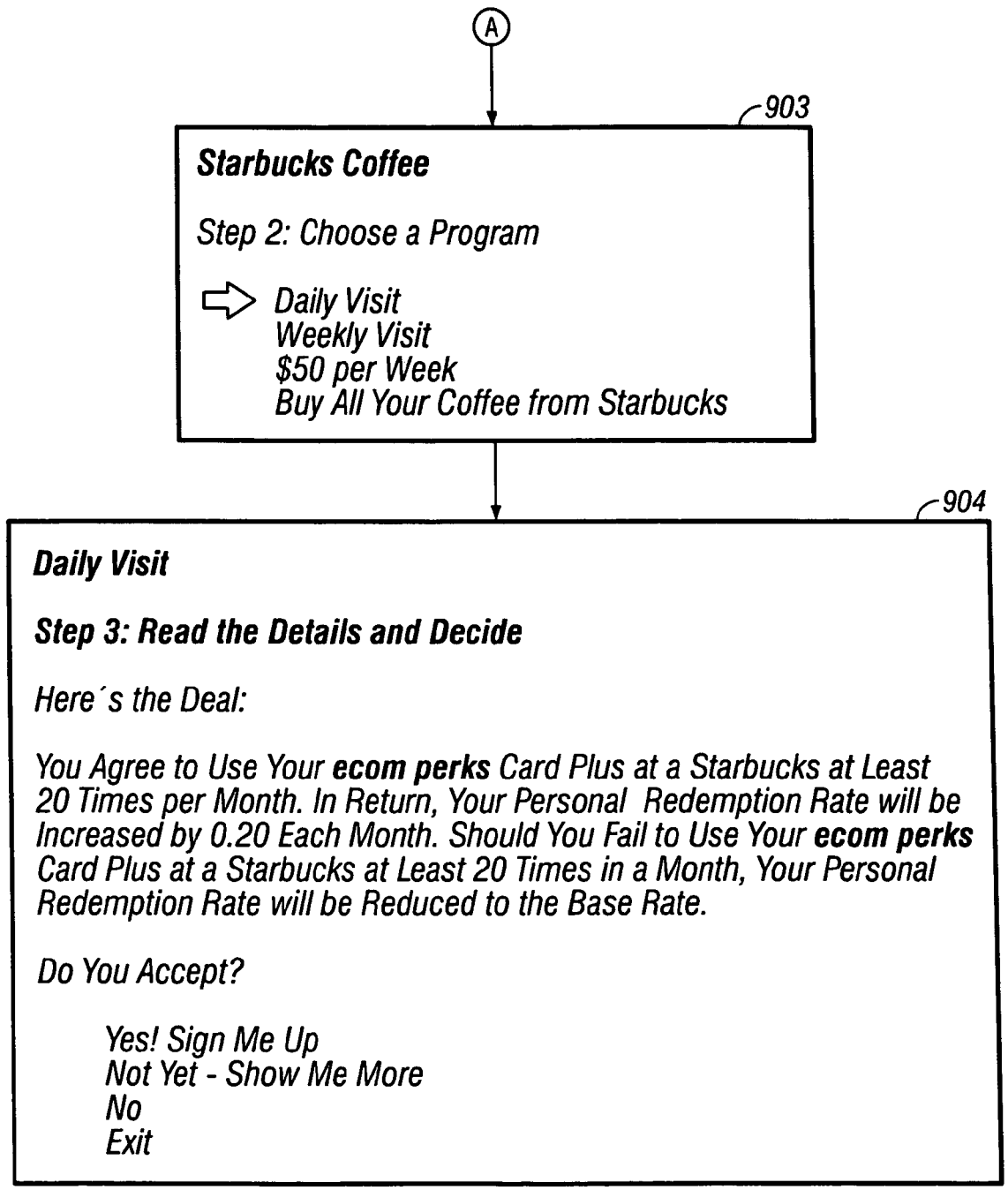

The currently preferred form of the system and method for mass customization of incentive programs will now be described with reference to FIGS. 9-9H.

In the embodiment shown, the customized incentive program is operated by a bank, ipromo Bank, in conjunction with a series of sponsoring companies that agree accept the bank's smart card and provide compensation, discounts and/or in kind benefits for being included in the program. The bank operates a web site that includes a welcome page 901. The bank issues users a smart card, referred to as the ecom perks Card Plus. The smart card is preferably a debit-type card in which a monetary value is stored on the card and debited at the point of sale. The card could, however, be a credit card or a combined debit/credit card.

The smart card preferably has some way of determining the geographic proximity of the location of its use. This could be accomplished by using the card in conjunction with the cellular position location feature of the present invention or by maintaining a database that correlates the point of sale of a transaction with a geographic location. For example, a database could store the fact that a bank's ATM #327 is located in Chicago, Ill. while ATM #456 is in Bethesda, Md. One advantage of a smart card that has some way of determining the geographic proximity of the location of its use, is that it makes it possible to enforce requirements that a cardholder use a card at regular intervals, while excusing required use when the cardholder is at a remote location.

In the preferred embodiment, the system operator operates a web site 902, in this instance, "ecom answers by ipromo" that includes a feature referred to as "Create your own incentive program 123." The site allows users to create a custom incentive program in three steps. First, the user is presented with a list of the sponsoring companies that agree to offer one or more incentives to users in exchange for some form of user commitment. The site preferably displays the sponsoring companies' names and logos as well as an indication of the nature of the products or services offered by the sponsoring company. In the example shown there is only one sponsor for each category of good or service. Alternatively, the site could display categories of goods or services, e.g., "groceries," "gas stations" and "hotels," that include a variety of sponsoring companies from which the user may choose.

In the example shown, the user is given the following options:

Starbucks—Coffee
Exxon—Gasoline
CVS—Pharmacy
Giant—Grocery
Marriott—Lodging
United—Airlines
eClean—Dry cleaners
ipromo Bank—Financial
Telepromo—telecom services The user selects "Starbucks Coffee" and then proceeds to step 2 on page 903.

At Step 2, the user is prompted to choose from one or more incentive program components offered by the selected sponsor, in this case, Starbucks Coffee. As shown, under the caption "Choose a Program," the user is presented with the brief name of the following incentive programs:

Daily Visit
Weekly visit
$50 per week
Buy all your coffee from Starbucks

By selecting any of the programs listed, the user will proceed to Step 3 and be provided with details of the selected program. In the example, shown, the user selects the "Daily Visit" program.

At Step 3 on page 904, the user is provided with details of the selected program, Daily Visit under the caption "Step 3: Read the Details and Decide." In this example, the user must agree to use the smart card at the sponsor (here, Starbucks) at least 20 times per month. In return, the user receives something of value, here the user's personal redemption rate will be increased by 0.20 each month the terms are satisfied. On the other hand, if the user fails to keep the user's commitment, i.e., use the smart card at a Starbucks at least 20 times in a month, the user will be penalized, here the user's personal redemption rate will be reduced to the base rate.

Having been advised of the details of the incentive component the user is given the opportunity to Accept (sign up for the incentive component), Defer (ask to be shown more information or other components), Decline or Exit.

Figure 9A:
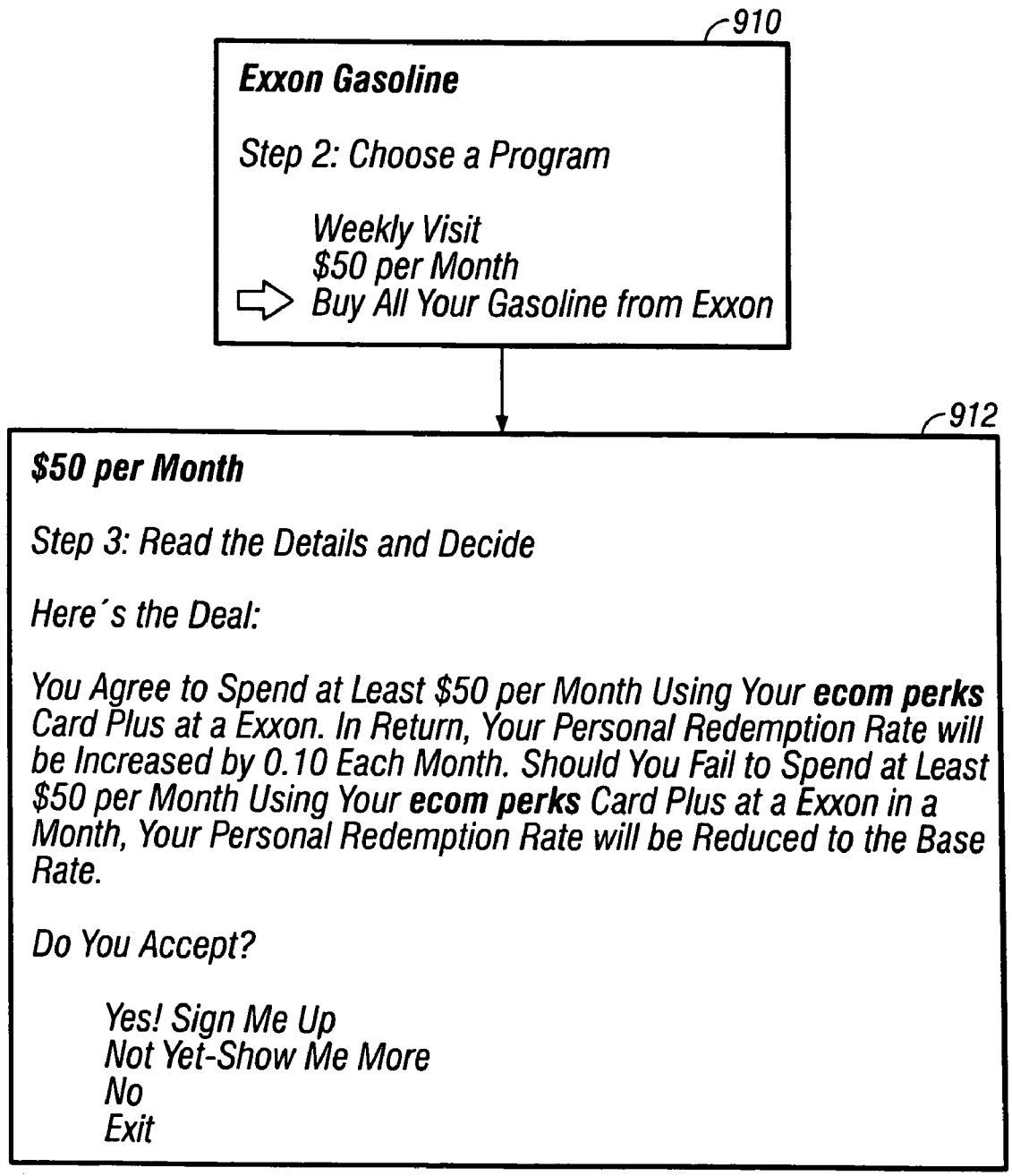
FIG. 9A shows another example of the customized incentive program of the present invention.

In the next example, shown on FIG. 9A, the user selects "Exxon Gasoline" at page 910 and then proceeds to step 2.

At Step 2, the user is prompted to choose from one or more incentive program components offered by the selected sponsor, in this case, Exxon Gasoline. As shown, under the caption "Choose a Program," the user is presented with the brief name of the following incentive programs:

Weekly visit
$50 per month
Buy all your gasoline from Exxon

By selecting any of the programs listed, the user will proceed to Step 3 and be provided with details of the selected program. In the example, shown, the user selects the "$50 per month" program component.

At Step 3 on page 912, the user is provided with details of the selected program, $50 per month, under the caption "Step 3: Read the Details and Decide." In this example, the user must make a commitment, i.e., agree to use the smart card to spend at least $50 per month at Exxon. In return, the user is rewarded, i.e., the user's personal redemption rate will be increased by 0.10 each month. Should the user fail to keep the commitment, i.e., should the user fail to spend at least $50 per month using the smart card at Exxon in a month, the user is penalized, i.e., the user's personal redemption rate will be reduced to the base rate.

Having been advised of the details of the incentive component the user is given the opportunity to Accept (sign up for the incentive component), Defer (ask to be shown more information or other components), Decline or Exit.

Figure 9B:
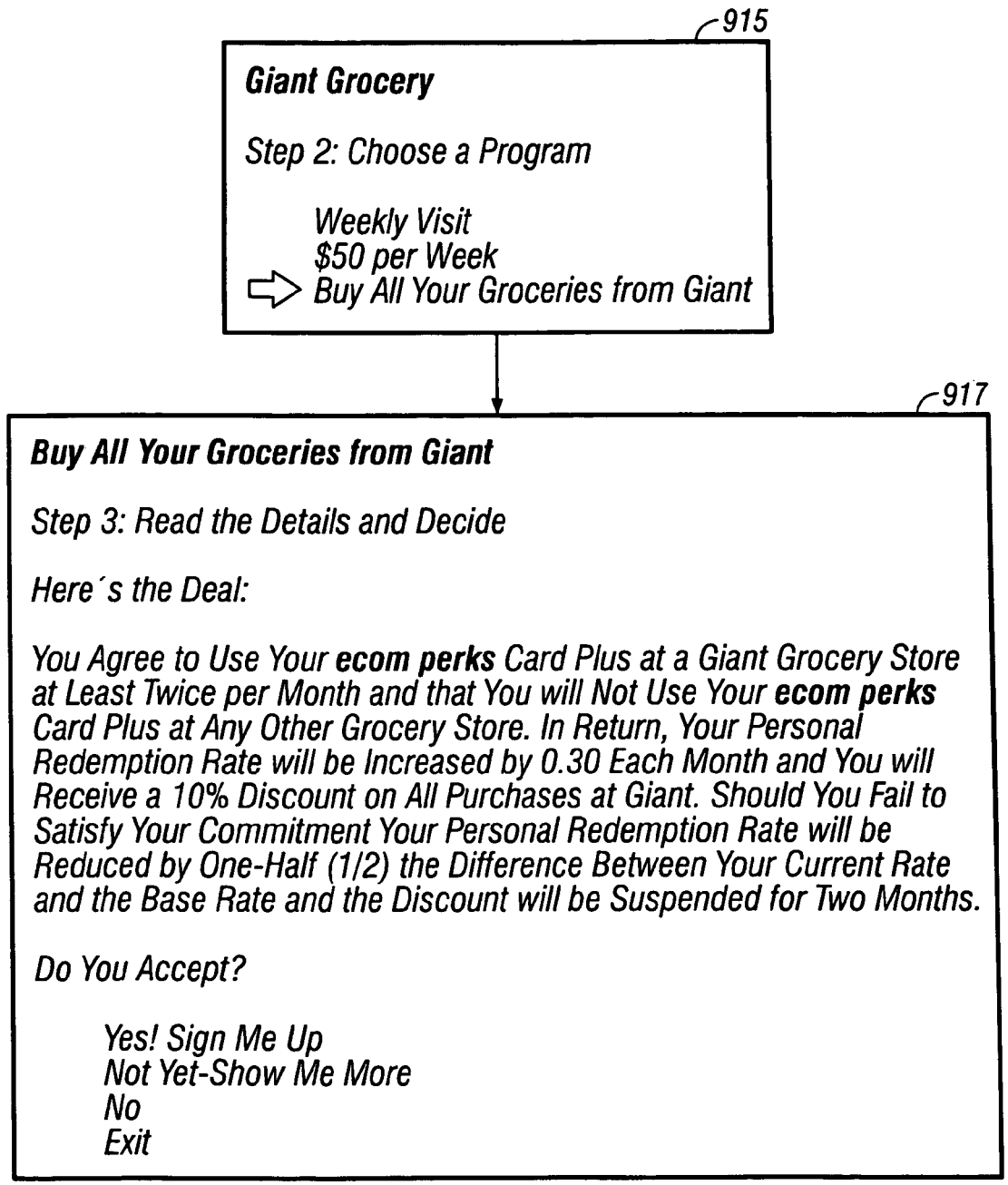
FIG. 9B shows another embodiment of the customized incentive program of the present invention.

In the next example, shown on FIG. 9B, the user selects "Giant Grocery" at page 915 and then proceeds to step 2. At Step 2, page 917, the user is prompted to choose from one or more incentive program components offered by the selected sponsor, in this case, Giant Grocery. As shown, under the caption "Choose a Program," the user is presented with the brief name of the following incentive programs:

Weekly visit
$50 per week
Buy all your groceries from Giant

By selecting any of the programs listed, the user will proceed to Step 3 and be provided with details of the selected program. In the example, shown, the user selects the "Buy all your groceries from Giant" program component.

At Step 3 on page 912, the user is provided with details of the selected program, Buy all your groceries from Giant, under the caption "Step 3: Read the Details and Decide." In this example, the user must make a commitment, i.e., agree to use the smart card at a Giant Grocery Store at least twice per month (which is assumed to be roughly indicative of buying all groceries) and further agree not to use the card at any other grocery store. In return, the user is rewarded, i.e., the user's personal redemption rate will be increased by 0.30 each month and the user will receive a 10% discount on all purchases at Giant. If the user fails to satisfy the commitment, the user is penalized, i.e., the user's personal redemption rate will be reduced by one-half (½) the difference between the current rate and the base rate and the discount will be suspended for two months.

Having been advised of the details of the incentive component the user is given the opportunity to Accept (sign up for the incentive component), Defer (ask to be shown more information or other components), Decline or Exit.

Figure 9C:
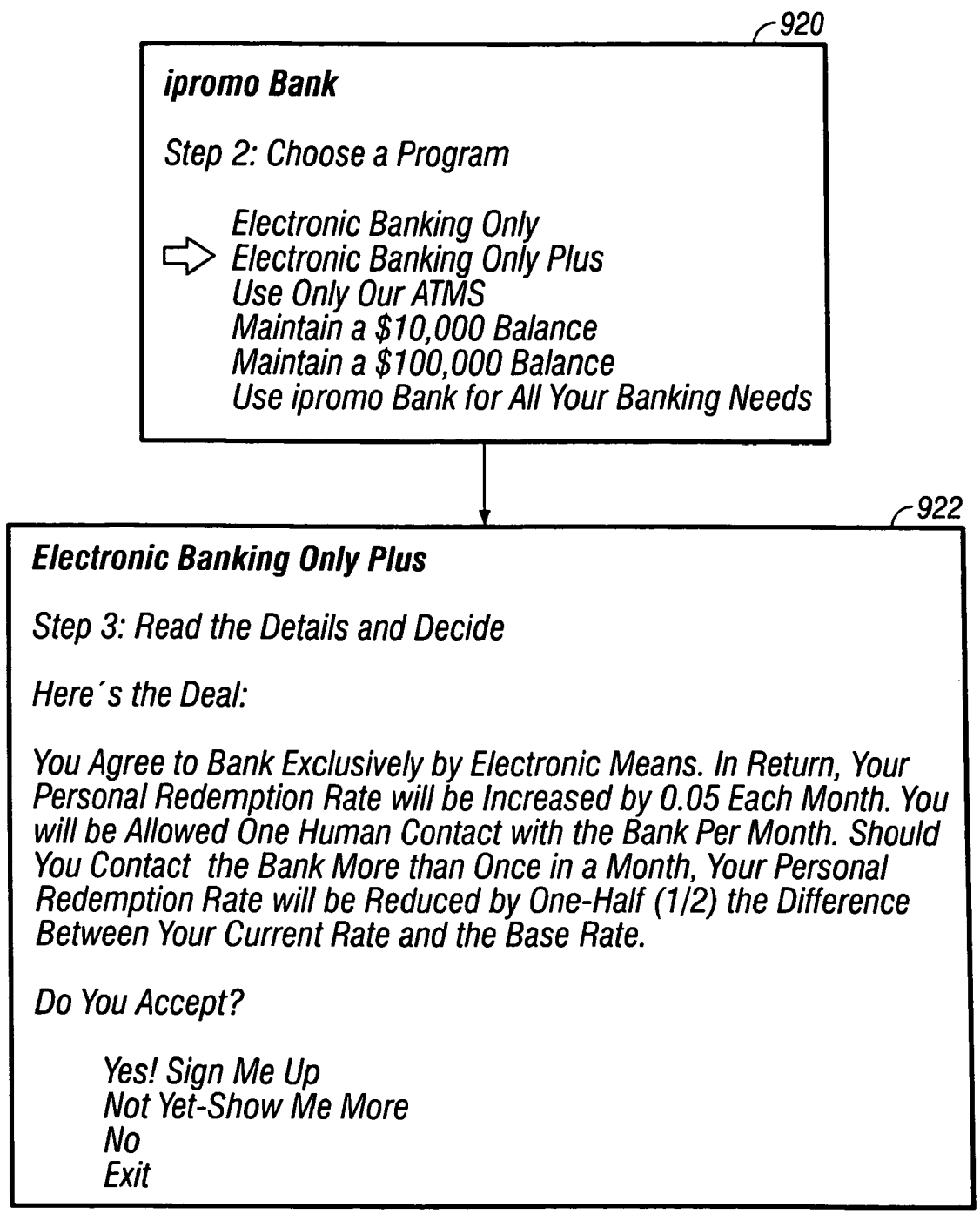
FIG. 9C shows another embodiment of the custom incentive program of the present invention.

In the next example, shown on FIG. 9C, the user selects "ipromo Bank" and then proceeds to step 2. At Step 2 on page 920, the user is prompted to choose from one or more incentive program components offered by the selected sponsor, in this case, ipromo Bank. As shown, under the caption "Choose a Program," the user is presented with the brief name of the following incentive programs:

Electronic Banking Only
Electronic Banking Only Plus
Use only our ATMS
Maintain a $10,000 Balance
Maintain a $100,000 Balance
Use ipromo Bank for all your banking needs By selecting any of the programs listed, the user will proceed to Step 3 and be provided with details of the selected program. In the example, shown, the user selects the "Electronic Banking Only Plus" program component.

At Step 3 on page 922, the user is provided with details of the selected program, Electronic Banking Only Plus, under the caption "Step 3: Read the Details and Decide." In this example, the user must make a commitment, i.e., agree to bank exclusively by electronic means. In return, the user is rewarded, i.e., the user's personal redemption rate will be increased by 0.05 each month. To make the commitment more palatable, the user is permitted one human contact with the bank pre month. If the user fails to satisfy the commitment, i.e., should the user make human contact with the bank more than once in a month, the user will be penalized, i.e., the user's personal redemption rate will be reduced by one-half (½) the difference between the current rate and the base rate.

Having been advised of the details of the incentive component the user is given the opportunity to Accept (sign up for the incentive component), Defer (ask to be shown more information or other components), Decline or Exit.

Figure 9D:
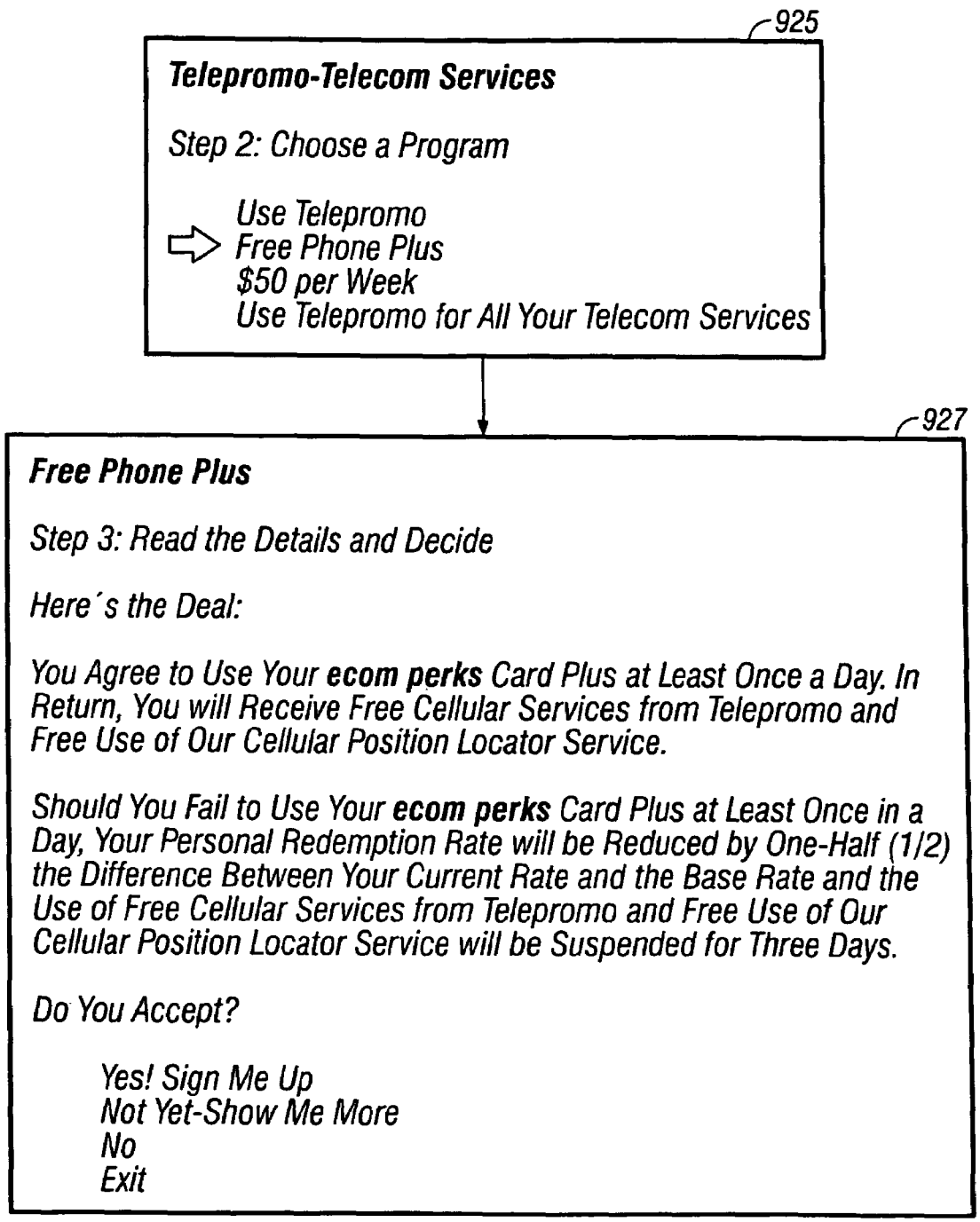
FIG. 9D shows another embodiment of the custom incentive program of the present invention.

In the next example, shown on FIG. 9D, the user selects "Telepromo" and then proceeds to step 2. At Step 2, page 925, the user is prompted to choose from one or more incentive program components offered by the selected sponsor, in this case, Telepromo. As shown, under the caption "Choose a Program," the user is presented with the brief name of the following incentive programs:

Use Telepromo
Free Phone Plus
$50 per week
Use Telepromo for all you telecom services By selecting any of the programs listed, the user will proceed to Step 3 and be provided with details of the selected program. In the example, shown, the user selects the "Free Phone Plus" program component.

At Step 3, page 927, the user is provided with details of the selected program, Free Phone Plus, under the caption "Step 3: Read the Details and Decide." In this example, the user must make a commitment, i.e., agree to use the smart card at least once a day. If the user maintains the commitment, the user is rewarded, i.e., the user receives free cellular services and free use of a cellular position locator service. This provides a powerful incentive for smart card usage, which is integral to success of the overall program. Should the user fail to maintain the commitment, i.e., should the user fail to use the smart card at least once in a day, the user will be penalized, i.e., the user's personal redemption rate will be reduced by one-half (½) the difference between the current rate and the base rate and the use of free cellular services and free use of our cellular position locator service will be suspended for three days.

Having been advised of the details of the incentive component the user is given the opportunity to Accept (sign up for the incentive component), Defer (ask to be shown more information or other components), Decline or Exit.

This last example illustrates how various aspects of the present invention can be linked together to provided a comprehensive system and method for promoting electronic commerce in a networked economy. The web sites explaining the individual incentive components could also provide information about the sponsor companies and be included in the cellular position locator merchant database.

Once a customer has selected one or more incentive program components, the system creates a record of the program components selected and associates that record with the user id. This record could be maintained centrally, at the point of sale and/or on the user's smart card. Likewise, the enforcement function, i.e., ensuring that the user complies with selected commitments, and reward function, e.g., making adjustments to redemption rate and authoring and recording discounts, could be conducted centrally, at the point of sale and/or on the user's smart card.

Though the customized incentive system and method has been described in the context of a web site that allows users to create a program using components from a variety of sponsors, it should be understood that a single company (sponsor) could use the customized incentive system through a web site or other forms of receiving user input. In such a case, the sponsor, who may also be the system operator (or not) could provide its own customizable incentive program that solicits commitments, rewards users for maintaining commitments and penalizes users that fail to maintain commitments.

One important aspect of the smart card based incentive programs program is to make the card so attractive to use that cardholders will want to use the card for most, if not all, their purchases. When cardholders use the smart card for most, if not all, their purchases, it becomes easier to monitor the users commercial behavior, which is valuable in and of itself, but also important to enforce user commitments. To encourage card use, the user could be given a discount on all purchases depending on redemption rate and an extra discount at sponsoring merchants.

Naturally, other ways of monitoring use could be used including review of transaction records submitted by participating merchants (e.g., credit card charges). The use a smart card that can store transaction information is, however, particularly useful.

In the forgoing examples, certain incentive components require use of the card once a day or once a week. However, when such components are used for local or regional merchants, e.g., banks, grocery stores or dry cleaners, it may not be possible to comply with the commitment when the user is out of the area. To make the commitment more palatable, therefore, the system and method preferably provided means for excusing certain legitimate instances of non-compliance. In the case of the user being out of area, for example, the smart card could automatically excuse users that are located out of the designated area. In this regard, as noted above, the smart card preferably has some way of determining the geographic proximity of the location of its use. Alternatively, the system could provide ways for the user to "log out" of the program. Preferably such a system would require that the user be located outside the region. Thus the user would be required to use a personal communication device or smart card from outside the region. Alternatively, the user could "report out" of the system by using an ATM machine in a remote location so that if the user uses a card at a remote location the user will be excused from obligation for a defined period.

As shown in FIGS. 9E-9H, the customized incentive system and method of the present invention may also be used in the context of business to business commerce. Participants in this context are businesses that buy from the sponsor. Loyalty and consistency programs are especially useful. A variable redemption rate system can be used to reduce cost to the participant by rebate or discount. In particular, it is known to provide discounts according to volume of past purchasing history. With the present invention, however, it is possible to automatically provide discounts for other desirable actions such as loyalty and consistency of purchase according to a set of objective rules that are monitored and enforced automatically.

In the case of discount, the amount of discount is inversely proportional to redemption rate (unless redemption rate is negatively incremented (decremented) for actions that are encouraged). To simplify matters, each customer could be assigned a discount rate that varies incrementally according to the objective rules of the particular program.

Figure 9E:
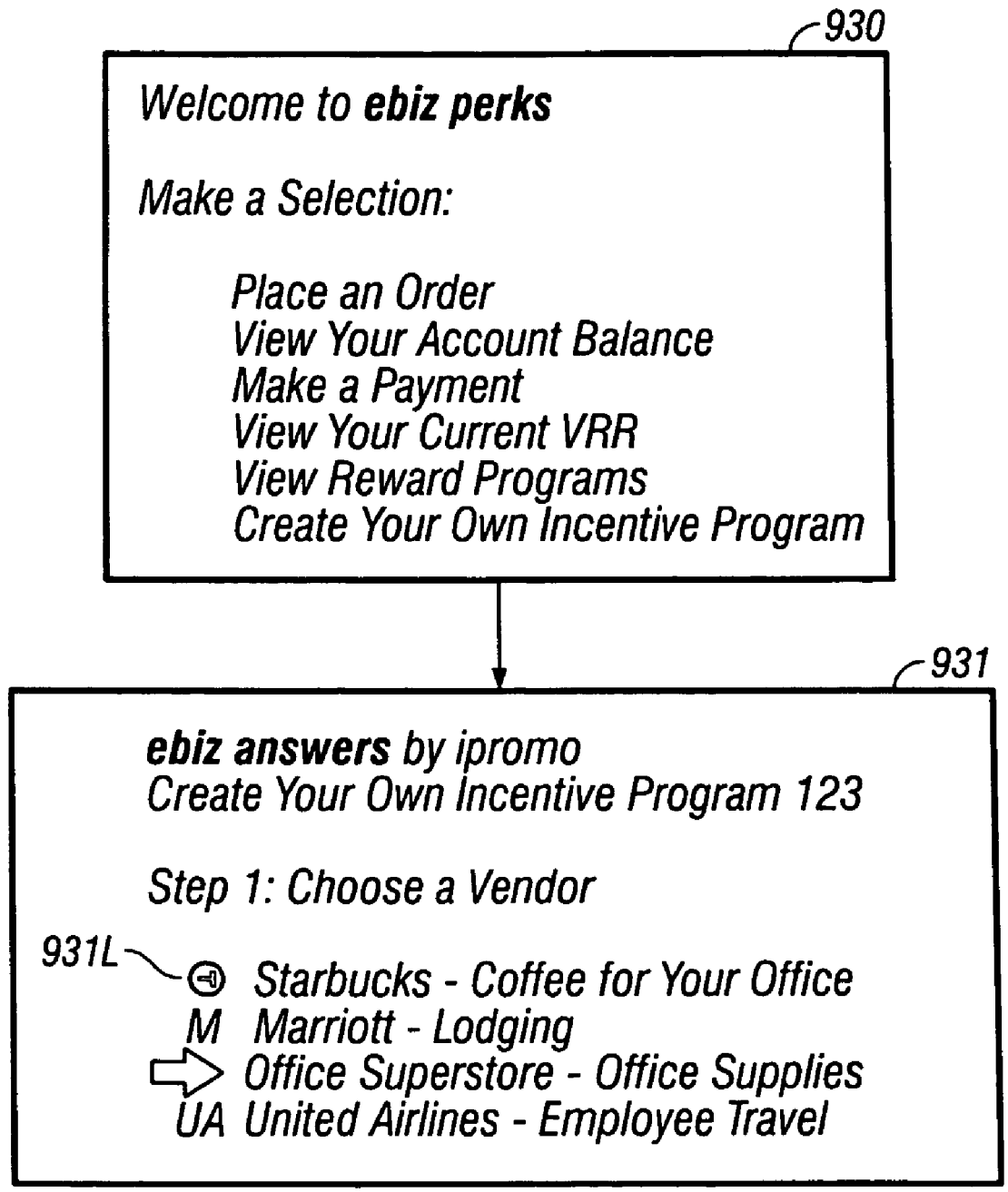
FIG. 9E shows an example of a customized business to business incentive program according to the present invention that is conducted sing web sites and initial screen flow in connection with this system and method.
Figure 9F:
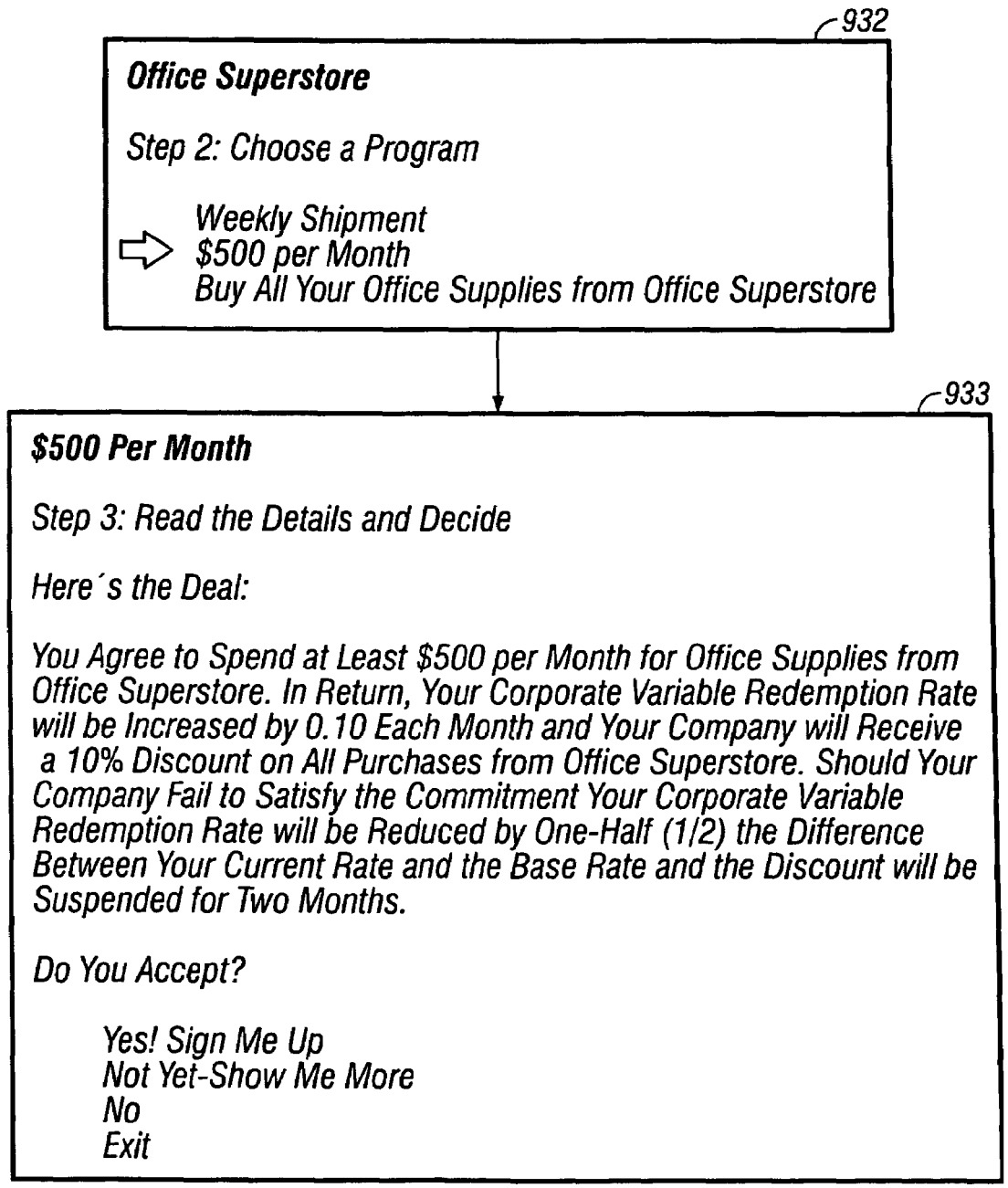
FIG. 9F shows additional screens and steps used in connection with the custom business to business incentive program of the present invention.

In the business-to-business context, it is easier to track participant's actions with current technology. Examples of actions that could, in accordance with various aspects of the present invention, be incentivized, include consistency of purchases and loyalty. Consistency of purchases could be rewarded (through increases in a customer's discount or redemption rate), every consecutive week in which an order is placed. Loyalty could be rewarded by increasing the participant's redemption (or discount) rate for not purchasing from competitors or from purchasing in response to special motions. Here, the redemption rate could, in accordance with another aspect of the present invention, be tried directly to a discount. Thus, if a participant has a redemption rate of seven, they will be allowed to buy goods or services in 93 percent of the normal cost (100%-7% discount). Alternatively, the redemption rate could, in accordance with another aspect of the present invention, be used in combination with rebate program in which participants earn rebates from sponsors and the value of those rebates could depend on redemption rate as described previously. FIGS. 9E and 9F show a preferred embodiment in which the system operator, ebiz perks (page 930) operates a web site, in this instance, "ebiz answers by ipromo" at page 931, that includes a feature referred to as "Create your own incentive program 123." The site allows users to create a custom incentive program in three steps. First, at page 931, the user is presented with a list of the sponsoring vendors that agree to offer one or more incentives to users in exchange for some form of user commitment. The site preferably displays the sponsoring vendor's names and logos 931 L as well as an indication of the nature of the products or services offered by the sponsoring company. In the example shown there is only one sponsor for each category of good or service. Alternatively, the site could display categories of goods or services, e.g., "raw materials," "office supplies" and "travel," that include a variety of sponsoring vendors from which the user may choose.

In the example shown, the user is given the following options:

Starbucks—coffee for your office
Marriott—Lodging
OfficeSuperstore—Office Supplies
United Airlines—employee travel The user selects "OfficeSuperstore" and then proceeds to step 2, page 932.

As shown in FIG. 9F, at Step 2, the user is prompted to choose from one or more incentive program components offered by the selected sponsor, in this case, OfficeSuperstore. As shown, under the caption "Choose a Program," the user is presented with the brief name of the following incentive programs:

Weekly Shipment
$500 per month
Buy all your office supplies from Office Superstore By selecting any of the programs listed, the user will proceed to Step 3 (page 933) and be provided with details of the selected program. In the example, shown, the user selects the "$500 per month" program component.

At Step 3, the user is provided with details of the selected program, $500 per month, under the caption "Step 3: Read the Details and Decide." In this example, the user must agree to spend at least $500 per month for office supplies from Office Superstore. In return, the user receives something of value, i.e., the corporate variable redemption rate will be increased by 0.10 each month and the company will receive a 10% discount on all purchases from Office Superstore. Should the company fail to satisfy the commitment, i.e., fail to spend at least $500 in a month for office supplies from Office Superstore, the company will be penalized, i.e., the corporate variable redemption rate will be reduced by one-half (½) the difference between the current rate and the base rate and the discount will be suspended for two months.

Having been advised of the details of the incentive component the user is given the opportunity to Accept (sign up for the incentive component), Defer (ask to be shown more information or other components), Decline or Exit.

Figure 9G:
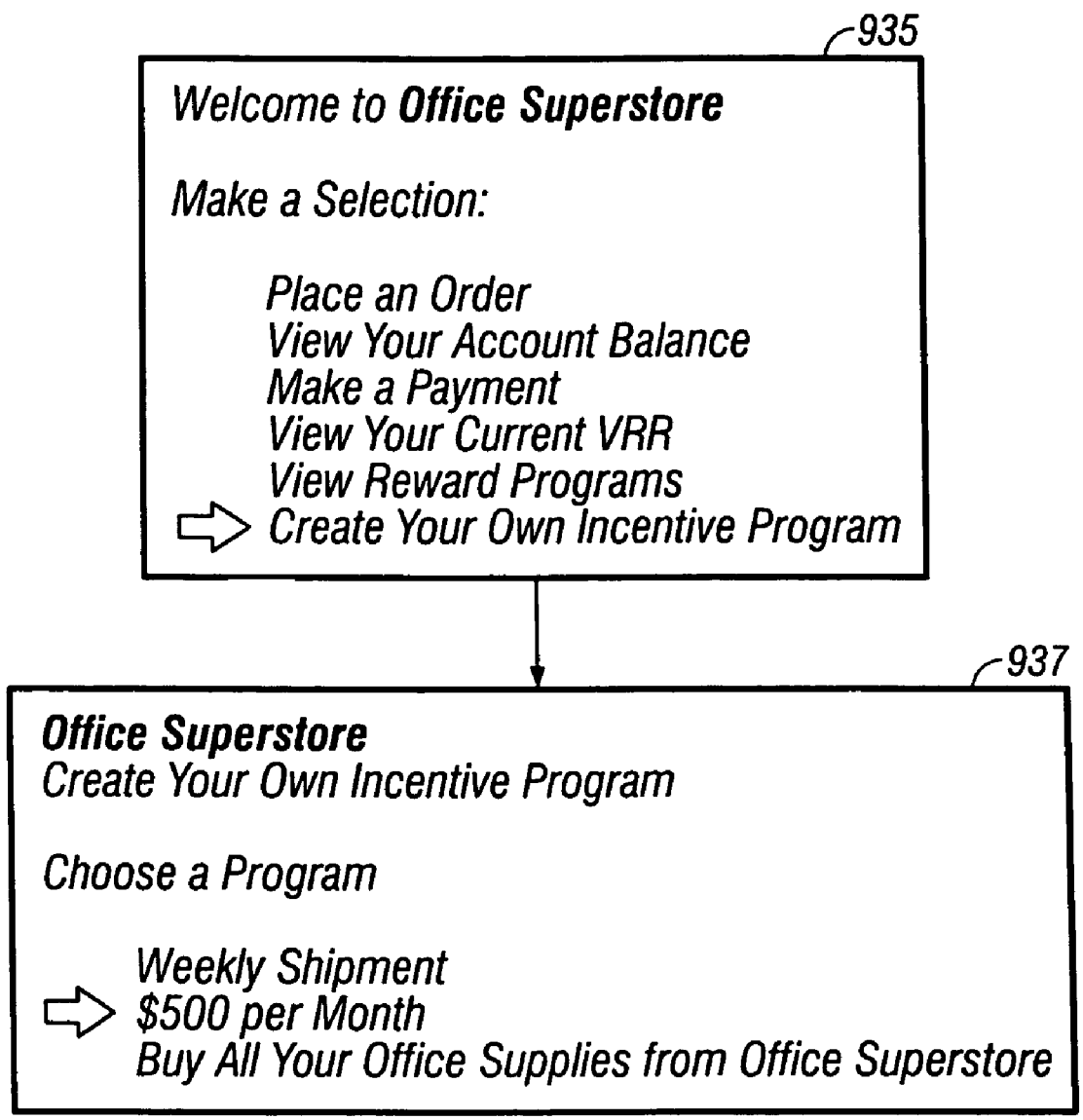
FIG. 9G shows an embodiment of the custom business to business incentive in which the incentive program is operated by an individual vendor using the vendor's web site.

Though the customized business to business incentive system and method was described in the context of a web site that allows users to create a program using components from a variety of vendors, it should be understood that a single company (vendor) could use the customized incentive system through a web site or other forms of receiving user input. In such a case, the vendor, who may also be the system operator (or not) could provide its own customizable incentive program that solicits commitments, rewards users for maintaining commitments and penalizes users that fail to maintain commitments. FIGS. 9G and (H illustrate an example of a vendor-operated site.

In the example shown in FIGS. 9G and 9H, the user enters a vendor web site for "OfficeSuperstore," at page 935. The user is prompted to choose from one or more incentive program components offered by OfficeSuperstore at page 937. As shown, under the caption "Choose a Program," the user is presented with the brief name of the following incentive programs:

Weekly Shipment
$500 per month
Buy all your office supplies from Office Superstore By selecting any of the programs listed, the user will proceed to the next step shown in FIG. 9H at page 938 and be provided with details of the selected program. In the example, shown, the user selects the "$500 per month" program component and is provided with details of the selected program, $500 per month, under the caption "Read the Details and Decide." In this example, the user must agree to spend at least $500 per month for office supplies from Office Superstore. In return, the user receives something of value, i.e., the corporate variable redemption rate will be increased by 0.10 each month and the company will receive a 10% discount on all purchases from Office Superstore. Should the company fail to satisfy the commitment, i.e., fail to spend at least $500 in a month for office supplies from Office Superstore, the company will be penalized, i.e., the corporate variable redemption rate will be reduced by one-half (½) the difference between the current rate and the base rate and the discount will be suspended for two months.

Having been advised of the details of the incentive component the user is given the opportunity to Accept (sign up for the incentive component), Defer (ask to be shown more information or other components), Decline or Exit.

Smart Card

Implementing the incentive system and process of the present invention in a distributed non-centralized network architecture allows opportunities to take advantage of features available through personal chips, which are most commonly imbedded in "smart cards," but could also be imbedded in Java rings, PDA's or cell phones. For example, information concerning each participant's ID and RR (redemption rate) could be physically maintained with each participant. The personal chip (smart card) would also preferably contain information concerning the participant's Base Redemption Rate if the program included different base redemption rates for different participants. The storage of this information could be achieved by providing participants with a smart card—a computer chip-based card. The smart card could be, but need not be, part of a card-based payment system. The "smart card" as used herein could be on a chip in a personal digital assistant (PDA) or could be embedded in a Java ring or part of a cellular communication device. For convenience, however, reference will be made to a plastic card of the type used for credit and debit transactions. Known smart cards can combine, on one piece of plastic, multiple payment applications, fraud-fighting security devices, and a portable marketing data base that can be tapped at the point-of-sale to create on-the-spot promotions. Just as a smart card can contain a monetary amount, it could contain an individual redemption rate, base redemption rate and/or participant base points or reward points. The redemption rate could be incremented or decremented immediately at the time of a Participant Action resulting in such increment or decrement.

Of course, combining multiple applications on a single card is a way to enhance the value of the card with consumers. The more versatility a payment card offers, the greater the consumer's affinity to that card. Frequent travelers, for example, are likely to favor a card that combines a credit card, frequent-flier account, rent-a-car accounts, and prepaid phone card. Unlike mag-stripe cards, smart cards do not require on-line authorization. Instead, smart cards are authorized off-line by personal identification numbers. The PIN is stored in the card's chip at time of issue. Once the card is loaded into a smart card reader, the chip verifies the PIN as the cardholder enters it. The reader collects the transaction data, and downloads it daily in batch to a central computer.

The use of smart cards is also more practical than credit cards in connection with small amounts such as vending machines. The microprocessor in the card's computer chip is capable of storing a monetary value that can be decremented when used for purchases and later replenished in a read/write terminal that transfers funds from the cardholder's bank account. Through the use of smart cards, incentive programs can be extended small-dollar transactions.

There is even more potential in tying chip cards (smart cards) to marketing strategies. Points are stored in the card, as well as at a central host, but the card could also store a record of the type of merchandise a cardholder buys, right down to the last brand purchased in a particular product category. Once these data are read and captured by the smart card terminal, they can be used by manufacturers to offer incentives at the point of sale to cardholders that purchase competing products. Manufacturers can arrange with the card sponsor to instantly present incentives at the point of sale for cardholders purchasing a competing product. These incentives can be presented, for example, by flashing a message on a display at the terminal.

In one example, an incentive program according to the present invention, can be used in connection with a co-branded smart card. The card sponsor can take advantage of information by offering an extra incentive to customers that do not shop at competitors, for example. In the case of a smart card co-branded with an oil company, for example, the redemption rate associated with that card could be incremented upward (probably to some maximum level) every time the card was used to purchase gas from the sponsor, but reduced (either incrementally or by some percentage of the difference A between the current redemption rate and the base rate) if the card were used to purchase goods from any of a predetermined group of competitors. The rate could also be incremented if the participant made a purchase within a specified time period (e.g., one week or one month) from the last purchase, but reduced if the participant failed to make a purchase within the specified period. This encourages both customer loyalty and card usage.

The greatest benefit smart cards can offer lies in putting multiple applications on a single card. The more closely related applications are on the card, the stronger the incentive will be for cardholders to favor the card as their payment option of choice. In addition to storing the customer ID and redemption rate, the card could feature different functions likely to appeal to frequent travelers, including a credit card, a travel card, a frequent-flier card, a prepaid telephone card, and car-rental card. Besides cultivating cardholder loyalty, multi-application cards can generate additional revenue for issuers. Card issuers can rent space on a smart card's computer chip to third parties, such as phone companies for a prepaid card account, thereby lowering the base price of the card. Third parties benefit from the arrangement, because their logo appears on the card, along with the logos of the issuer and other third parties, which in effect makes the card a miniature billboard in the consumer's wallet.

It is also possible, when using smart cards, to provide specific competitively advantageous incentives. For example, it is possible to provide a loyalty incentive so that a smart card holder's redemption rate will be maintained at a higher level (higher base rate) so long as that participant does not use the card to purchase a competitive product, as explained above.

The present invention also provides a hardware component that provides functionality to enable incentivized electronic commerce that uses features of the present invention in very compact form. With currently available technology, the miniaturization of the hardware communication device is limited to the size of the smallest cellular communication devices. However, expected advances in component miniaturization and design should allow the entire device to be stored in a single card—a smart card. The hardware component preferably includes a cellular transmitter and receiver, which are preferably in the form of computer chips. The component may also include one or more speakers and microphones if voice communication is desirable, but speakers and microphones are not required if the system is to rely on data transmission alone. When a premium is placed on compactness, it is preferable to eliminate the speaker and microphone components.

Features of the card include memory chip for storing demographic and biometric data. Radio transmitters that transmit at the cellular frequency and at the local (e.g., Bluetooth) frequency. Power is tied to biometric input and can only be operated by the individual's authorization. A memory chip for storing value that can only be incremented by an authorized person that is different than the user. The card also includes means for wireless debiting and crediting through radio-transmission, but the memory and microprocessor are shielded from radio transmission.

Figure 7:
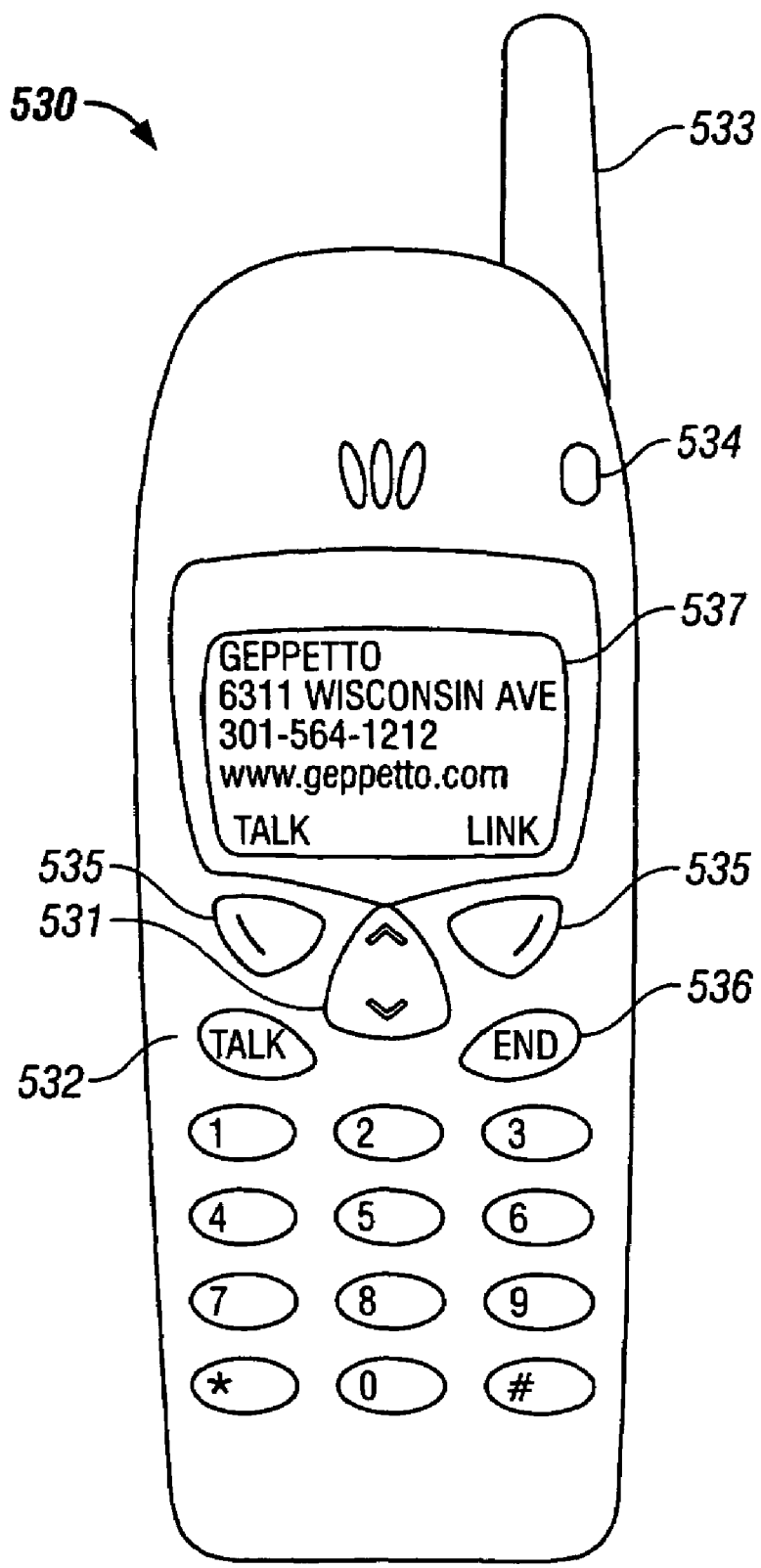
FIG. 7 shows a digital mobile telephone handset with LCD display.
Figure 7B:
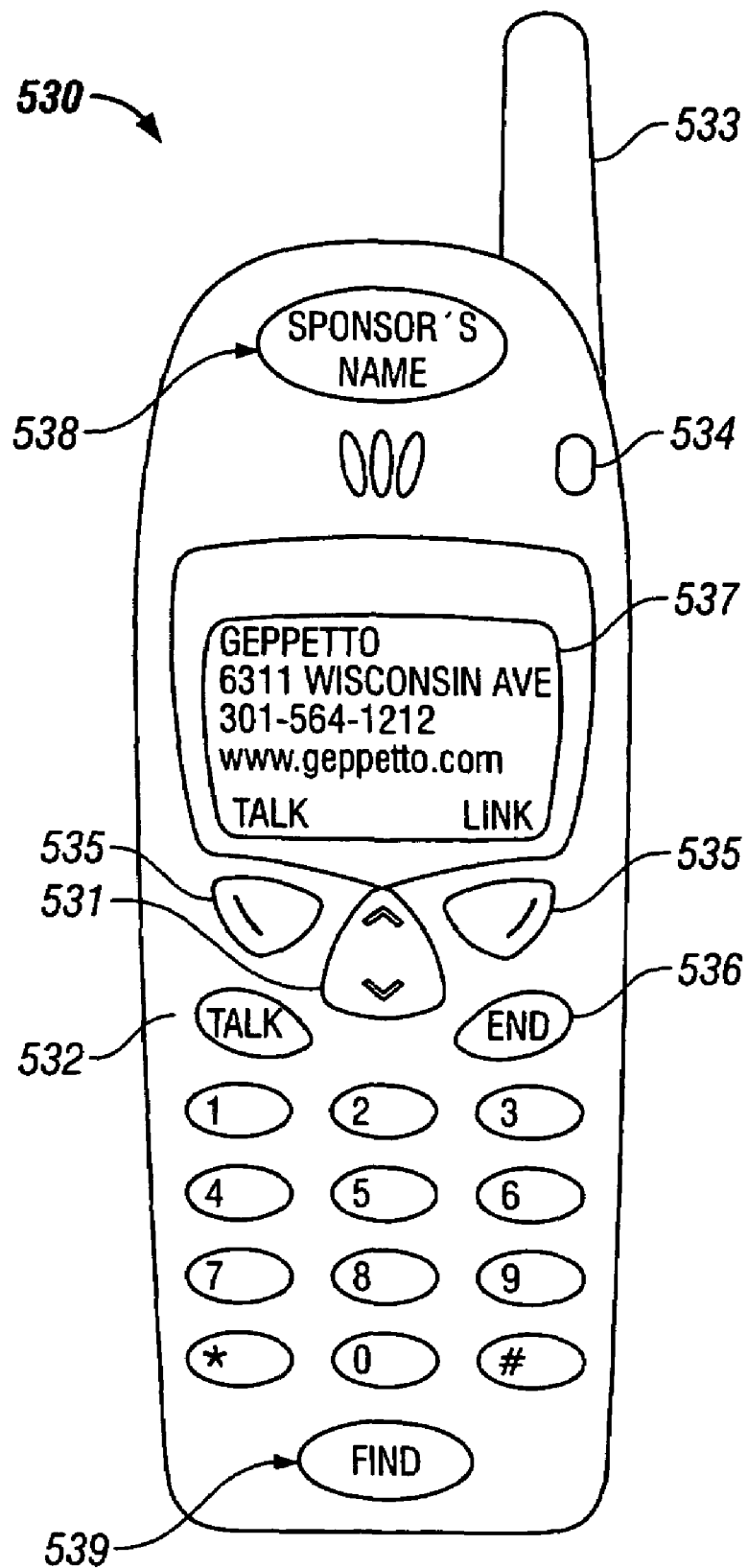
FIG. 7B shows a co-branded personal communication device with promotional hardware features.
Figure 7C:
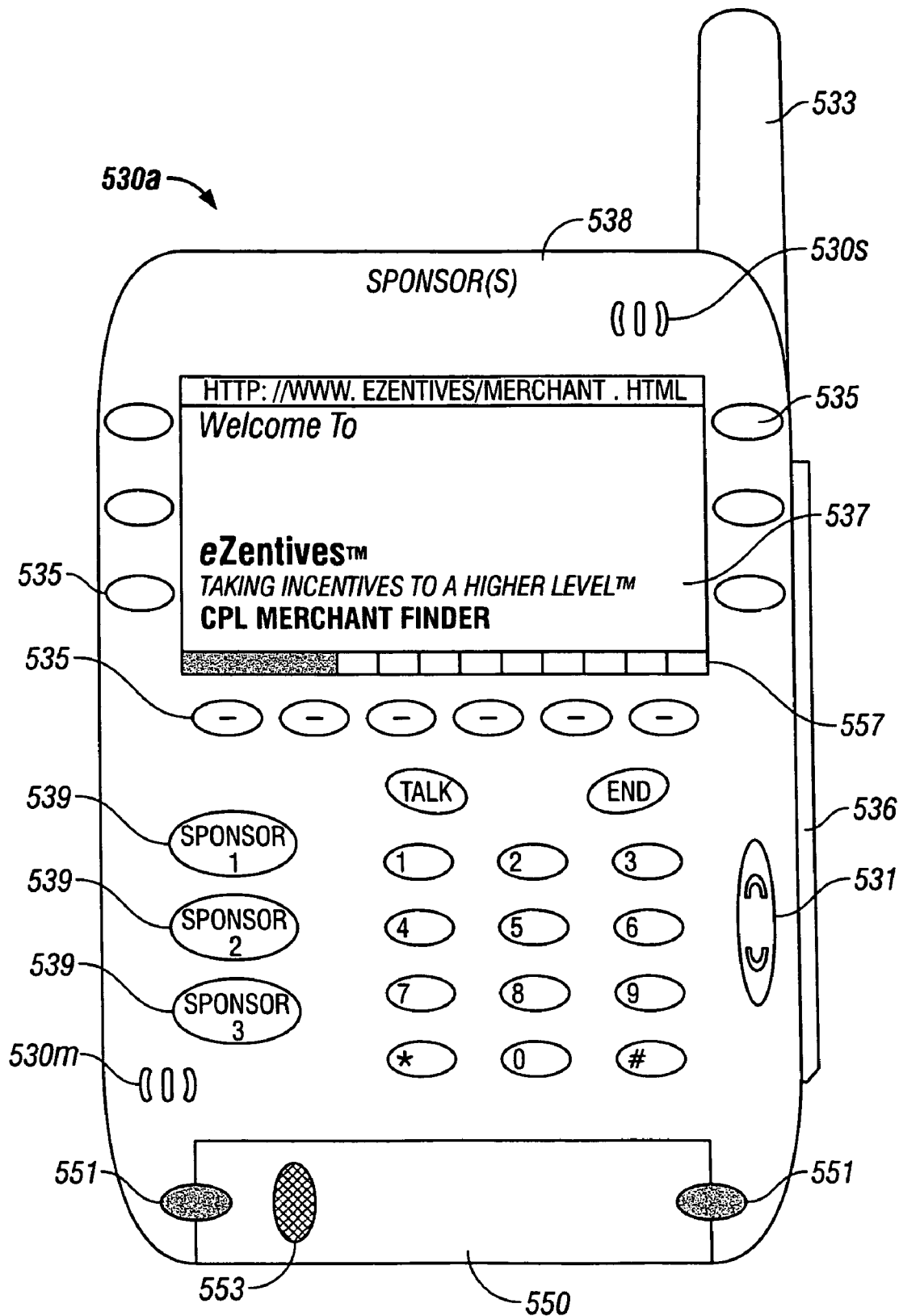
FIG. 7C shows an alternative co-branded personal communication device with a detachable smart card and a full display with Internet browser.
Figure 7D:
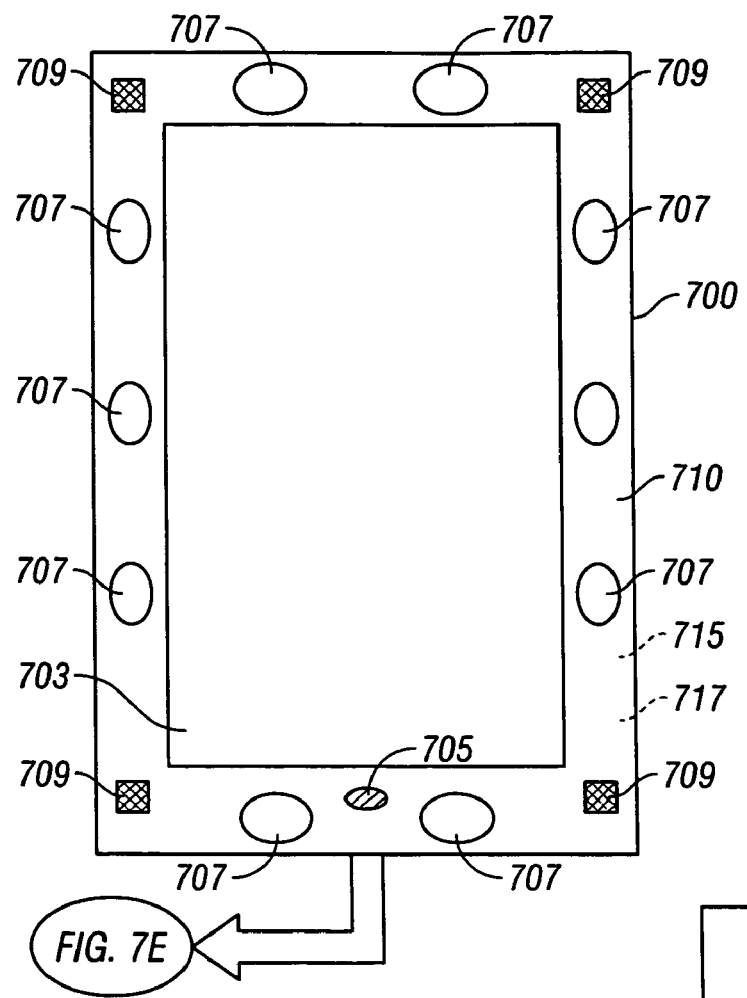
FIG. 7D shows a front view of a smart card according to the present invention.
Figure 7E:
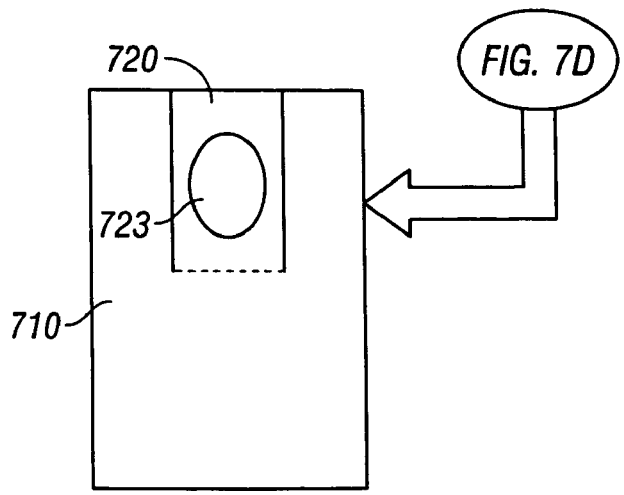
FIG. 7E shows the back of the smart card of FIG. 7D.
Figure 7F:
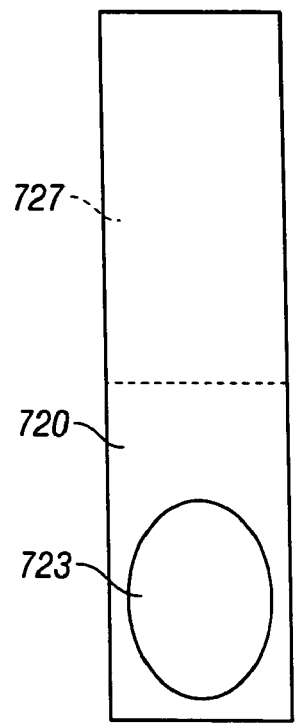
FIG. 7F shows a front view of a biometric information and identification key according to the present invention.

FIGS. 7D-7F show an embodiment of a smart card 700 according to the present invention. The smart card is intended to function as an electronic wallet that stores monetary values (as in a debit card). In the example shown, the smart card includes a large display 703 that used as the principal interface. The display may be used for input in ways known in the art including touch screen and styli input. The smart card can also include a microphone 705 for receiving voice commands and input. The smart card includes functional control buttons 707 located around the perimeter of the display. In addition, the system includes a plurality of speakers 709 and microphones for providing audio input and output to the system.

In accordance with an important aspect of the present invention, the smart card is preferably equipped with wireless communication hardware 715 within the casing 710 for wireless connectivity using the Bluetooth protocol or some similar protocol. The provision of wireless connectivity equipment allows use of the card in an expanded range of electronic commerce, especially in situations where debit card readers might not be readily available. Thus, the smart card/electronic wallet with wireless connectivity could be used at a customer's home in conjunction with another device such as a personal computer or personal digital assistant or cellular phone that is connected to the global information network (Internet) to pay for goods and services remotely. The electronic wallet with wireless connectivity is also useful in the context of casino gaming, as explained herein.

The smart card of the present invention can also include cellular communication equipment 717 (also within casing 710) or be integrated into cellular communication equipment (detachably or permanently) so that the smart card can operate as a personal communication device. Whether used for wireless connectivity or cellular communication, communication equipment should include RF shielding to avoid interference.

FIG. 7E shows the backside of the smart card of FIG. 7D. In this embodiment, the smart card receives a removable biometric key 720. The biometric key preferably includes a thumbprint reader 723 and a chip 727 (encased in the kay) that stores identification information concerning the user including the details of the thumbprint (or other biometric information) that matches the authorized user of the key as well as relevant individual information, which could include medical records, demographic information, personal redemption rate. The thumb print reader on the key can read a user's thumbprint and compare the same to information stored on the chip to ensure that the user is authorized to use the key to operate the smart card. The chip or integrated circuit in the smart card key also can include storage of a monetary value.

In accordance with an important aspect of the present invention, the smart card chip 727 could also contain precise information concerning the card holders physical measurements so that a customer need only be measured once and the results can be used by multiple clothing manufacturers to create well tailored clothing for the customer. With wireless connectivity, this tailoring information could be transmitted to clothing vendors to allow tailoring of clothes or, alternatively, selection of a best fit from a selection of ready to wear pieces. This information could also be accessed by a sales agent in a vetail setting. With this information and precise sizing information from vendors, the system could perform a comparison that would allow a sales agent to, for example, tell a customer that they need a size 4 in ARMANI, but a size 6 in PRADA without ever seeing the customer in person. This is especially useful in the context of vetaiiling as detailed below.

Merchant Directory/Cellular Phone Locator

In accordance with yet another aspect of the present invention, the incentive system and method of the present invention may be combined with a novel merchant directory to provide synergies for both systems.

A component of this aspect of the present invention is a system for locating merchants, vendors or service providers that are participating in a particular program. On a simple level, this component could be a printed directory of participating vendors that provided directions to the vendors' particular locations whether physical locations or virtual, online connections.

A more sophisticated system using currently-available technology would be a global positioning system for determining the participant's precise location, which could then be compared to the location of participating vendors, merchants or service providers stored in a database so that a list of the nearest available vendors could be provided to the participant. The principle limitation on such a system is the expense of global positioning systems and the computer systems that operate therewith. In conventional systems, the data pertaining to location of merchants, vendors and/or service providers must be stored and carried with the GPS system. This limits the portability of the system and also means that the data, which is stored on compact discs, cannot be continuously updated. In addition, a separate disc is required for each geographic location. These problems could be addressed, to some extent, by retrieving merchant information from the public network or through the Internet, as discussed below.

In accordance with yet another important aspect of the present invention, a more economical and portable way of providing an electronic directory is provided through the use of personal digital communication devices, such as digital cellular phones, which are currently becoming ubiquitous.

There are two trends that make the cellular position locator of the present invention especially attractive: the decreasing physical size of "cells" and the increasing ubiquity of digital phones.

Figure 6:
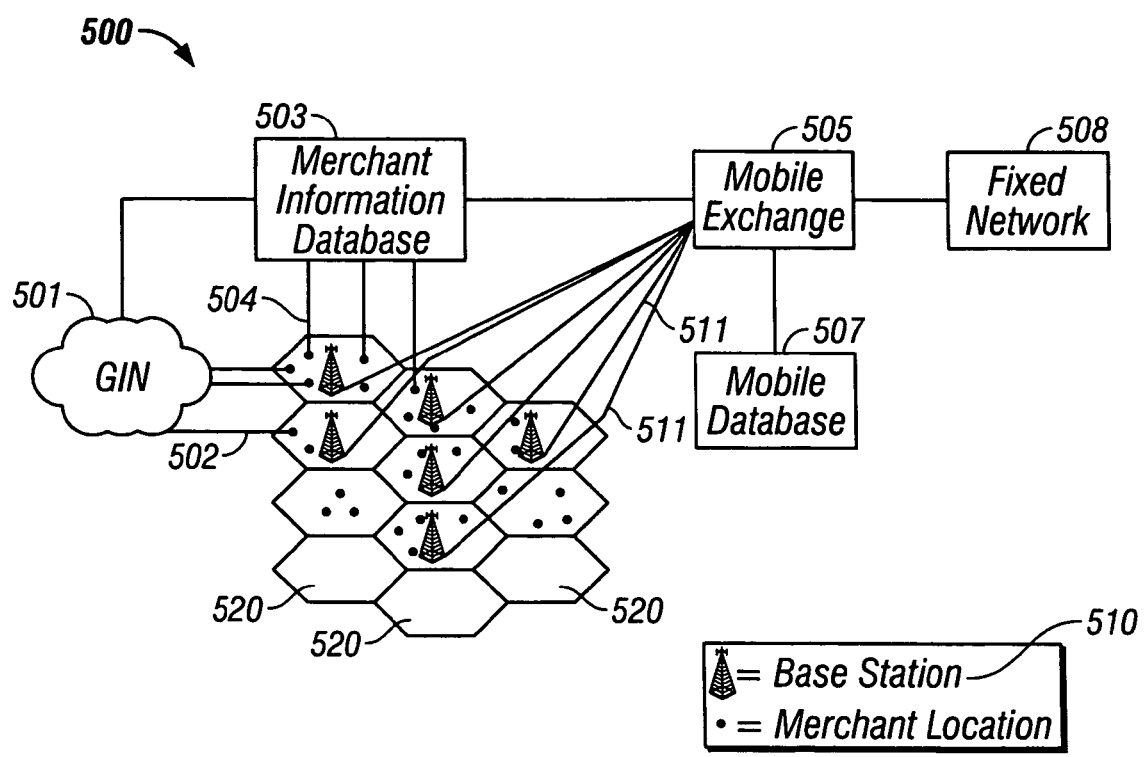
FIG. 6 shows an example of a cellular phone network architecture according to the present invention.

Most mobile telephone networks now use what is called the "cellular mobile telephone system." An example of a cellular mobile system 500 modified according to the present invention is shown in FIG. 6. This system uses a large number of low power radio transmitters and receivers, rather than a single high power transmitter. Each such low power radio transmitter and receiver is referred to as a "base station."

The term "cellular" refers to the fact that the geographic area in which the mobile system is intended to operate is divided up into a large number of small areas called "cells 520." There is normally one base station 510 within each cell 520, although in some cellular systems, each cell may be subdivided into a number of sectors, with each sector having its own base station. Thus, it follows that in an area that is served by cellular phone service, each base station corresponds to a particular geographic location. It is thus possible to construct a relational database, for example, correlating base stations 510 to geographic locations.

When a mobile telephone is situated within a particular cell 520, it transmits to, or receives radio signals from, the base station 510 in that cell 520. The power of the base station is low, so the radio signals generated by it are weak. This has the result that the radio signals are not able to be picked up by mobile telephones that are more than a short distance outside the boundaries of the cell. It follows therefore, that it is always possible to determine which base station or stations a particular cellular phone call is emanating from. Since, as noted above, the base stations correspond to particular geographic locations, the geographic location of any caller using a cellular phone transmitter, i.e., cell phone can be determined, in a general sense.

The cells 520 can be made smaller and indeed, the size of any particular cell depends upon the likely rate of use of mobile telephones within a particular area. For example, in rural areas, the cells are quite large. In metropolitan areas, on the other hand, the cells are normally very small, sometimes as small as one square kilometer or less. Should any particular cell become congested (i.e., most of the radio frequencies available for use within that cell are being utilized most of the time), the cell can be subdivided into a series of smaller cells. It follows that as cellular phone usage increases, the geographic size of the cells will decrease so that by using the present invention it will be possible to correlate a cellular phone user's geographic location with increasing precision by determining which base station a particular call is emanating from.

The way in which a cellular mobile telephone system works means that a particular radio frequency cannot be allocated permanently to a particular telephone. Instead, a particular range of radio frequencies is allocated to a particular cell. When a mobile telephone user wishes to make a call, she or he turns on the mobile telephone 530 and dials the number. The mobile telephone 530 transmits a signal to the nearest base station 510, telling the base station that the mobile telephone user wishes to make a call. The base station then identifies a radio frequency that is not in use at the time and transmits a signal to the mobile telephone to inform the mobile telephone of the frequency upon which the call is to be made. The mobile telephone 530 then tunes into the radio frequency. The base station passes the dialed number to a telephone exchange and makes the connection or a series of connections necessary to connect the mobile telephone form which the call is made to the called telephone.

When the mobile telephone moves out of one cell and into the next cell during the course of a telephone conversation, a base station monitors the strength of the radio signal during the call. When the signal strength becomes low, as the caller moves out of the cell, the base station notifies the mobile exchange 505. The mobile exchange 505 then sends a signal to the base station in the adjacent cell informing it that the mobile telephone is about to enter that cell. The new base station then allocates a new frequency for the call and sends a signal to the mobile telephone that the telephone should henceforth use that new frequency for the call. The mobile telephone then tunes into the new frequency and the call continues, uninterrupted through the new base station on the new frequency. The process of transferring a telephone conversation from a particular frequency in one cell to a new frequency in an adjacent cell is called a "hand-off."

The typical mobile telephone network also have computer systems that contain databases 507 of information necessary to control the network. For example, one such database keeps a record of the location of every mobile telephone 530 in the network. The mobile exchanges 505 provide information to, and retrieve information from these databases 507. The mobile exchange, together with its associated databases, not only switches calls between mobile telephones and between telephones in a fixed network 508, but also controls the hand-off process between base stations.

Each base station is connected by a fixed transmission medium 511, typically a fiberoptic cable, to the mobile exchange. Occasionally, the transmission medium between the base station and the mobile exchanges a very high frequency form of radio transmission known as "microwave." Because it is likely that, at any one time, there are numerous telephone calls being made within a particular cell, the link between each base station and the mobile exchange must have sufficient capacity to enable many calls to be carried simultaneously through the process of multiplexing.

From the foregoing, it should be apparent that systems used to implement cellular telephone calling also generate data that has not, heretofore, been utilized to any great degree, namely, data concerning the geographic position of cellular phone users. As noted previously, this data is becoming more precise as mobile phone "cells" decrease in geographic size. This data can be generated in other ways as well, such as through GPS systems, but such systems are currently expensive and bulky.

Recent experience with global positioning systems (and GPS systems used in automobiles) demonstrates that there is customer value in correlating a user's geographic location to the location (physical location, telephone number or Internet location) of vendors, service providers, and merchants that are located in the same geographic proximity.

Moreover, in recent years, cellular phone handsets have become, to a large extent, digital, and thus able to receive data packets containing information above and beyond basic information used to place telephone calls. Digital wireless has allowed phone companies to provide e-mail delivery, text messaging, increased call capacity, better security and other services, but the full potential of digital wireless has not yet been recognized. Other personal digital wireless communication devices are likely to become commonplace in the future.

Taking these considerations into account, the present invention provides a cellular position locator that takes advantage of data concerning which base station the a cellular call is emanating from, and correlates this information to data stored at a mobile exchange (or elsewhere) such as the location and contact information for merchants, vendors and/or service providers. This information is not currently used widely, but is readily available. In accordance with the present invention, the handset 530 can be used to query the mobile exchange as to the user's present location, i.e., "Where Am I?" The system could also be used as an emergency "SOS" beacon to identify its user's location.

As an alternative, a user's position could be determined in some other way, such as GPS, and transmitted to the merchant ID database with other information A variety of user interfaces could be used to allow the aforementioned queries. However, since most digital cellular phones already include LCD displays and buttons, the currently preferred interface is a menu-type interface in which a user can enter its queries through a combination of menu choices and data entry using buttons available on a conventional cell phone as described hereinafter in connection with FIGS. 8 and 8A-8C. A personal digital assistant with digital cellular capabilities such as the Palm VII from 3Com is also an ideal piece of hardware for this system, especially since it could use Internet links to reach vendors, merchants and service providers. Any digital personal communication device is acceptable.

In accordance with a particularly important aspect of the present invention, the cellular position locator (CPL) system of the present invention can be used as a directory service. Information concerning the location of nearby vendors, merchants and service providers, and to promote participating vendors, merchants and service providers.

More specifically, one of the menu choices available to the user of the cellular position locator (CPL) would be a merchant, vendor and service provider locator. In some instances, the term "merchant" alone will be used for simplicity, it being understood that the system treats merchants, vendors and service providers alike. Thus, for example, the menu may provide choices such as restaurants, gas stations, hotels, and grocery stores. The user would then select one category of vendor, merchant or service provider and the system would display information pertaining to the appropriate vendors within the user's geographic location, if any. The information provided could be a physical address, and Internet address and/or a telephone number, for example. The user could select a telephone number to connect to the merchant to obtain directions to the merchant. If the communication device used has Internet access capabilities, the system could return an Internet link in response to the query to allow the user to link to a web page providing a description of the vendor, merchant or service provider and directions to the physical location.

Of course, the information provided in response to a query need not be limited to a telephone number or address and name information, but could include any information that is capable of display on a telephone handset or personal digital assistant. Moreover, the incentive system of the present invention could be used to promote use of the cellular phone locator service by, for example, rewarding participants that use the merchants, vendors and/or service providers that participate in the cellular phone locator program. The cellular phone company could provide merchants with listings on the cellular phone locator service for a fee or provide such information free of charge and charge the user for accessing the information or both.

In accordance with another aspect of the present invention, the merchants subscribing to the service could be given access, through public network or intranet or the global information network (GIN), i.e., Internet, to their particular entry in the merchant information databases. Thus, the merchants could upload the information they wanted to send in response to queries as frequently as they wished. Thus, merchants could offer special promotions or incentives on a daily basis.

Using a Merchant Information Database 503 that is accessible through a public network or over the Internet offers several advantages. First, as mentioned before, merchants can access and modify the data pertaining to them as desired. Second, multiple locator systems could use the same database. Thus, for example competing cellular systems within a single area or geographically separate cellular systems could all retrieve data from the same database. Furthermore, the a Merchant Information Database 503 that is accessible through a public network or over the Internet could be accessed by participants operating from fixed locations (such as home or office) to view the dynamically changing merchant information. Thus, a person could check the daily specials at a local restaurant persons by checking the Merchant Information Database through the public network or over the Internet. Finally, the Merchant Information Database could be used by systems where geographic location is determined by systems other than the CPL system described herein. For example, location information could be provided by a GPS system or could be provided by the user through a user interface.

To permit access by a wide range of participants (i.e., participants from different cellular networks or fixed locations, the Merchant Information Database 503 must be able to recognize multiple different Merchant ID's for each merchant or all users must use a standard consistent set of Merchant ID's or a conversion system must be set up. Although any solution is possible, use of standard Merchant ID's is the currently preferred use.

The preferred system architecture for implementing this functionality is shown in FIG. 6. In particular, in addition the basic cellular infrastructure already described (including base stations 510, cells 520, mobile exchange 505, mobile databases 507 and the fixed network 508) includes a merchant information database 503 linked to the mobile exchange 505 (the connection may be direct or indirect).

Merchants within the cellular network (represented by dots in FIG. 6) can communicate with the merchant information database either through a direct connection 504 (which could be a phone line, a data line or wireless connection) or through the Global Information Network (GIN) 501, i.e., Internet. Although only exemplary connections are shown, each participating merchant is preferably connected in some way.

By virtue of their respective connections to the merchant information database 503, the merchants can be allowed to upload information pertaining to their goods or services. This could be done by phone with human intervention or voice recognition or through data entry over a wide area network, intranet or direct data line. However, the currently preferred embodiment takes advantage of the Internet by establishing a web site for each merchant's information page. Preferably, each merchant can modify the information on their page to, for example, reflect daily specials or promotions. A directory service that is linked to the mobile exchange (and could be physically resident at the mobile exchange) is allowed to access and retrieve information from any merchant's site. The data pertaining to each merchant must be stored in a format or converted by the server to a format that can be sent over the cellular network and displayed on the user's personal communication device. There could, for example, be abridged versions (e.g., name, address and phone number) for users with limited displays and more detailed versions (e.g., driving directions, daily specials, promotions and advertising) for users with greater display capabilities. To accommodate this functionality, the user's personal communication device would have to be identified and correlated to a display capability.

One of the real advantages of the system of the present invention is that it is highly portable and easy to keep up-to-date. In particular, in contrast to known GPS directories, the information concerning the vendors available, locations and advertising is accessible from a central location through a public or private network or over the Internet, rather than on a fixed data storage device such as a CD ROM. Thus, it is possible to quickly update this information to reflect new sponsors, changes in location and the like. Moreover, in conventional systems where the user carries in the information in a fixed form, it is typically not practical to carry information for more than one metropolitan area. Thus, the user must obtain and carry with him directories for each metropolitan area that he visits. In contrast, with the present invention, the information for any particular metropolitan area is contained at the phone service provider's location, or some other physical location, in that geographic area; Thus, the user equipped with a digital cellular phone or a personal digital assistant can use the service in any geographic area where the service is available. This provides a tremendous addition in value since the use of something such as a service directory is, quite often, most necessary when one is away from one's home territory. It is important to note, however, that GPS location information could be used to retrieve information from the merchant information database. Thus, it is not required to use the cellular position locating feature described herein to retrieve information from the merchant information database.

As shown in FIG. 7, the personal digital communication device can be a conventional digital cellular phone having the following features: a SCROLL BUTTON 531 to allow the user to scroll through menus, sub-menus, and phone book; a TALK button 532 that dials the number on the display; a FIXED ANTENNA 533; a POWER KEY 534 to press and hold to turn the phone on or off; SOFTKEYS 535 whose current function is displayed above the key (for example, here their functions are "Talk" and "Link"); an END button 536, which is pushed to end a phone call; an LCD display 537 and a set of conventional 12 key array of alphanumeric keys ranging from 1-0 and including * and #.

FIG. 7A shows a menu summary that could, for example, be stored in the memory of the digital cellular phone of FIG. 7. The summary of FIG. 7A shows both the hierarchy of screen displays and the 1-4 digit code for any particular function. Thus, a user familiar with the codes could press the keys "menu-7-3-5-6-send" to transmit a query for Thai restaurants in the area, if any. Alternatively, the user could construct the identical request by selecting from a sequence of displayed options.

In the currently preferred embodiment, which is a digital cellular phone, the directory is added as one of the available menu choices.

There are numerous ways to query the phone system, but there are several competing constraints. First, it is desirable to minimize the amount of time that the user is connected to the cellular system. Secondly, to provide the highly desirable service of being able to contact a desired merchant, it is desirable that phone numbers be downloaded to the phone so that once the user disconnects from the directory service, the user can contact the merchant, vendor or service provider.

Taking the foregoing considerations into account, the system of the present invention is preferably designed to fully format a query on the user's personal communication device prior to contacting the directory service through the mobile exchange. The currently preferred menu driver system will now be described with reference to FIGS. 8A-8C As noted previously, each cell phone (or other communication device) has a unique code that identifies the personal communication device. In addition, the system is set up to provide the user with a sequence of generic menu choices that become progressively more specific so as to narrow the user's particular query. Thus, after selecting the directory service, which may be referred to as the CPL (or Cellular Position locator) at step 1, the user will be presented with a broad range of categories, such as gas stations, grocery stores, restaurants, shopping malls, etc., as indicated at step 2. There could be an added menu, shown as step 1a, by which the user is given options other than-the directory such as "where am I?" In the example illustrated, the user selects restaurants, and is thus presented with a still narrower selection of choices at step 3. In the example illustrated, the user has selected Italian restaurants.

In the preferred embodiment, each of the menu selections described heretofore is done before connecting to the mobile exchange. These menu choices are generic and well within the memory capacity of a standard digital cell phone handset and certainly within the memory capacity of a personal digital assistant. However, when one considers the desirability of making the system function nationwide, it is clearly not practical to include all Italian restaurants in the nation within the handset's memory. Moreover, the specific merchant database must be updated periodically. Thus, this is the preferred time in which the system will access a larger-scale distributed memory. In particular, between steps 3 and 4, the handset contacts the base station and conveys the very specific request of access to the cellular position locator to locate the nearest Italian restaurant. This specific data request is passed from the base station to the mobile exchange to a central server that correlates the user's location using a relational database that determines the closest Italian restaurants by merchant ID and then retrieves the information from the merchant information database (503) and transmits data containing this information back to the user's handset. It is preferred that this information be stored in memory on the user's handset so that the user could disconnect after retrieving the information.

In the example shown, the system displays the name, address, telephone number and Internet address of one Italian restaurant located in the area. Naturally, a selection of restaurants could be provided and the user could have an opportunity to select from several choices. The user is also presented with options to call, i.e., talk to the restaurant directly or link, i.e., connect via the Internet to the restaurant's home page immediately.

Figure 8:
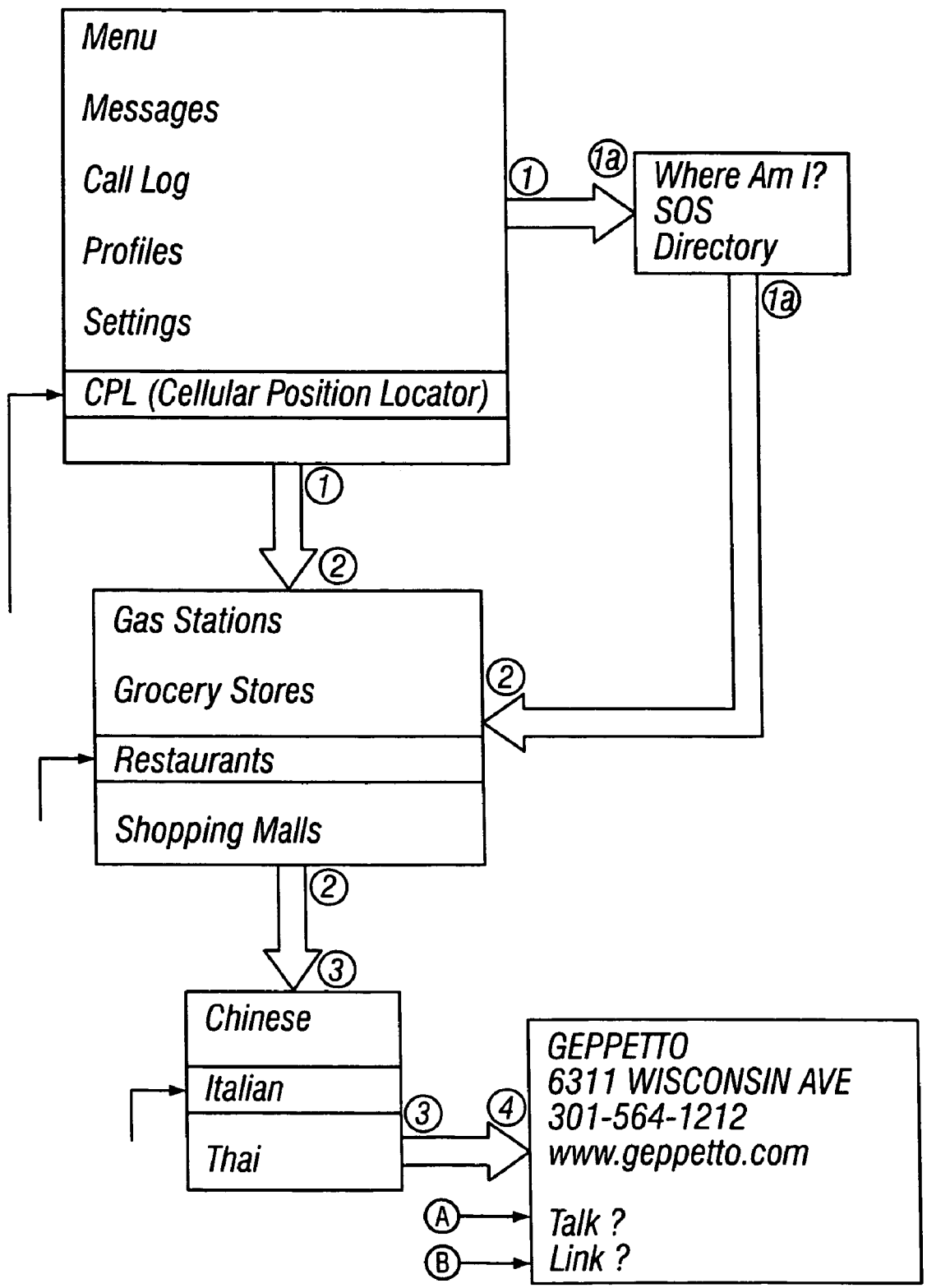
FIGS. 8A-8B depict cellular phone locator (CPL) menus and screens and system flows according to an embodiment of the present invention.
Figure 8A:
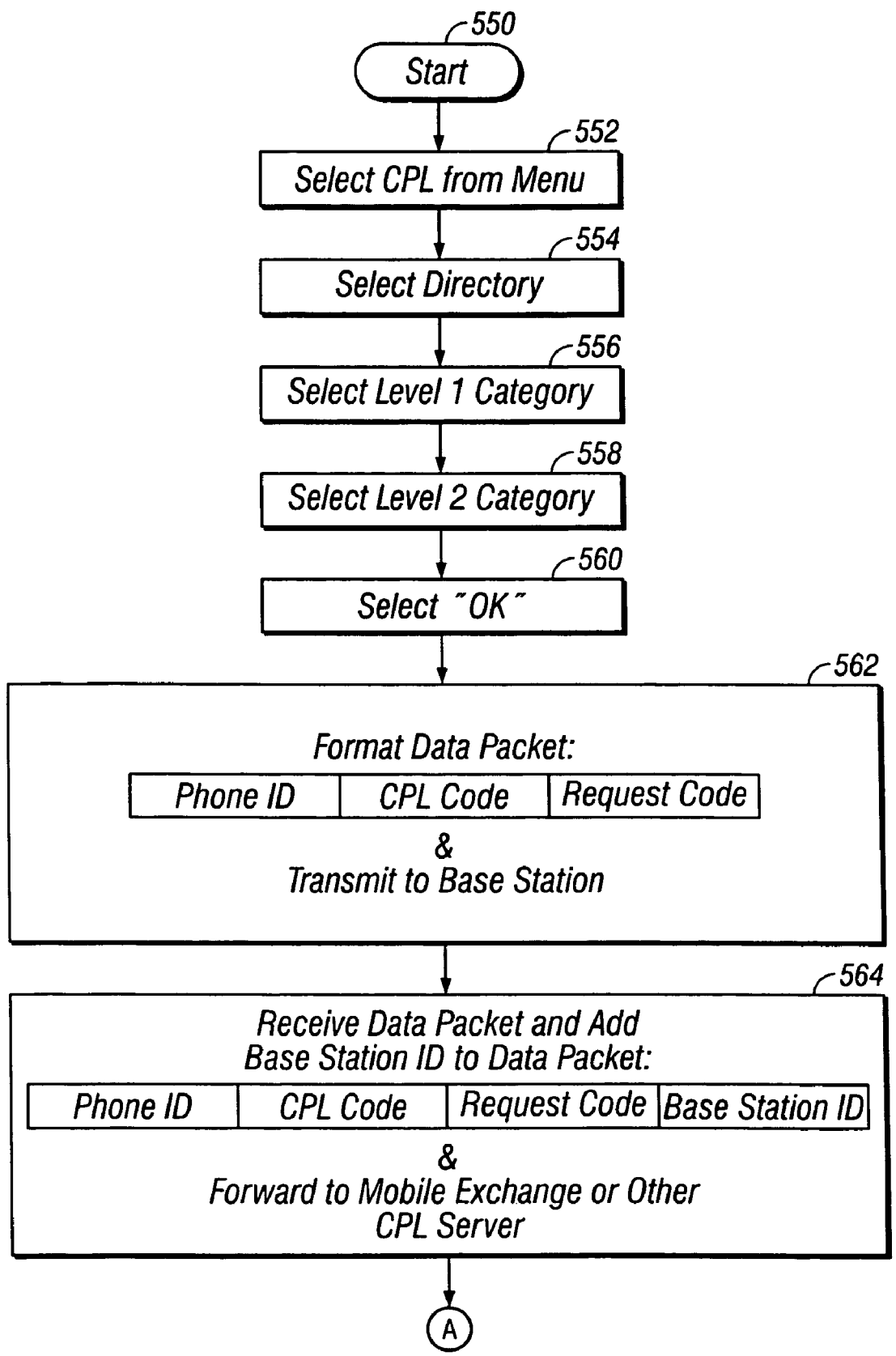
Figure 8B:
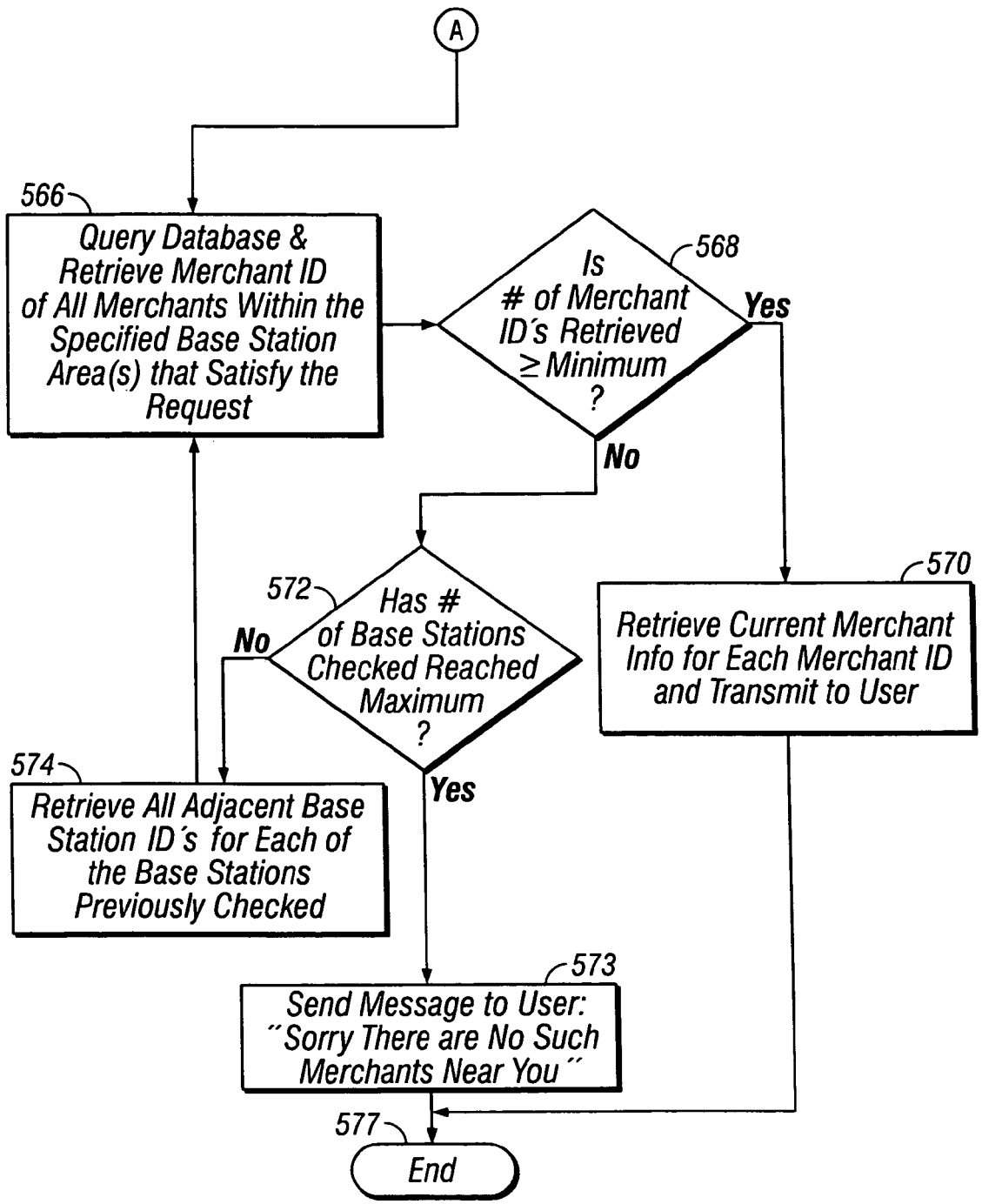

FIGS. 8A-8B also show the system flow. Those skilled in the art will appreciate that there are numerous ways to convey this data between the handset using the cellular system. However, it is preferred that the query message be in the form of a data message that contains the following components: identification of the cell phone making the call (which could contain both a phone/user ID and information pertaining to the display capacity of the personal communication device), a code telling the mobile exchange that the message contained is a cellular position locator message and a code indicating the specific nature of the request, in this case, Italian restaurants. As shown in FIG. 8A, this data packet is created through a series of menu selection at steps 550-562. The base station 520 receiving this message passes this message along to the mobile exchange 505, along with an indication of the base station identification at step 564. The mobile exchange then checks the geographic area covered by the base station 520 at step 566 to see if there are sufficient number of vendors within that area to satisfy the user's request (step 568), and if not, then queries adjacent base stations 520 (see B at FIG. 8C) until a satisfactory number of "hits" are found. The data pertaining to the "hits" is then transmitted back to the user.

As a safeguard to prevent the system from becoming unstable and to ensure that merchants identified are sufficiently close to the user, the system limits the number of adjacent base stations that can be queried. In particular, if it is assumed that the base stations 510 are laid out in a hexagonal grid pattern as shown in FIG. 6, the number of additional base stations that must be queried to cover all "adjacent" base stations (that have not previously been queried may be estimated by the following equation:

$$6*(n-1)$$

where n=number of the queries conducted. Thus, the first query is directed to merchants that are associated with a single base station 510, i.e., the base station from which the request emanates (the merchants are typically associated with the base station because it is physically located within the geographic area served by the base station 510, but merchants could be associated with base stations for other reasons, if desired). The second query (n=2) is directed to the six base stations that surround the first base station. The third query (n=30) is directed to the 12 base stations [6×(3−1)] that surround the six base stations queried in the second query that have not yet been queried. From this example, it can be appreciated that the umber of base stations that must be queried can increase rapidly such that running the query a fourth time could take approximately 18 times the resources as query of a single base station. The demands on the system could be reduced by running simultaneous queries, but it is clear that at some point, continuing to run queries will place unjustified demands on the system. It will also be appreciated that each successive query retrieves information concerning merchants that are progressively farther from the user. Thus, depending on the geographic size of cells, the value of information retrieved will drip steadily as queries are run.

For these reasons, at step 572, a determination is made as to whether the maximum umber of base stations has been searched. If so, a message such as "Sorry, there are no such participating merchants near you" is output at step 573. If the maximum number of base stations has not yet been queried, the system returns to step 566 as indicated by the letter C.

The maximum number of queries is a value that is preferably set by the system operator. However, the user could be given some input indirectly by allowing the user to specify an approximate range for the search. Thus, if, for example, each cell had a diameter of about 1 kilometer, the user could choose a range of 1 kilometer (1 query); 3 kilometers (2 queries); 5 kilometers (3 queries) and so forth according to the following formula:

Average Cell Size (diameter in km)*
$[(n*2)-1]$=Range in km where n=number of queries.

Of course, these ranges are approximate since cell size is neither uniform nor consistent. In this way, the present invention provides the possibility of an adjustable range search functionality.

The user could be prompted to specify a range when formulating the query, in which case the specified range information would be transmitted with the query. This could be done with a visual interface that graphically depicts the increase or decrease in range, e.g., through a bar graph as shown in FIG. 7C, for example.

Alternatively, or in addition, the system could ask the user if a wider range is acceptable after returning initial results or reporting that there are no participating merchants within the specified range.

As noted previously, the initial formatting of a directory request is performed entirely on the personal digital communication device 530, i.e., "offline." To enable this functionality, and to permit worldwide use, the menus available on the phone (an example of which is shown in FIG. 7A) are generic. However, the menus do not have to be generic. To the contrary, and in accordance with another aspect of the present invention, certain merchants may sponsor the user's personal electronic communication device. The sponsorship could take many forms, but in one embodiment, shown in FIG. 7B, a personal communication device, in this case a digital cellular phone similar to that of FIG. 7A is co-branded with a sponsor's name 538 and includes a dedicated "FIND" button 539. The FIND button 539 in this example is preferably programmed to find the nearest sponsor location(s) with a single press of a button.

A promotional co-branded communication device could, for example, be used by a financial institution to direct customers to their nearest branch or ATM anywhere in the country. Likewise, a national franchiser such as STARBUCKS® or McDonald's® could sponsor personal communication devices that direct customers to their nearest location.

As noted above, the cost of services (i.e., the cost of phone service and/or using the merchant directory) could, in accordance with another aspect of the present invention, depend on the loyalty to the sponsor. Thus, if a purchaser remains loyal (for example, doesn't shop at a merchant's competitors and/ or visits the sponsor once a week), the cost of the service is free, but if the person doesn't call by then a charge is imposed. The rate charged for calls could, in accordance with another aspect of the present invention, be inversely proportional to the participant's redemption rate.

A less elaborate form of sponsorship could be provided by placing a name brand sponsor on the otherwise generic menu of choices.

In addition, and consistent with the incentive program of the present invention, the personal communication device could be integrated into an incentive program whereby the user could earn points or increase a variable redemption rate by reviewing advertisements or other information delivered over the personal communication device. The advertisements could be sent in response to the user pressing a dedicated button such as the "FIND" button 539. The points earned could be redeemed for free airtime the amount of which could depend on a variable redemption rate.

FIG. 7C shows an alternative co-branded personal communication device 530*a* that includes a smart card and fully display with Internet browser. Like the previously described phones, this communication device includes a unique digital code stored in memory that identifies the device; a display 537 (in this case a full color screen); a user interface (including buttons and a digital pen 536) for allowing an user to generate digital messages; a transmitter and receiver for wireless communication with the cellular communication network so as to allow a digital message generated on the personal communication device 530*a*.

The device 530*a* further includes a smart card 550 that includes a personal chip 553 that can store personal and marketing information and a digital code representing a monetary value. The system preferably includes means for transmitting a digital value corresponding to a monetary value to the memory (preferably on the personal chip 553) of the personal communication devices. The means for transmitting this data could be a smart card writer contained within the device or a separate card recorder or the receiver that receives transmissions via the antenna 533, for example. The smart card of the device 530*a* shown is detachable from the remainder of the device and held in place by clips 551. When the smart card 550 is stored in the personal communication device 530*a*, the personal chip 553 is preferably in a position where it can be easily read from and written to by the hardware in the remainder of the device 530*a*.

By virtue of the detachable smart card feature, each smart card 550 can be used in a plurality of different personal communication devices 530*a* and each personal communication device 530*a* can accept a plurality of different smart cards. Thus, for example, a single communication device 530*a* could be used as a wireless smart card reader/writer for a plurality of smart cards.

The device 530*a* includes a full display, which allows use Internet links to reach vendors, merchants and service providers. The user is also presented with options to call, i.e., talk to the restaurant directly or link, i.e., connect via the Internet to the restaurant's home page immediately. A visual indication of range 557 (such as a series of lit/unlit blocks) may be displayed to provide a convenient user interface to select the range of the CPL system.

Again, the device may have one or more sponsors. The sponsorship could take many forms, but in the embodiment, shown in FIG. 7C, the personal communication device is co-branded with sponsors' names 538 and includes several dedicated "FIND" button 539. The FIND button 539 in this example is preferably programmed to find the nearest sponsor location(s) with a single press of a button.

As noted previously the promotional co-branded communication device could, for example, be used by a financial institution to direct customers to their nearest branch or ATM anywhere in the country and or a national franchiser such as STARBUCKS® or McDonald's® could sponsor personal communication devices that direct customers to their nearest location.

Placing a name brand sponsor on the otherwise generic menu of choices could provide a less elaborate form of sponsorship.

In addition, and consistent with the incentive program of the present invention, the personal communication device could be integrated into an incentive program whereby the user could earn points or increase a variable redemption rate by reviewing advertisements or other information delivered over the personal communication device (note also, the application in the context of the previously described Internet loyalty program). The advertisements could be sent in response to the user pressing a dedicated button such as the "FIND" button 539. The points earned could be stored in memory (preferably on the detachable smart card 550) and redeemed for free airtime the amount of which could depend on a variable redemption rate.

As shown in FIG. 7C, the personal digital communication device 550a can include conventional digital cellular phone features including: a speaker 550s and mouthpiece 550m; a SCROLL BUTTON 531 to allow the user to scroll through menus, sub-menus, and phone book; a TALK button 532 that dials the number on the display; a FIXED ANTENNA 533; a POWER KEY 534 to press and hold to turn the phone on or off; SOFTKEYS 535 whose current function is displayed adjacent the key on the display; an END button 536, which is pushed to end a phone call; an LCD display 537 and a set of conventional 12 key array of alphanumeric keys ranging from 1-0 and including * and #.

One advantage of this form of messaging is that the messaging through different cell systems can be standardized so that the system can be used in any geographic location.

Sales Agent Assisted Commerce Over Networked Computers

The system and method for conducting commerce over networked computers of the present invention is well suited and advantageous for any commerce that can benefit from intense, interpersonal interaction. Examples include high end retailing, personal shopping, business-to-business buying (including fashion buying and retail buying where new products are involved and a great deal of information must be conveyed in a short period of time). Commerce that requires a high level of interpersonal interaction is to be contrasted with commodity purchasing, which does not require interpersonal interaction.

The invention is based on technologies that allow a large amount of personally directed product information to be selected and conveyed quickly by distributed agents that have knowledge and skills (charisma, industry knowledge, product knowledge and persuasiveness) that customers and vendors value.

The present invention is also based on the recognition that the flow of goods and services from vendors to customers can be optimized when such commerce flows through a single, virtual and physical location. Thus, in accordance with another aspect of the present invention, the system includes a web-based portal permitting personal interaction and a system for consolidating customer orders in a hub location that is convenient for distribution from the hub.

An important aspect of the present invention is the value proposition for each class of participants within the system and method. In particular, through the efficiencies in the system and the allocation of commissions, it is possible to achieve a value proposition for each of the participants.

With regard to sales agents, for example, one obvious value proposition is obtaining a commission on sales generated. However, the distributed nature of the present invention makes it possible to provide additional, very attractive features for the sales agents. Among other things, the sales agents can work when and where they want. Particularly, it is entirely possible with the system of the present invention to allow sales agents to be independent agents that work is as often or as little as they like from their home or any other location with access to the global computer network. This could be very attractive to potential sales agents that have a great deal of valuable knowledge, but otherwise would not be willing to share that knowledge by acting as a sales agent if doing so the required undue time commitments or an inadequate reward.

The variable redemption rate incentive system of the present invention also can be used to create greater or even more focused incentives for sales agents or other participants within present invention.

In general, the system for qualifying sales agents proceeds as follows. To begin with, a prospect asks or is asked to be certified with regard to certain goods or services. At this point, the qualifications of the prospect are confirmed through some acceptable means, which could include testing, personal recommendations, resumes and/or the prospect's reputation. Based on the consideration of these or other factors, a prospect is certified as a sales agent with regard to certain goods and services. A commission account and redemption rate is preferably established for each of the agents. The agents may be incentivized (but not required) to appear online at certain times, etc. At the time of certification, the agent is also given the tools, preferably software tools, to act as an agent. In preferred embodiment, the agent is given control over a "palate of goods" (sensory descriptions of goods for which they are certified to allow software download or the like). The "palate of goods" could be icons representing sensory descriptions of various goods for which a sales agent is certified. The descriptions preferably convey the sensory experience of the products to the greatest extent possible. This may be in the form of a simple still picture, an animation, a full sound animation or even other sensory experiences such as smell, feel or taste, if permitted by technology. In the preferred embodiment, updated product descriptions (if any) are downloaded when the sales agent logs in to the system. In accordance with the preferred aspect of the present invention, the product descriptions are maintained on a system, such as a web-based system or Internet so that vendor and/or system operator (sys op) have access to the web based product descriptions and are allowed to alter these descriptions as much as desired. More specifically, the product descriptions are preferably available on a secure web location or Internet to prevent general access. Again, the sales agent can appear online when desired and work as often as pleased. The system preferably includes means, such as customer surveys or measurable performance indicators to monitor performance of sales agents and allows the system operator to remove agents from the system at will.

The system operator (sys op) relationship with the vendors and merchants is based on a different value proposition. Vendors agree to pay commissions for sales through the site. The vendors and/or the system operators prepare sensory descriptions of the goods or services to be sold. The vendors and/or system operators certify the expertise of sales agents. The system maintains records (through a database) of sale agent identifications (ids) and products for which the particular sales agents are certified. The system operator (sys op) preferably pays vendors for goods at the time or ordering (or at the time of shipping or delivery), less commission. The immediate payment to the vendor is a significant advantage to the vendor in terms of improved cash flow and thus provides significant value to the vendor.

Although goods could be sent directly to the customer from the vendor once an order is confirmed, in accordance with an important aspect of the present invention that is particularly applicable to situations in which filling a customer order requires obtaining goods from two or more vendors, the goods are preferably sent to a central location (hub) for the sys op and then delivered to the customer using a hub and spoke model similar to that used by large couriers such as Fed Ex or UPS. In accordance with yet another preferred aspect of the present invention, the hubs are located geographically proximate a national courier such as Fed Ex or UPS so that goods can be sent to the sys op order assembly location assembled by the sys op and shipped using the carrier. Thus, this arrangement allows the system operator to co-venture with a courier such as Fed Ex or UPS, by locating the sys op order assembly facility at the courier's hub to minimize transportation cost. Naturally, sending the goods to the common location is only necessary if the customer order comes from more than one vendor. The customer order can be filled by a single vendor, then direct shipping to the customer is most efficient. Therefore, the system preferably determines whether the customer order can be filled by a single vendor and, if so, the system orders direct shipping to the customer.

From the vantage point of the system operator (sys op) or retailer, the value proposition is obtaining a share of commissions with independent distributor agents to provide a value add for consumers. This allows sales agents to work at their convenience whenever and wherever they want. In addition, the system and method of present invention allows vendors access to an expert sales force based on commissions only—an out-sourced sales force. Moreover, the system and method of the present invention gives vendors instant payment for goods when shipped, which allows lets vendors focus on producing goods.

From the vantage point of customers, the system and method of the present invention provides a source of expert personalized advice. In addition, the system and method provides customers quick shipment of goods when ordered and provides customers a source of one-stop shopping for various vendors, sends the goods in a single order by assigning an order code to each order placed with vendors so that a customer order can be assembled at a sys op order assembling facility located approximately near a courier hub.

Description of the Purchase Process

Figure 10A:
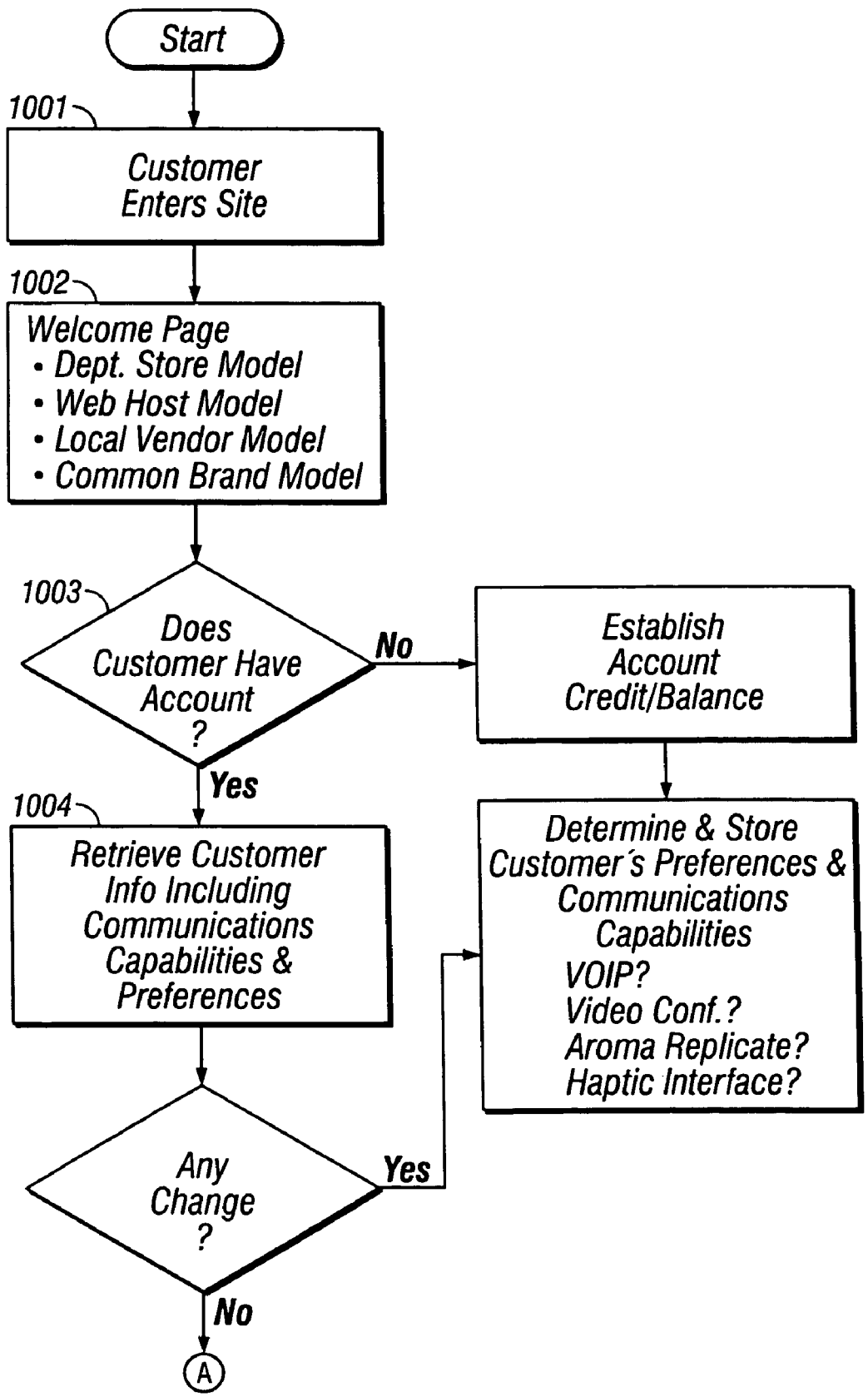
FIG. 10 is a process flow diagram showing an example of the purchase process using the virtual retail system of the present invention.
Figure 10B:
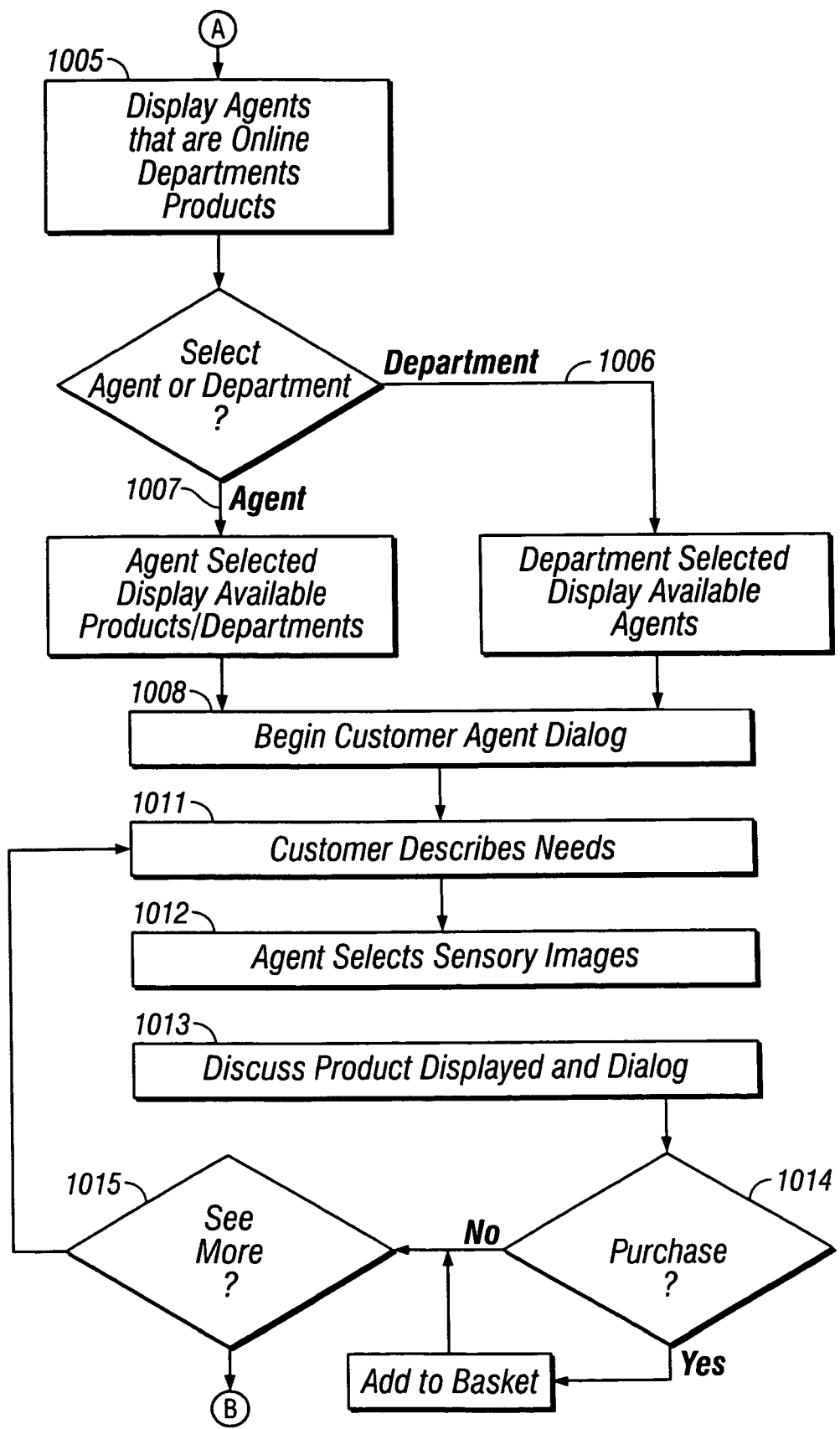
Figure 10C:
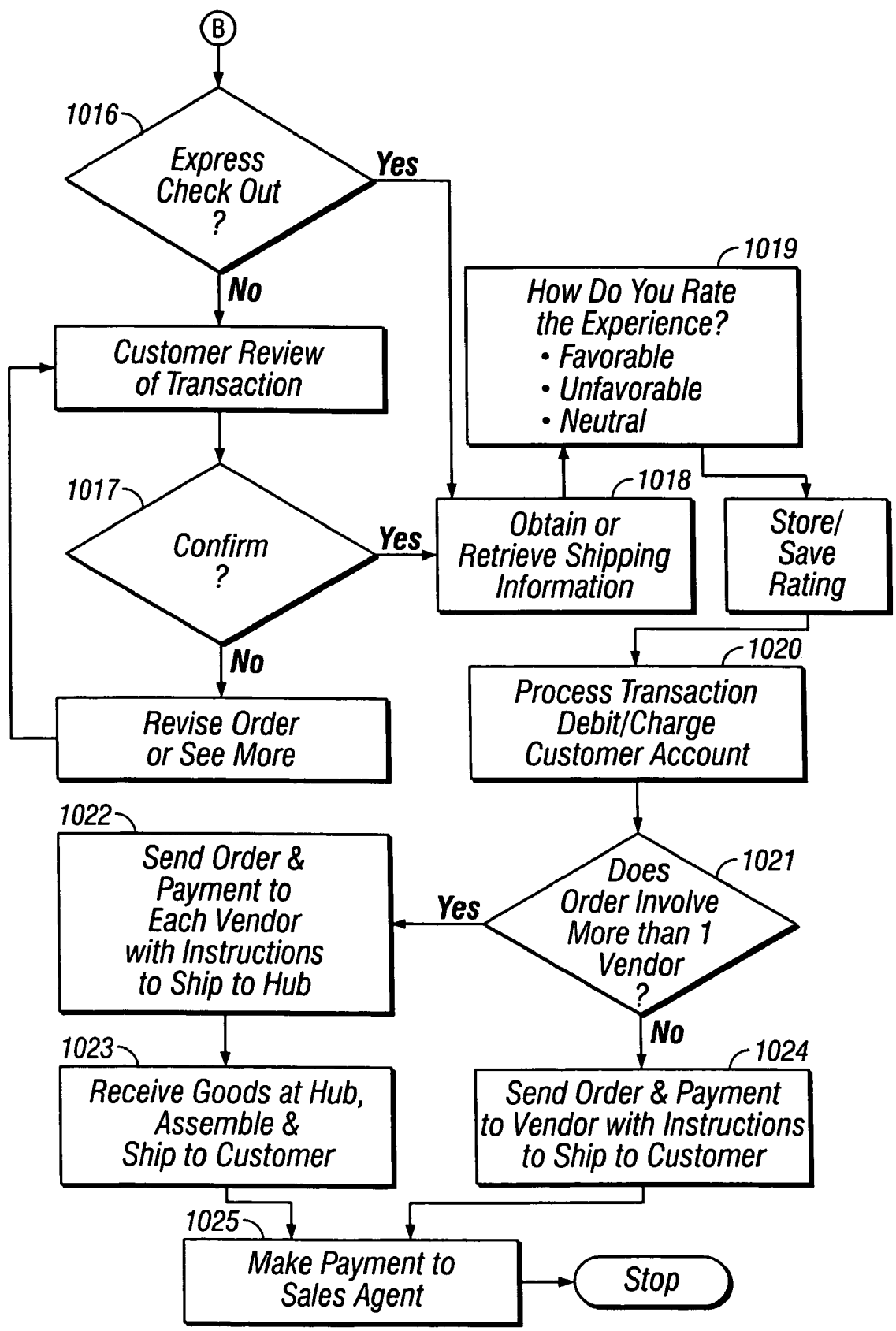

An example of the flow of the purchase process will now be described in connection with FIG. 10.

At step 1001, the customer goes to the vetail site, at step 1002, the customer is welcomed to the site's home page. The home page can be designed along various basic models, examples of which are described below. These include a common brand model (FIG. 13), a local vendor model (FIG. 14), a department store model (FIG. 15) and a web host model (FIG. 16). If desired, a plurality of web models may be offered at the welcome page and the customer may be allowed to select a model At step 1003, the system determines whether the customer has an account. This is an important aspect of the present invention. A significant advantage of the present invention is the ability to place orders in real time. To make it practical to place orders in real time, it is naturally necessary to have a reasonable degree of assurance that the customer can pay for goods ordered. The preferred way of achieving this would be by having the customer maintain a cash or debit account with the retailer or at a minimum provide credit card information sufficient to ensure payment for goods ordered. If the customer does not have a current account, the system preferably prompts the customer to establish an account.

At step 1004, the system determines the customers technical communication capabilities. Specifically, the system determines whether the customer has the hardware needed for enhanced sensory communication. example, is the customer capable of voice over the Internet? Is the customer capable of video conferencing? Does the customer have equipment that enables aroma replication? Does the customer have haptic (sensory/touch) interface equipment? This determination can be made automatically by querying the user's machine or by querying the user. In either case, the results of the query, i.e., the comminicating capabilities of the user, are stored.

If the customer is not equipped for any enhanced communication, the system will rely on instant messaging alone to facilitate the customer sales agent dialogue. For repeat customers, of course, it is possible to retrieve previously stored information identifying the customer's technical capabilities and/or preferred communication mode and then simply confirm that the stored information is current as shown.

At step 1005, the system displays the sales agents that are online. The system also preferably displays "departments" that are available and also displays products available, depending on the web model used. An important aspect of the present invention is the ability to provide customers real time information concerning what sales agents are online, even when the sales agents are connected to the system through the Internet. The customer thus has a choice of selecting a department (in step 1006) in which case the system displays the agents available for that department so that the customer can select or is assigned a sales agent. Alternatively, at step 1007, the customer could select the particular sales agent, in which case the system displays the products for which the selected agent is certified to sell. At this point, step 1008, the agent/customer dialogue, which is preferably one-on-one real time dialogue and (begins through instant messaging, video conferencing, voice over the Internet or some combination thereof including the possibility of other forms of sensory exchange as described above).

Figure 11:
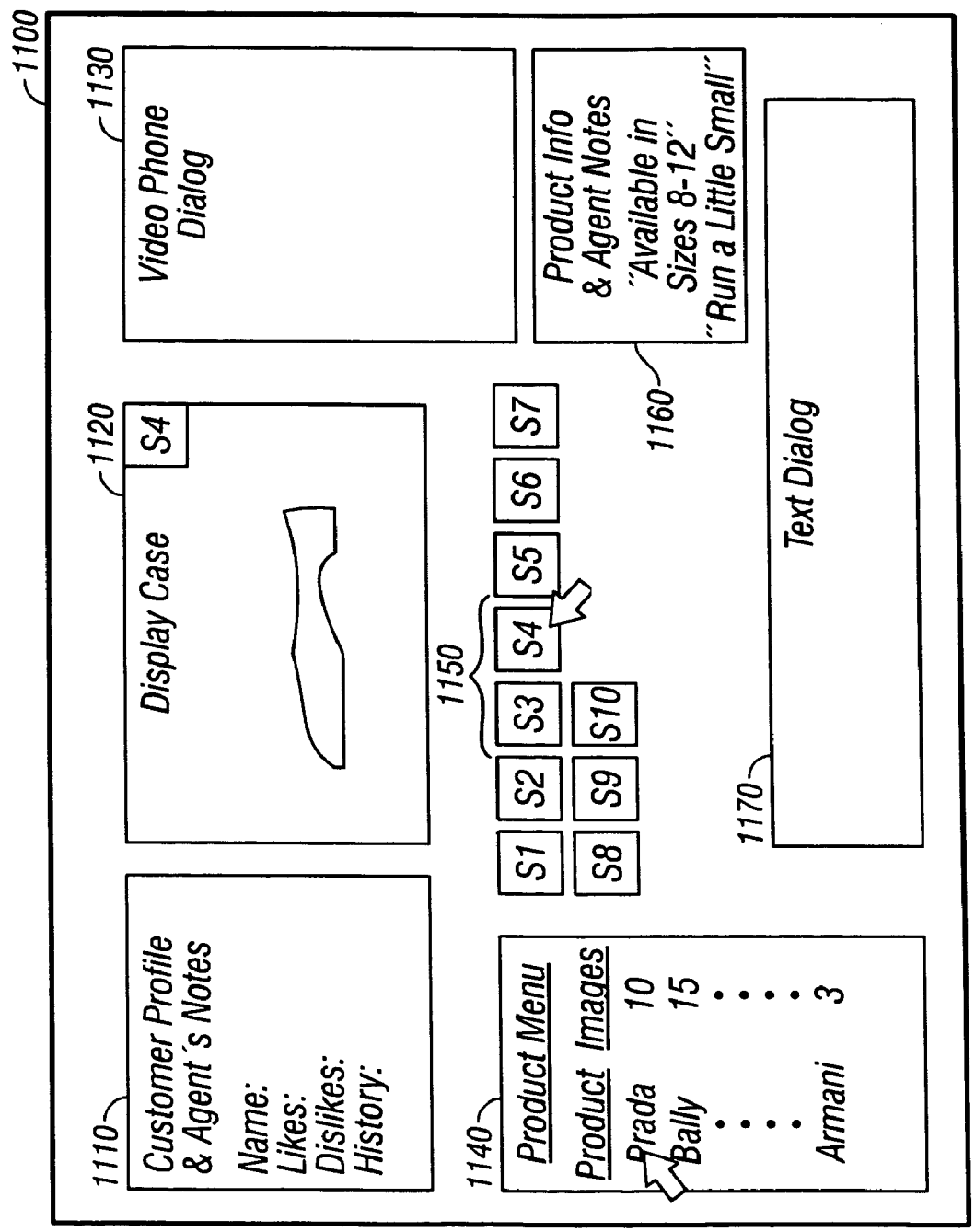
FIG. 11 shows an example of the agent display in the virtual retail system and method of the present invention.

In accordance with another aspect of the present invention, the displays for the customer and sales agent are different. An exemplary sales agent display is shown at FIG. 11. As shown, the sales agent's display displays customer records including the transaction history and profile (both personal profile and the profile of any related entities such as family/friends, corporate or affiliate for whom the customer may be interested in purchasing goods or services). The system also displays icons representing available goods (the "palate of goods" that the agent is certified to sell as well as a representation of what, if anything, is in the "display case portion" of the customer's display). The customer's display includes a portion for displaying the sales agent dialogue if such dialogue is being conducted by video conferencing or through text and a large scaled "display case" that displays goods. As noted above, the goods that are displayed in the display case are for preferably selected by the sales agent, it is of course possible for the customer to select goods for display in the display case. With current technology, the display case is most likely limited both audio and visual sensory display. However, to the extent possible other sensory displays such as touch, smell and taste should also be displayed in the display case.

With regard to the sense of smell, for example, there are various ways to replicate aromas from remote locations. These technologies typically involve selectively releasing combinations of vapors that simulate the desire aromas. Preferably, scented oils are heated and released to create the desired aromas. This can be achieved through the use of a disk type drive much like a computer drive for floppy disks or CD-ROMs. A computer user would insert a replaceable disk that looks much like an ordinary CD-ROM into the drive of a personal computer. The disk would need to be replenished periodically, just like a printer cartridge.). Aroma molecules are encased on or absorbed into the disk below a layer of polymer. The aroma molecules preferable comprise a standard palate of aroma molecules that can be used in various combinations to generate a large number of aromas. The precise combination of aroma molecules necessary to replicate the desired aroma is digitally stored and can be transmitted from a remote location to the user's computer in response to the user's selection of a particular icon or at the sales agents direction. In response to a user or sales agent command, digital signals direct the aroma drive's internal laser toward a given sequence of aroma pockets. At each pocket, the laser heats the polymer layer, allowing the aroma molecules to escape through open pores in the heated polymer. A fan pushes the vapors the user's direction. The system maintains a record of which aroma packets have been used and prompts the user to change the disk when it is no longer possible to generate the desired aromas. In this way, a single, standard disk could create almost any scent desired.

Alternatively, in a manner analogous to ink jet cartridge printing aromas can be replicated by releasing selected combinations of scented oils from a palette of such oils stored in a replaceable cartridge. One such device uses heat to free as many as 200 scented oils from a replaceable scent cartridge.

With regard to the senses of touch and taste, it is possible to simulate the sensory experience from a remote location in two general ways: creating a remote stimulus that results in a sensory experience that is as close to the actual sensory experience as possible or by mapping an individuals sensory response to a stimulus and then directly recreating the sensory response in the absence of the stimulus.

The first technique, i.e., creating a remote stimulus that results in a sensory experience that is as close to the actual sensory experience as possible, is employed in cartridge type aroma generators and even ink jet printers. To replicate a taste and texture, flavors could be replicated from cartridges containing a variety of spices, for example. The flavors could be then applied to an edible neutral flavored substance having a defined texture that is selected from of a available edible substances each having a different texture so as to provide a taste and texture that simulates the taste and texture to be replicated.

To replicate texture, a force-feedback device is preferably used to allow users to touch and feel computer generated objects. The sense of touch is preferably simulated using a haptic (sensory/touch) interface. A haptic interface is a force reflecting device that allows a user to touch, feel, manipulate, create, and/or alter simulated three-dimensional objects in a virtual environment. There are various known haptic interface objects, including a flat surface area interface, joystick, glove, thimble, stick or pen, exo-skeletal structures, treadmills, fans, magnetic. Hardware employed includes DC brushless motors, potentiometers, Silicon Graphics, Inc. IRIS Indigo computers, V25 board computers, 8086 compatible micro processors, CRT displays, stereo-imaging systems, magnetic and electromagnetic components, pulleys, steel belt drive trains, VME bus, encoders, potentiometers, motor controllers, encoders, cable reducers. The required software can be any of a variety of programming languages (e.g., C, C++) that are able to work with visual modeling programs.

Currently, there is no consensus on the "best" type of interface among experts. However, an example of a known haptic interface is the "Phantom Haptic Interface" developed at MIT's Artificial Intelligence Laboratory. The "Phantom Haptic Interface," delivers precise haptic stimulation to humans at a level of fidelity and convenience previously unattainable. The device built to deliver the forces that arise in "point contacts" gives the sensation of fingertip interactions with a wide variety of objects. Requiring only three motors and three sensors to accomplish this, the device provides a computationally and mechanically tractable way to enable haptic interaction with complex virtual objects.

Haptic interfaces permit user to touch and manipulate imaginary computer-generated objects in a way that evokes a compelling sense of tactile "realness." With this technology a user at a computer terminal can touch objects that exist only in the "mind" of the computer. By transmitting the correct digital signals to a master haptic interface device at a remote user location, the master device can be used to make users feel as though they were performing a real task. In reality, users would simply be interacting through motors with a computer program.

The second technique requires bio-feedback, but offers the potential for a more individually tailored sensory experience. In particular, an individual user's biological responses to predetermined stimuli are precisely measure and stored and then recreated to recreate the effect of the stimulus.

At step 1011, the customer explains his needs either through dialogue or by completing an online form or transmitting some electronic specification of needs. It is noted that the latter options could be performed prior to the onset of dialogue.

At step 1012, based on the input received from the customer, the sales agent selects products or services from its palate for display in the display case.

At step 1013, dialogue concerned in the displayed products occurs. Again, the display could include full motion video, sound and any other sensory output permitted by the customer's technical systems.

At step 1014, the customer can decide to purchase or not. Conventionally this might be done by putting items into a shopping basket for later final determination and/or purchase. Keeping in line with the commitment to service, however, the system preferably includes multiple ways for the customer to select goods including simple verbal commands to the sales agent.

At step 1015, the customer is offered an opportunity to see more products. The process continues until the customer has everything he needs.

At step 1016, the customer and sales agent proceed to check out. Again, keeping with the idea of optimum customer service, the dialogue could be discontinued at this point or continued through a more formal checkout process. Thus, the customer is given an opportunity to proceed with express checkout. If this option is selected, the dialogue is discontinued and the sales agent is allowed to complete the sale based solely on the customer's authorization (assuming shipping information was previously obtained and may be retrieved). This would require, of course, a high level of authority from the sales agent that has been previously granted and confirmed by the customer.

If express checkout is not selected, at step 1017, the customer reviews and confirms the transaction or revises the system charges (debits) the customer account, places an order with the vendor, credits the vendor amount, credits the sales agent account and retains a portion of the amount paid by the customer.

At step 1018, the system obtains shipping information through the customer input or by verifying/confirming information that was previously provided and is stored on the system.

At step 1019, the customer is prompted to make a simple rating input and, if desired, make a more detailed comment on the experience with the sales agent. This input can be used in connection with the sales agent incentive program and intelligent recommendation system program according to the present invention.

At step 1020, the system processes the transaction. This includes charging (debiting) the customer account for the transaction amount. A portion of the transaction amount is allocated to the vendors. Another portion of the transaction amount is allocated to the sales agent and, if desired, a portion of the transaction amount is allocated to the system operator.

At step 1021, the system further determines whether the customer's order can be completed by a single vendor. If not, at step 1022, the system places an order that instructs the vendors to send the goods to a central hub for assembling into an order that will then be sent to the customer (step 1023). If a single vendor can, on the other hand, complete the entire order, then the vendor is instructed to ship the goods directly to the customer at step 1024).

Preferably the instructions to vendors are accompanied by payment of the allocated amount. At step 1025, the portion of the transaction amount allocated to the sales agent is paid to the sales agent, such as by crediting a sales agent account.

In accordance with another aspect of the present invention, the system could allow users (customers) to personalize their displays so that the SYSOP site could function as an Internet shopping portal. The user could in accordance with this aspect of the present invention, customize their displays using conventional portal tools so that the user could dictate preferences as to products, personal interests, sales agent preferences and display format. The code defining these preferences is then associated with the customer ID and preferably stored on the SYSOP's system so that it can be retrieved regardless of the terminal used by the customer to call into the SYSOP.

The customer could also be provided with a "mailbox" for receiving messages from the SYSOP or sales agents concerning, for example, special promotions or items of interest. Sales agents could send product descriptions to the customer's "display cases" for review when the customer logs on.

Figure 12:
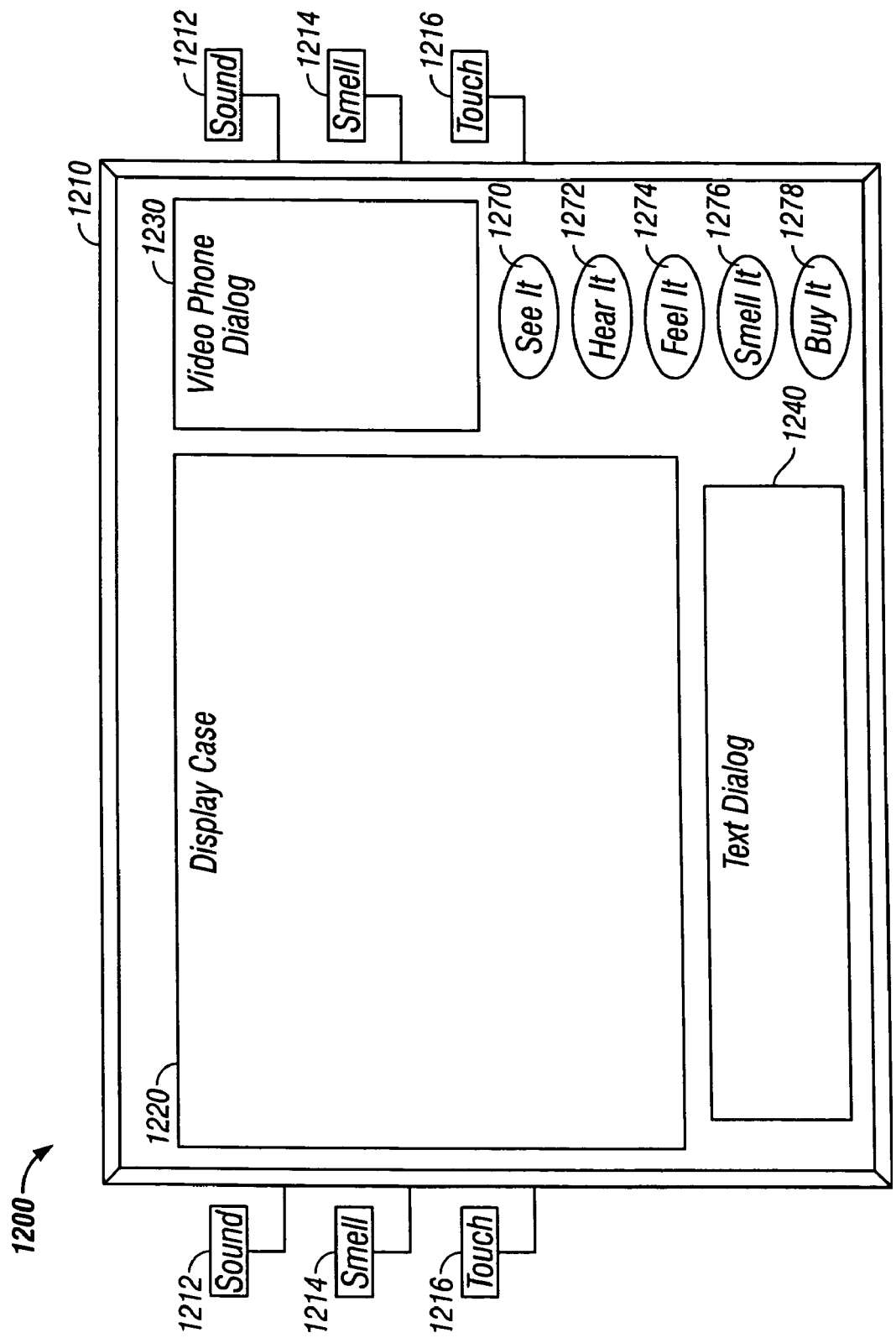
FIG. 12 shows an example of the customer display in the virtual retail system of the present invention.

FIG. 11 shows one embodiment of the agent display 1100 according to the present invention. The display shown is displayed on a display screen, which is preferably in the form of a flat panel display or other computer monitor for displaying visual images. The agent display displays, in visual form, the information needed to allow the agent to provide first-rate customer service to the customer as well as to control, from a remote location, images that appear on the customer's display, which is shown in FIG. 12.

As shown in FIG. 11, the agent display includes a "customer profile and agent notes" portion 1110. The "customer profile and agent notes" portion displays relevant personal information, including the customer's names, likes, dislikes, history, family members that the customer has shopped for, significant dates (family birthdays, anniversaries etc.) and the like. The agent display further includes a "display case portion" 1120. The "display case portion" displays a representation of the display case as it appears on the customer's display 1220 (FIG. 12). Since the agent is presumably familiar with the products represented, the display case portion of the agent display need not be the same size as the display case portion of the customer display, but should be large enough so that the agent has an idea of what is being displayed on the customer's display.

The agent display further includes a "videophone portion" 1130 for displaying a live image of the customer to facilitate a videophone dialog, if the customer chooses to dialog with the sales agent in this way.

The agent display further includes a product menu portion 1140. The product menu portion displays a list of available products as well as the types of images that are available for those products. In the example shown, the agent has, presumably at the customer's request, selected PRADA shoes, causing a palette of 10 sensory images S1-S10 to appear on the agent's display 1100. The product menu portion 1140 displays the fact that the system has ten sensory images 1150 of PRADA shoes. These images could be any form of sensory image: video; audio; aromatic or haptic. In the case of shoes, however, video images are probably most useful. In the example shown, in FIG. 11, the agent has selected sensory image 4 (S4)—a visual image—for display in the display case.

The agent display further includes a "product information and agent notes" 1160 portion for displaying product information and agent notes concerning the particular product. The product information and agent notes could include general information concerning the availability of the product in certain sizes, as well as observations concerning the nature of the products such as that the shoes in question run a little small.

Finally, in the embodiment illustrated in FIG. 11, the agent display includes a "text dialog portion" 1170 so that, if the customer is unable or unwilling to communicate through videophone or voice, a customer/agent dialog can take place using text such as instant messaging.

FIG. 12 shows a customer display 1200 according to the present invention. The display includes a display screen 1210, which may be in the form of a flat panel display or other computer monitor for displaying visual images. As noted above, the system is adapted for other sensory images in addition to visual images. Thus, the customer display shown includes speakers 1212 or other means for reproducing sounds, an aroma generator 1214 or other means for producing smell and a haptic interface 1216 or other means for reproducing the sense of touch. The customer display includes a large "display case portion" 1220 devoted to displaying. visual images of products. In accordance with an important aspect of the present invention, the sales agent can control what visual images are displayed in the display case portion of the customer display. Likewise, the sales agent can control what other sensory images (audio, aromatic or haptic) are delivered to the customer display.

The customer display also includes a "videophone portion" 1230 devoted to displaying a videophone dialog, if the customer is capable and willing to conduct such dialog.

In addition, the customer display includes a "text dialog portion" 1240 so that, if the customer is unable or unwilling to communicate through videophone or voice, a customer/agent dialog can take place using text such as instant messaging.

The customer display also includes control buttons 1270-1278. In the example shown in FIG. 12, buttons provided on the visual display allow the customer to select the sensory images to be delivered In particular, the customer can select the "see it" button 1270 to see a visual sensory image, the "hear it" button 1272 to download audio sensory images, the "feel it" button 1274 to download haptic interface sensory images representing the sense of touch, the "smell it" button 1276 to download aromatic sensory images and the "buy it"

button 1278 to proceed to the checkout step of the transaction or otherwise designate the product for later purchase.

As used herein, "delivery of sensory images" refers to sending instructions to the customer computer for recreating the desired sensory image. Upon receipt by the customer computer, the instructions are directed to the customer display, speakers, aroma generator or haptic interface to recreate the desired sensory image. The instructions are preferably in TCP/IP format and can be delivered through instant messaging technology or the like.

In the context of clothing, or fashion accessories, the system preferably includes software, such as that used in Broderbund's Cosmopolitan Fashion Makeover Deluxe, that allows customers to enter their measurements, hairstyle and skin color on a virtual model to see how clothes might look on their body. This type of software could be used in many contexts to give customers an enhanced sensory experience.

Figure 13:
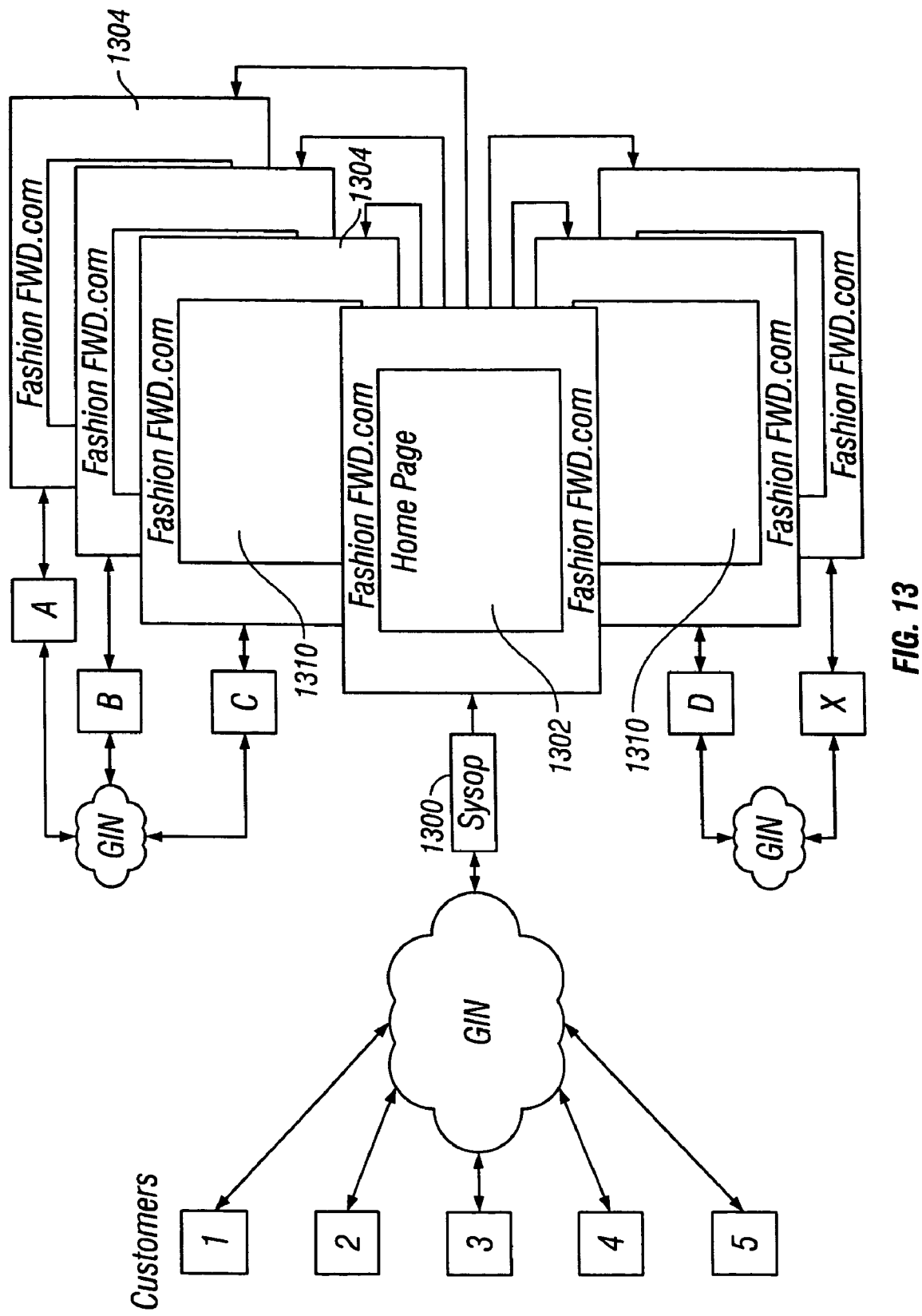
FIG. 13 shows a system architecture for virtual retail using a common brand model.

FIG. 13 shows the system architecture for a version of the present invention referred to as the common brand model. In this example, the system operator 1300 operates a home page 1302 and provides guidelines or quality standards concerning other pages, referred to as member or merchant pages. Customers 1-5 communicate through the global information network with the web sites. The member pages include some content that is dictated by the system operator as indicated by the frame 1304 around each of the pages. The members or merchants A, B, C, D . . . X, are each given control of the content in a portion 1310 of their respective merchant pages. In the example shown, the portion of the page in which the content is dictated solely by the individual merchant is the portion of the page within the frame. The members may modify their content through a private network or through the global information network.

In this model, the merchants, which may be relatively small or local merchants, benefit from association with the common brand and also benefit from the attraction of the content provided by the operator of the common brand. The individual merchants, on the other hand, can provide local content of interest and/or information pertaining to their particular business. The customers can access the home page and/or any of the individual pages directly through the global information network. The sales agents can be provided through the operator of the common brand and/or through the individual merchants.

Figure 14:
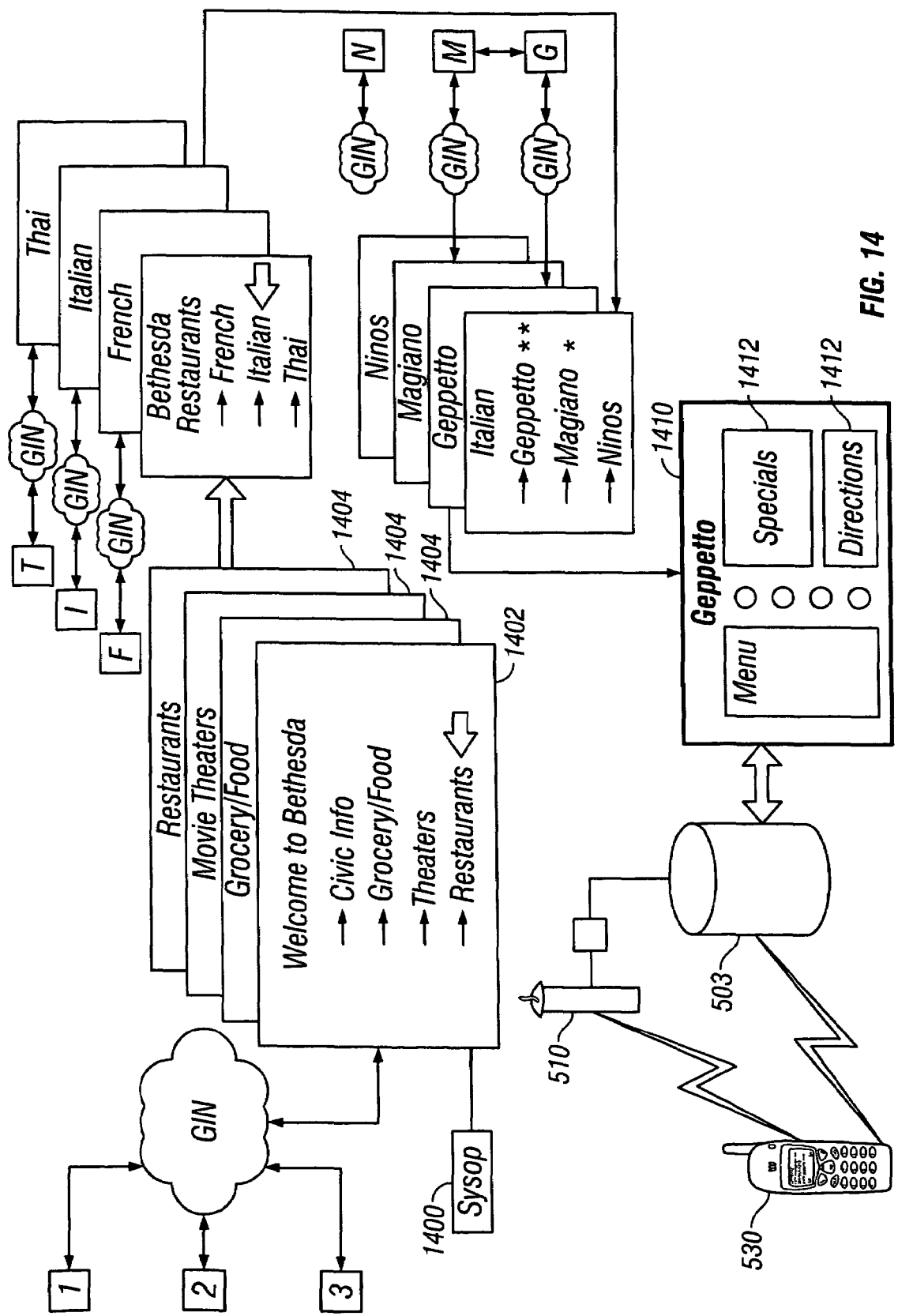
FIG. 14 shows a system architecture for a virtual retail system using a local vendor model and including a cellular position locator and merchant database.

FIG. 14 depicts the architecture for a local vendor model of the system of the present invention. Again, customers 1-5 communicate through the global information network with a web site 1402 run by the system operator. Customers are preferably linked to the system through a home page that is geared to a local community, in this instance, Bethesda. Though it might be possible for customers to directly link to subsidiary pages 1404, doing so is not encouraged in this model. Instead, the home page 1402 provides content relating to local events and also an index that allows customers to access information concerning local merchants depending on criteria such as product/service category or brand name or the like. Subsidiary pages may be directed to certain categories or merchants. In the illustrated embodiment, subsidiary pages 1404 include a page directed to grocery/food, a page to movie theatres and a page directed to restaurants. In the illustrated example, the customer has selected the restaurants page, which begins by providing options concerning the style available. In an illustrated example, the available options include French, Italian and Thai restaurants. The customer may choose one of these selections, which links to a page that can be operated by either the system operator of, in the instance of a single merchant for the particular category, the merchant itself. In the illustrated example, the customer has selected Italian restaurants and the system displays a list of available Italian restaurants. The page also includes an indication of the ranking, if any, associated ranking with each restaurant. In this example, there is a web page associated with each of the available options. As shown, each of the merchants (e.g., N, M, G) corresponding to the options listed are linked to their respective page through the global information network. In the example shown, the customer selects "GEPETTO" restaurant and the page 1410 corresponding to that restaurant, which is preferably operated, at least in part, by the merchant itself, displays the restaurant menu and also includes a display of specials. In addition, the page displays a button that allows the customer to select directions as well as other options as desired. Sales agents, if desired, can be provided through the system operator and/or through the individual merchants.

In accordance with an important aspect of the present invention, the page 1410 preferably includes one and more mandatory content portions 1412. These mandatory content portions could include the directions or specials so that, as described before, this content could be retrieved from a merchant database 503 for use in connection with the cellular position locator and merchant directory of the present invention. In particular, the same page used for the vetail system could be used in conjunction with the merchant database, as illustrated in FIG. 14.

Figure 15:
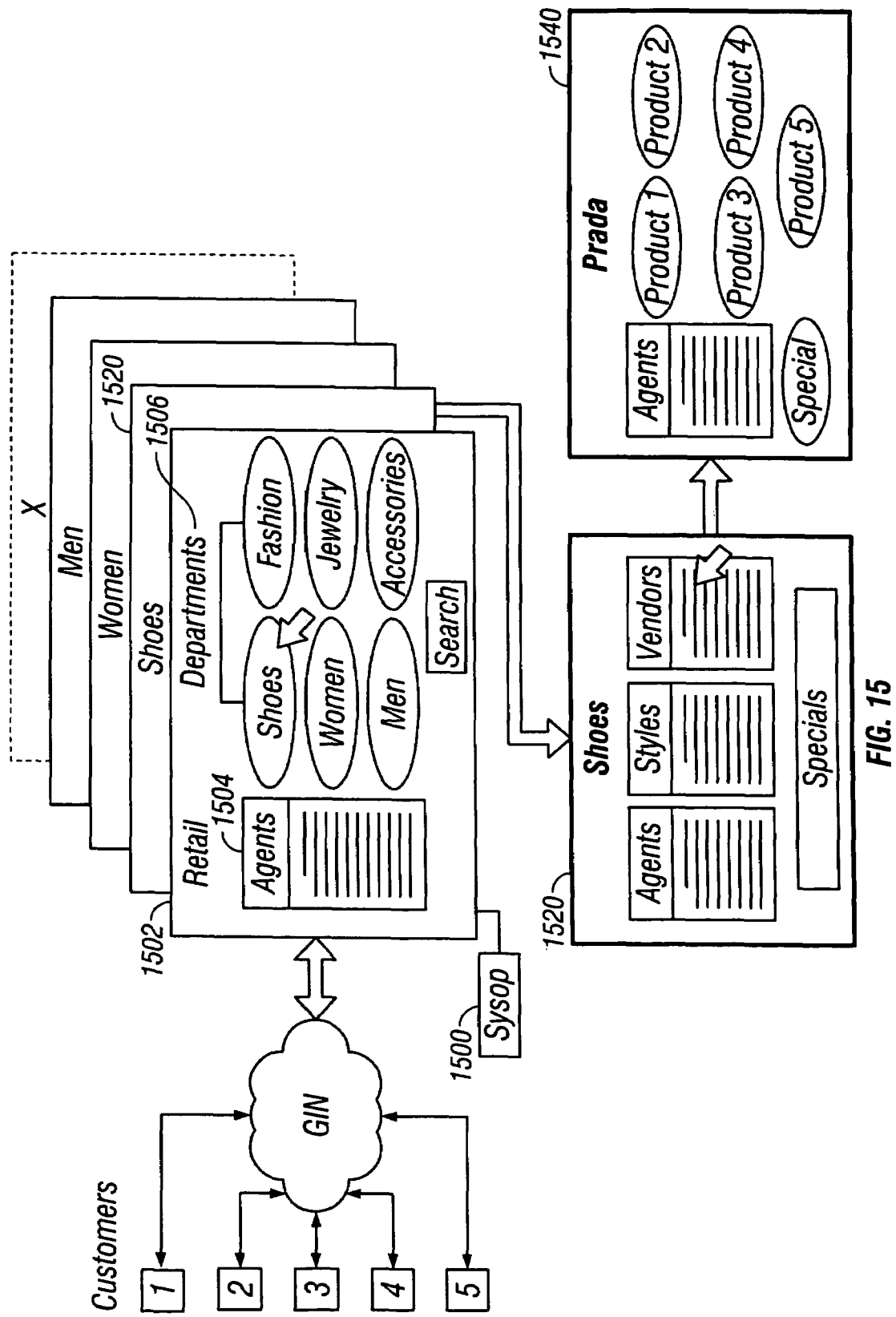
FIG. 15 shows a system architecture for virtual retail using a department store model.
Figure 16:
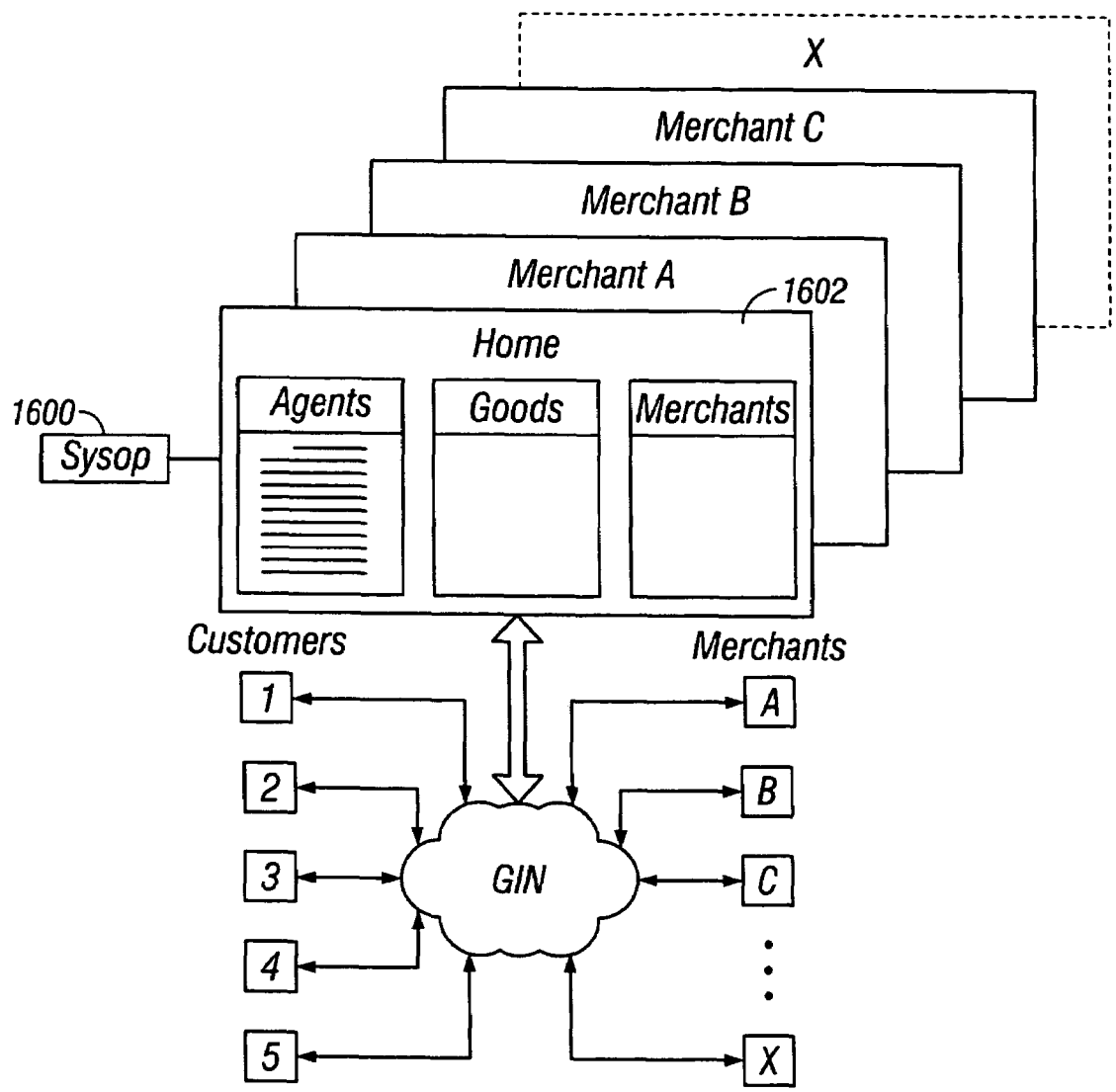
FIG. 16 shows a system architecture for a virtual retail model using a web host model.

FIG. 15 shows the architecture for a department store model of the virtual retail system of the present invention. Again, customers 1-5 communicate through the global information network with a web site run by the system operator 1500. In this example, the web site 1502 presents both available agents 1509 and available departments by reference to specific vendors. The customer can select a particular agent or the page(s) available for each category or department of goods. When the customer makes a selection, in this instance, the customer has selected shoes, the system displays the page 1520 associated with shoes. This display preferably includes a list of agents that are certified to deal with "shoes" generally, the styles of shoes available and vendors. The page shown also includes a listing of specials or promotions that are available. In the example shown, the customer has selected a particular vendor, in this instance PRADA, and the system displays that vendor's page 1540, the products available, promotions, if any, and agents certified to represent this particular product.

FIG. 16 shows the architecture for the web host model of the vetail system of the present invention. In this example, customers again communicate with this system through the global information network. The system operator 1600 operates a home page 1620 that lists agents available, goods available and merchants participating in the system. The home page 1620 is linked to the pages of each of the merchants A, B, C . . . X so that the customers can access the merchants through the home page. The agents communicate with the system through the global information network and are associated or authorized to represent one or more of the merchants listed. In the example shown, the merchants A, B, C . . . X control the content of their own pages, and may, if desired, operate a vetail system independent of the system operator through these pages.

Intelligent Recommendation System

In accordance with another aspect of the present invention, customers could be polled to obtain feedback concerning merchants or sales agents. For example, the personal communication devices could be used to solicit and gather feedback. With this feature, the system could query the user a pre-set time after a user has made a request using the system: "Did you visit the merchant?" Yes/no. This query is exemplary since the question might not be necessary, if the user's personal communication device includes a personal chip (smart card) that records where the user shopped (if yes). Further queries could include: How would you rate the experience? (1) outstanding; (2) good; (3) fair; (4) poor. Alternatively, in the context of vetail experience (including business to business transaction) the evaluation could be as simple as "favorable," "unfavorable" or "neutral." The user could, in accordance with another aspect of the present invention be rewarded for responding to this "survey" through points for an adjustment in the respective redemption rate or through free communication time. The merchants could, according to the present invention, be rated based upon these responses and could, in accordance with another aspect of the present invention, be rewarded using the reward system of the present invention for consistently good service.

The survey and merchant ranking system of the present invention can be used to identify vendors that offer a similar experience and for making suggestions or "intelligent recommendations" based on this information. At its most basic level, this aspect of the present invention is based on the premise that two customers that share common opinions regarding a significant number of vendors that they both have patronized are likely to share one another's opinion regarding other vendors. Because the system has the capability of obtaining customer impressions of the service or goods offered by a wide variety of merchants (through instant polls and incentives) it is possible to store this information in a database (such as an SQL database, for example) and then identify customers with common responses to the vendors. For example, if customer X queries the database for "Mexican Restaurants" and the system identifies one or more such restaurants in the specified range, the system could determine if the customer is likely to enjoy the restaurants identified. Specifically, by querying the database, the system identifies other users that have similar opinions with regard to commonly visited merchants and then uses the opinions of these "similar" customers to make recommendations. Naturally, a wide variety of statistical analysis methods could be used to identify "similar" customers and the recommendations. In a simple example, by querying the database, the system identifies customers A, B, C and D that have all patronized the same Thai restaurant, the same Italian restaurant, and the same Chinese restaurant as customer X and have given each of the restaurants statistically similar rankings (good or bad). Based on this similarity of rankings, it could be assumed that customer X would enjoy "Mexican Restaurants" that received favorable evaluations from customers A, B, C and D. Likewise, customer X should probably avoid a Mexican Restaurant that received unfavorable evaluations from customers A, B, C and D.

It should be appreciated that "intelligent recommendation" aspect of the present invention is a significant improvement over systems that make recommendations based only on purchases of customers that make similar purchases without considering whether the other customer was satisfied with its purchase. Because the present invention makes it possible, through simple automatic customer polling with incentives for response, to "survey" customers, it is possible to make "intelligent" recommendations.

Naturally, the intelligent recommendation system can be applied to other goods and other services for which customer polling information is available. The system is, for example, ideal for the electronic commerce retail and business to business systems described herein. In particular, the system can build customer profiles based on responses to polls or questionnaires or through input of sales agents that have dealt with the customers. The sales agent could, for example, input feedback from customers that they interact with, i.e., build a profile of customer A. The sales agent could, for example, input the customer's opinion of a pair of PRADA shoes, preferably by selecting from a set of options such as "strongly dislike," "unfavorable," "neutral," "favorable" or "highly favorable." Of course, the customer could be polled or complete a questionnaire to provide the same information. Again, incentives can be provided to encourage the customers or sales agents to build the customer profiles.

The customer profiles can be used in at least two general ways. First, the customer profile can be called up and automatically displayed during a sales agent/customer interaction to assist the sales agent in understanding the customer's preferences. Secondly, the intelligent recommendation aspect of the present invention can be used by either the sales agent or the customer to obtain recommendations based on other customers' preferences.

As noted before, the customer profile/query response is preferably stored in a relational database that can associate a user ID with the IDs of vendors that the customer has a favorable impression of or has an unfavorable of. This is one way to enable intelligent recommendations as discussed above. Other ways of making intelligent recommendations will be apparent to those skilled in the art.

In practice, the system can be used to provide suggestions along the following lines: "if you like [product or service #1] then try this [product or service #2] "people that like [product or service #1] usually like [product or service #2]."

The intelligent recommendation system can also be used to match customers to sales agents in the retail context. As noted herein, one aspect of the retail system is customer evaluation of the sales agents level of service. This evaluation is used in conjunction with the incentive program to incentivize the sales agents. The evaluations also provide valuable information about how the customer reacts to certain sales agent's unique style. In particular the sales agents could be human or automated, but in either case the sales agents are likely to have unique styles since different customers prefer different styles. By maintaining a relational database that can associate customer ID's with the ID's of Agents the customer liked or disliked, it is possible to make an intelligent recommendation of sales agent for a customer when their preferred sales agent is not available, by finding customers with common preferences as described above. Naturally, other factors could be taken into account including the sales agent's areas of expertise, the sales agents performance ranking and, of course, the sales agents availability. Moreover, to the extent that automated agents are substituted for human agents, the selection of an appropriate automated agent can be based on an "intelligent recommendation" that identifies the style of agent a customer prefers.

FIG. 17 illustrates a simplified form of matrix for storing and comparing customer responses to various sales agents and automated agents in a virtual retail (vetail) setting according to the present invention. The intelligent recommendation system is useful in other contexts as well. For example, a similar system could be used in connection with merchants as opposed to sales agents.

As shown in FIG. 17, a database is maintained that associates customers (C1-C20) with the sales agents (SA1-SA15) and automated agents (AA1-AA5) within the vetail system. As mentioned before, whenever the customer interacts with a sales agent (which may be a human sales agent SA or an automated agent M) the customer is queried as to his reaction to the experience. Preferably, the customer will simply be asked as the whether the customer's reaction is favorable, unfavorable or neutral. However, more complex quantitative evaluations using numerical ranking could be obtained, but this adds a level of complexity that may not be justified in all instances. In the context of an intelligent merchant recommendation system, the system would store customer reaction to merchants as opposed to sales agents.

In the matrix shown in FIG. 17, the system maintains a database in which each customer's reaction to the sales agents or automated agents that they have interacted with is stored. By analyzing the responses of the various customers to the various agents in the matrix-like form (or conducting a similar comparison using a computer algorithm), such as that shown in FIG. 17, it is possible to identify customers that are "like minded," i.e., customers that have demonstrated statistically similar reactions to the same sales agents. In the illustrated embodiment, for example, there is evidently a strong similarity in the reactions that customer 7 (C7) and customer 11 (C11) have had to the various agents that they have encountered using the system. Thus,. for example, it is likely that customer 11 (C11) would find an interaction with sales agent 7 (SA7) to be favorable since customer 7 (C7) found such an interaction to be favorable. In addition, although customer 11 has not had any interaction with automated agents, if it is necessary for customer eleven to interact with an automated agent, it would be preferable that the automated agent be agent number 2 (AA2), which customer 7 found to be favorable, rather than automated agent 1 (AA1), which customer 7 found to be unfavorable.

Likewise, there is a fairly strong correlation between the reactions that customer 3 (C3) and customer 17 (C17) have had to various sales agents. Thus, it may be assumed that, although customer 17 has not interacted with sales agent 9 (SA9) in the past, customer 17 should steer away from sales agent 9 since, based upon customer 3's reaction, customer 17 is not likely to find sales agent 9 favorable.

It should be appreciated that the system presented in FIG. 17 is simplified for purposes of clarity. To provide statistically meaningful recommendations, it is preferable to have a much larger database.

The assembly of customer review data such as that shown in FIG. 17 is also helpful for identifying poorly performing agents, whether human agents SA or automated agents M. Naturally, in an effort to improve customer service, agents that are determined to be performing poorly should be removed from the system. In the example shown in FIG. 17, sales agent 10 (SA10) and automated agent 1 (AA1) are good candidates for removal from the system. Of course, it is possible to weight the ratings according to the source of the ratings—depending on the track record or level of experience of the person making the recommendation. Thus, under such a weighted system and referring to FIG. 17 again, the unfavorable rating that customer 15 gave to sales agent 12 should be weighted more highly than the unfavorable rating given to sales agent 14 by customer 5, since customer 5 has tended to rank most experiences negatively, whereas customer 15 has ranked most interactions positively. Likewise, the ratings of customers that have had more experiences could be weighted more heavily than newcomers. Weighting based on experience could be accomplished by assigning a VRR type-weighting factor to each customer. The weighting factor is increased incrementally as the customer gains experience.

Multiple Loop Courier System

To improve efficiency of delivery to local homes and businesses from a central hub in a metropolitan area in a network economy, the present invention provides a multiple loop courier system. The multiple loop courier system 1800 includes one or more first-tier couriers that transport goods from a central hub 1810 to a plurality of geographically spaced first tier drop points 1820. The system further includes one or more second-tier couriers associated with each of the plurality of drop points for carrying the goods from the first-tier drip points to a plurality of second-tier drop points 1830 that are geographically spaced from the first-tier drop points. In addition, the system includes delivery couriers that deliver goods from first- and/or second-tier drop points to customers.

The multi-tier looped courier system further includes a computer and communication system 1870 for determining optimum delivery courier instructions (preferably based on real time traffic data and delivery demand) and conveying these instructions to each of the delivery couriers. To achieve efficiencies by coordinating deliveries during predetermined delivery cycles, the multi-loop delivery system of the present invention directs the "loop couriers" to follow a simple set of rules during each cycle that can be individually optimized. For example, the second-tier couriers are instructed to be at their designated first-tier drop-off point 1820 at a predetermined time during each cycle, e.g., "every hour on the hour." The system is arranged so that the second-tier courier can be assured that if goods are to be dropped off at their designated first-tier drop-off point for any particular delivery cycle, they will arrive by a certain time, e.g., by 5 minutes after the hour. Thus, if goods are not delivered by the predetermined time, the courier then proceeds to the default instruction, which may include returning to the central hub to pick up a delivery for delivery within the vicinity of the central hub or to provide the next delivery to the first-tier hubs. The default instruction may simply be to return to the hub for further instructions.

The multi-loop delivery system 1800 is also used in connection with the delivery couriers but, the system further provides specific instructions at each designated drop-off time for the delivery couriers to ensure maximum efficiency. To facilitate these instructions, the system includes a computer and communication system 1870 for receiving information concerning deliveries to be made and real time traffic conditions and determining optimum delivery courier instructions based on real time traffic data and delivery demand and conveying these instructions to each of the delivery couriers.

Thus, the delivery system of the present invention comprises a central hub 1810 for assembling packages of goods to be delivered; a first tier courier; a plurality of second tier couriers; a plurality of delivery couriers; and a computer and communication system 1870. The first-tier courier picks up packages at the central hub 1810 and delivers packages to a plurality of first-tier drop-off points 1820. The second-tier couriers are each associated with a particular one of the first-tier drop-off points and follow rules of delivery during a delivery cycle that is repeated in predetermined time cycles. The rules of delivery to be followed depend on whether or not goods have been delivered to the designated first-tier drop-off point by a predetermined time. The delivery couriers retrieve goods from first- and second-tier drop-off points 1819, 1820 and deliver goods directly to customers according to instructions received from the computer and communication system based on real time traffic and delivery demand information. The couriers within the system may be subject to incentive system according to the present invention to encourage improved performance.

Figure 18:
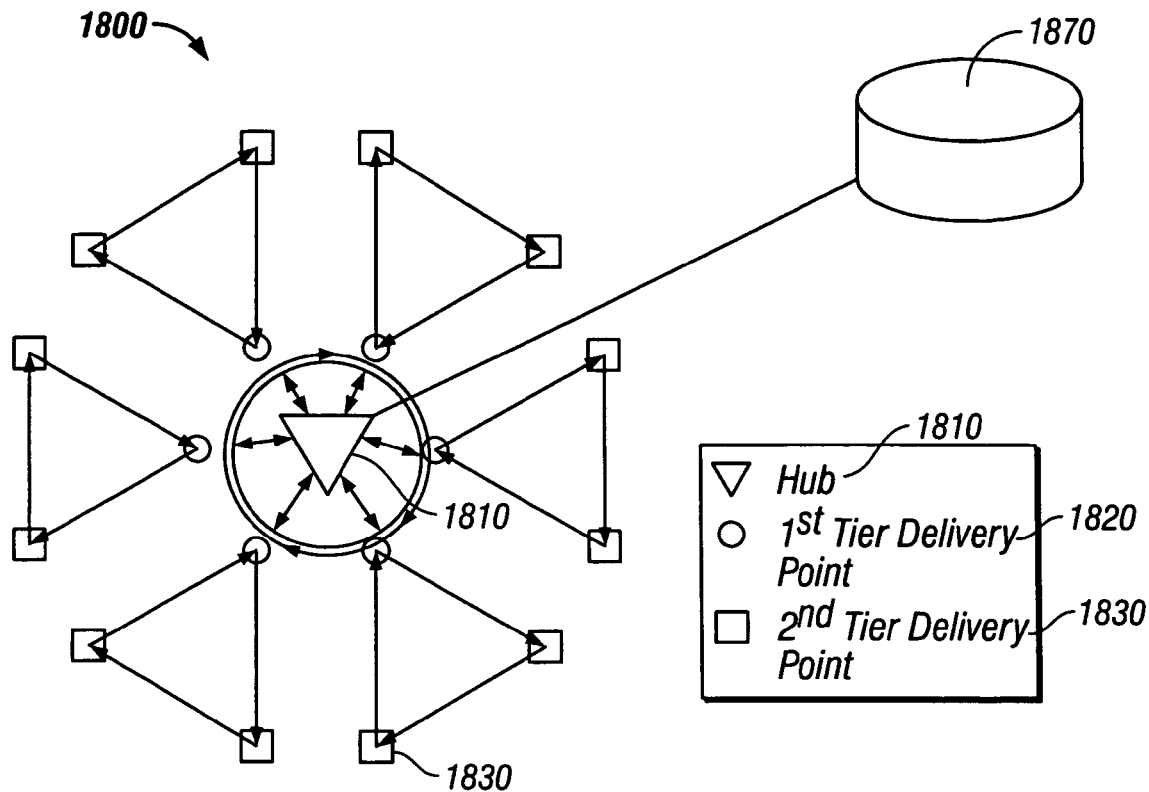
FIG. 18 illustrates a multi-tier looped delivery system according to the present invention
Figure 18A:
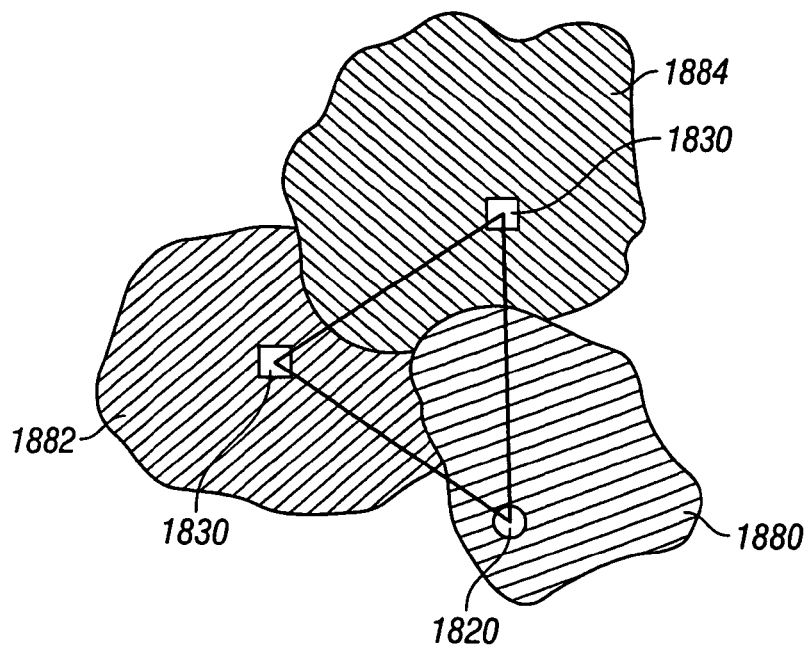
FIG. 18A illustrates coverage areas of delivery couriers assigned to cover designated areas within the immediate vicinity of the delivery points they are assigned according to the present invention

As shown in FIGS. 18 and 18A, the delivery system of the present invention includes a hub 1810 as indicated by an inverted triangle; a plurality of first-tier delivery points 1810 indicated by circles and a plurality of second-tier delivery points 1820 indicated by squares.

The hub is a geographic location at which goods are packaged for delivery. The hub may be a pharmacy, a restaurant, a grocery store or any other merchant location desiring to offer local delivery. As indicated by the double-lined arrows that encircle the base, a least one first-tier courier picks up packages at the central hub and delivering packages to a plurality of first-tier drop-off points by moving in a loop encompassing each of the first-tier delivery points. This loop is the first-tier delivery loop for making deliveries to each of the first-tier delivery points on a periodic basis. Dedicated first tier couriers may make these deliveries or one or more of the second tier couriers assigned to one of the first-tier delivery points that is not otherwise occupied during any predetermined period may make these deliveries.

The movement of second tier delivery couriers from first-tier delivery points is indicated by the arrows in FIG. 15. In particular, second-tier couriers are each associated with a particular one of the first-tier drop-off points and follow rules of delivery during a delivery cycle that is repeated in predetermined time cycles. The rules of delivery to be followed depend on whether or not goods have been delivered to the designated first-tier drop-off point by a predetermined time. In particular, the second-tier couriers follow a simple protocol during each delivery cycle. As used herein, the term "delivery cycle" refers to the period between the deliveries from the hub to the first-tier delivery point. Preferably, these delivery cycles follow a set time period. The protocol followed by the second-tier delivery couriers may, in the preferred embodiment, be as follows. During the delivery cycle, if goods have been delivered to the designated first-tier delivery point, then the second-tier delivery courier delivers goods to its designated second-tier delivery points in a loop pattern. In accordance with a preferred aspect of the present invention, each of the second-tier couriers proceeds in a loop in the same general direction. In addition, the second-tier delivery points are arranged such that, in each second-tier delivery loop, at least one of the delivery points is located near a delivery point in an adjacent delivery loop. Since the second-tier delivery couriers are proceeding in the same general direction, it follows that the natural time of delivery to the adjacent second-tier delivery points associated with different loops would be at different times. Thus, it is possible to stagger delivery times to customers using these adjacent delivery points and thereby to minimize the delay experienced by customers.

In the event that goods are not delivered to any particular first-tier delivery point, i.e., there are not any customer orders to be delivered or there are delivery couriers free for that particular cycle, then the second tier delivery courier associated with that any particular first-tier delivery point follows a second instruction, which may be to make local deliveries or to return to the hub and make a delivery to each of the first-tier delivery points.

One or more delivery couriers are associated with each of the first- and second-tier delivery points to make deliveries from the delivery point to the customer near the delivery point. As illustrated schematically in FIG. 15A, these delivery couriers are assigned to cover designated areas within the immediate vicinity of the delivery points they are assigned. Examples of assigned areas 1880, 1882 and 1884 are indicated generally by cross-hatching. Preferably, the delivery areas 1880, 1882 and 1884 overlap to allow some flexibility and improvements in efficiency. The delivery couriers retrieve goods from first- and second-tier drop-off points and deliver goods directly to customers according to instructions received from the computer and communication system based on real time traffic and delivery demand information received from the computer and communication system 1870.

For simplicity of the explanation, the delivery system has been described in connection with a two-tier looping delivery system that includes only the first-tier delivery points and second tier delivery points. It should be appreciated that to expand the system, it is possible to have third-tier delivery points and subsequent delivery points. Adding additional tiers of delivery points expands the reach of the system, but also introduces further delay into the delivery system, which may or may not be acceptable depending on the nature of the goods to be delivered. It should also be noted that a single courier could perform the roles of first tier delivery courier, second tier delivery courier and deliver courier according to instructions received from the computer and communication system.

An important advantage of the delivery system of the delivery system of the present invention is that it allows delivery couriers to be distributed efficiently over a wide geographic area in a metropolitan setting with a minimum number of delivery couriers. In the example shown, for example, periodic delivery to all eighteen delivery points could be made using six or seven couriers (depending on whether a courier is dedicated for delivery to the first-tier delivery point). The specific design of any particular multi-loop delivery system according to the present invention depends on the specific geographic area to be serviced and the time frame for acceptable delivery.

There are various changes and modifications that may be made to the invention as would be apparent to those skilled in the art. However, these changes or modifications are included in the teaching of the disclosure, and it is intended that the invention be limited only by the scope of the claims of any patent to issue from this application.

I claim:

1. A wireless connectivity and electronic commerce system, the system comprising:

a database for storing a plurality of merchant ID's of a plurality of participating merchants in association with information indicative of geographic location;

merchant information data associated with each of the merchant ID's, the merchant information data being accessible by merchants so that merchants can add, delete or alter information associated with their merchant ID;

a plurality of digital cellular phones, each of the digital cellular phones comprising: a display; audio output and input equipment to allow voice communication on a digital cellular network, a user interface for allowing an user to generate digital messages; a transmitter and receiver for wireless connectivity so as to allow a digital message generated on the digital cellular phones to be transmitted to hardware equipped to receive such messages;

a position locator system for determining the geographic position of the digital cellular phones;

a search engine for querying the database to determine the merchant ID of all participating merchants located near a digital cellular phone and retrieving merchant information data pertaining to selected participating merchants and transmitting the information to the digital cellular phone; and the user interface comprising a plurality of menu options stored on the digital cellular phone so as to allow a user to construct a search query specifying a type of merchant solely through a combination of a plurality of menu choices.

2. The system of claim 1, wherein the database for storing a plurality of merchant D's in association with information indicative of geographic location is a merchant information database maintained on a common server by a system operator, each of the plurality of merchant D's conforming to a standard and being assigned by the system operator, the database storing content uniquely associated with a plurality of different merchants in a consistent format on a single server, the content including content that can be modified only by the system operator or the merchant to which the content is uniquely associated and the system controlling access to the database such that each of the plurality of different merchants are allowed to access the common server to modify content uniquely associated with their respective merchant ID's, but prevented from modifying content uniquely associated with others of the plurality of different merchants.

3. The system of claim 1, the system further comprising a mobile exchange for facilitating digital cellular voice communication and a database linked to mobile exchange for storing content associated with content providers in geographic proximity to the mobile exchange.

4. The system of claim 1, further comprising a bid solicitation engine for soliciting bids from merchants within the proximity of the user in response to a query, the bid solicitation engine identifying the best value or values for the goods or services the user is interested in and providing a digital message through the digital cellular network to the user identifying the best value or values for the goods or services the user is interested in.

5. The system of claim 1, wherein the user interface further provides the user the option of making a call to a merchant identified in response to a search query.

6. The system of claim 1, wherein the digital cellular phones are Bluetooth enabled to allow the position locator system to provide position information to another device that communicates with the digital cellular phone through wireless connectivity.

7. The system of claim 1, wherein the user interface further comprises a programmable button for generating a search query specifying a type of merchant with a single press of a button.

8. the system of claim 7, wherein the programmable button is programmed to generate a search query specifying a specific merchant to find the nearest location of that merchant with a single press of a button.

9. The system of claim 1, wherein the digital cellular phones comprise and a transmitter and receiver for communication with a cellular base station so as to allow digital cellular voice communication and allow a digital message generated on the digital cellular phones to be transmitted through a mobile exchange.

10. A computer implemented merchant locator system that allows users equipped with digital cellular phones to identify merchants in their vicinity, the system comprising:

a plurality of digital cellular phones, each of the digital cellular phones comprising: a display; audio output and input equipment to allow voice communication on a digital cellular network, a user interface for allowing an user to generate digital messages, the user interface comprising a plurality of menu options stored on the digital cellular phone so as to allow a user to construct a search query specifying a type of merchant through a combination of a plurality of menu choices; a transmitter and receiver for wireless connectivity so as to allow a digital message generated on the digital cellular phones to be transmitted to hardware equipped to receive such messages;

a position locator system for determining the geographic position of the digital cellular phones;

a database for storing a plurality of merchant ID's in association with information indicative of geographic location; wherein the database for storing a plurality of merchant ID's in association with information indicative of geographic location is a merchant information database maintained on a common server by a system operator, each of the plurality of merchant ID's conforming to a standard and being assigned by the system operator, the database storing content uniquely associated with a plurality of different merchants in a consistent format on a single server, the content including content that can be modified only by the system operator or the merchant to which the content is uniquely associated and the system controlling access to the database such that each of the plurality of different merchants are allowed to access the common server to modify content uniquely associated with their respective merchant ID's, but prevented from modifying content uniquely associated with others of the plurality of different merchants.

11. The system of claim 10, wherein the digital cellular phones comprise a transmitter and receiver for communication with a cellular base station so as to allow digital cellular voice communication and allow a digital message generated on the digital cellular phones to be transmitted through a mobile exchange.

12. The system of claim 10, wherein the user interface further provides the user the option of making a call to a merchant identified in response to a search query.

13. The system of claim 10, wherein the user interface further comprises a programmable button for generating a search query specifying a type of merchant with a single press of a button.

14. The system of claim 13, wherein the programmable button is programmed to generate a search query specifying a specific merchant to find the nearest location of that merchant with a single press of a button.

15. A computer implemented merchant locator system for allowing users to identify merchants from among a plurality of merchants by location and receive information regarding the merchants, the system further allowing merchants to alter or control the content of information sent to users, the system comprising: a database for storing a plurality of merchant ID's and merchant information data addresses in association with information indicative of geographic location: wherein the database for storing a plurality of merchant ID's in association with information indicative of geographic location is a merchant information database maintained on a common server by a system operator, each of the plurality of merchant ID's conforming to a standard and being assigned by the system operator, the database storing content uniquely associated with a plurality of different merchants in a consistent format on a single server, the content including content that can be modified only by the system operator or the merchant to which the content is uniquely associated and the system controlling access to the database such that each of the plurality of different merchants are allowed to access the common server to modify content uniquely associated with their respective merchant ID's, but prevented from modifying content uniquely associated with others of the plurality of different merchants; a plurality of digital cellular phones, each of the digital cellular phones comprising: a display; a position locator system for determining the geographic position of the digital cellular phones; a user interface for allowing an user to generate digital messages, the user interface comprising a plurality of menu options stored on the digital cellular phone so as to allow a user to construct a search query specifying a type of merchant through a combination of a plurality of menu choices; a transmitter and receiver for communication with a cellular base station so as to allow digital cellular voice communication and allow a digital message generated on the digital cellular phones to be transmitted through a mobile exchange to the common server.

16. The system of claim 15, wherein each of the digital cellular phones further comprise a smart card and wherein the smart card includes a chip that can store a digital code representing a monetary value, the smart card being detachable from the remainder of the digital cellular phone.

17. The system of claim 15, wherein each of the digital cellular phones further comprise a web browser.

18. The system of claim 15, wherein the user interface further comprises a programmable button for generating a search query specifying a type of merchant with a single press of a button.

19. The system of claim 18, wherein the programmable button is programmed to generate a search query specifying a specific merchant to find the nearest location of that merchant with a single press of a button.

* * * * *